US012639299B2

(12) United States Patent (10) Patent No.: US 12,639,299 B2
Kondiles et al. (45) Date of Patent: May 26, 2026

(54) ROUTING FEEDBACK DATA BLOCKS VIA A PRIORITIZED FEEDBACK COMMUNICATION MECHANISM BASED ON POWER

(71) Applicant: Ocient Holdings LLC, Chicago, IL (US)

(72) Inventors: George Kondiles, Chicago, IL (US); Jason Arnold, Chicago, IL (US); S. Christopher Gladwin, Chicago, IL (US); Joseph Jablonski, Chicago, IL (US); Daniel Coombs, Chicago, IL (US); Andrew D. Baptist, Mt. Pleasant, WI (US)

(73) Assignee: Ocient Holdings LLC, Chicago, IL (US)

( * ) Notice: Subject to any disclaimer, the term of this patent is extended or adjusted under 35 U.S.C. 154(b) by 0 days.

(21) Appl. No.: 18/745,356

(22) Filed: Jun. 17, 2024

(65) Prior Publication Data

US 2024/0338363 A1     Oct. 10, 2024

Related U.S. Application Data

(63) Continuation of application No. 18/538,526, filed on Dec. 13, 2023, now Pat. No. 12,182,120, which is a (Continued)

(51) Int. Cl.
*G06F 16/24* (2019.01)
*G06F 16/2453* (2019.01)
(Continued)

(52) U.S. Cl.
CPC .. *G06F 16/24532* (2019.01); *G06F 16/24542* (2019.01); *G06F 16/2455* (2019.01); *G06F 16/2471* (2019.01); *H04L 45/02* (2013.01)

(58) Field of Classification Search
CPC ........... G06F 16/24542; G06F 16/2471; G06F 16/2455; G06F 16/24532; H04L 45/02
(Continued)

(56) References Cited

U.S. PATENT DOCUMENTS 5,548,770 A     8/1996   Bridges
6,230,200 B1 *  5/2001   Forecast ................... G06F 9/50
                                                      709/219

(Continued)

OTHER PUBLICATIONS

A new high performance fabric for HPC, Michael Feldman, May 2016, Intersect360 Research.

(Continued)

*Primary Examiner* — Hanh B Thai
(74) *Attorney, Agent, or Firm* — Garlick & Markison; Timothy W. Markison

(57)                ABSTRACT

A node of a database system is operable to receive a plurality of data blocks from a set of source nodes via a set of relay nodes. At least one feedback data block to be sent to at least one of the set of source nodes is generated. Feedback relay node selection data selecting at least one of a plurality of nodes in the database system for facilitating routing of the at least one feedback data block from the node to the at least one of the set of source nodes based on a prioritized feedback communication mechanism and power utilization. The at least one feedback data block is sent to the at least one of the plurality of nodes selected in the feedback relay node selection data. The at least one feedback data block is routed from the node to the at least one of the set of source nodes via the prioritized feedback communication mechanism.

16 Claims, 39 Drawing Sheets

Related U.S. Application Data continuation of application No. 18/163,457, filed on Feb. 2, 2023, now Pat. No. 11,893,017, which is a continuation of application No. 17/645,802, filed on Dec. 23, 2021, now Pat. No. 11,586,625, which is a continuation of application No. 16/829,808, filed on Mar. 25, 2020, now Pat. No. 11,238,041.

(51) Int. Cl.

| | | |
|---|---|---|
| *G06F 16/2455* | (2019.01) | |
| *G06F 16/2458* | (2019.01) | |
| *H04L 45/02* | (2022.01) | |

(58) Field of Classification Search

USPC ........................................................ 707/718

See application file for complete search history.

(56) References Cited

U.S. PATENT DOCUMENTS

| | | | | |
|---|---|---|---|---|
| 6,633,772 | B2 | 10/2003 | Ford | |
| 6,938,094 | B1 | 8/2005 | Keller | |
| 7,499,907 | B2 | 3/2009 | Brown | |
| 7,908,242 | B1 | 3/2011 | Achanta | |
| 7,948,931 | B2 | 5/2011 | Shu | |
| 10,063,460 | B2 * | 8/2018 | Wu | H04W 40/246 |
| 10,659,462 | B1 * | 5/2020 | Kim | H04L 63/0876 |
| 12,341,687 | B2 * | 6/2025 | Vegesna | H04L 45/24 |
| 2001/0051949 | A1 | 12/2001 | Carey | |
| 2002/0032676 | A1 | 3/2002 | Reiner | |
| 2003/0033394 | A1 * | 2/2003 | Stine | H04W 52/0216 |
| | | | | 709/222 |
| 2003/0095557 | A1 | 5/2003 | Keller | |
| 2004/0029553 | A1 | 2/2004 | Cain | |
| 2004/0162853 | A1 | 8/2004 | Brodersen | |
| 2004/0218582 | A1 * | 11/2004 | Kennedy | H04W 28/26 |
| | | | | 370/351 |
| 2005/0078672 | A1 * | 4/2005 | Caliskan | H04W 28/02 |
| | | | | 370/389 |
| 2005/0188107 | A1 * | 8/2005 | Piercey | H04L 12/2854 |
| | | | | 709/238 |
| 2005/0190717 | A1 * | 9/2005 | Shu | H04L 45/00 |
| | | | | 370/328 |
| 2006/0221860 | A1 * | 10/2006 | Manasse | H04L 12/66 |
| | | | | 370/254 |
| 2007/0237101 | A1 * | 10/2007 | Cohen | H04W 4/027 |
| | | | | 340/425.5 |
| 2008/0133456 | A1 * | 6/2008 | Richards | G06F 16/2455 |
| 2008/0318547 | A1 * | 12/2008 | Ballou, Jr. | H04L 67/06 |
| | | | | 455/410 |
| 2009/0003216 | A1 * | 1/2009 | Radunovic | H04L 47/15 |
| | | | | 370/237 |
| 2009/0037923 | A1 * | 2/2009 | Smith | G06F 16/24539 |
| | | | | 718/104 |
| 2009/0063893 | A1 | 3/2009 | Bagepalli | |
| 2009/0183167 | A1 | 7/2009 | Kupferschmidt | |
| 2009/0215411 | A1 * | 8/2009 | Tucker | H04W 76/45 |
| | | | | 455/90.2 |
| 2009/0285213 | A1 * | 11/2009 | Chen | H04W 40/28 |
| | | | | 370/392 |
| 2010/0077481 | A1 * | 3/2010 | Polyakov | G06F 21/568 |
| | | | | 726/24 |
| 2010/0082577 | A1 | 4/2010 | Mirchandani | |
| 2010/0142448 | A1 * | 6/2010 | Schlicht | H04W 28/021 |
| | | | | 370/328 |
| 2010/0241646 | A1 | 9/2010 | Friedman | |
| 2010/0274983 | A1 | 10/2010 | Murphy | |
| 2010/0304666 | A1 * | 12/2010 | Hottinen | H04B 7/155 |
| | | | | 455/73 |
| 2010/0312756 | A1 | 12/2010 | Zhang | |
| 2011/0026451 | A1 * | 2/2011 | Cui | H04B 7/155 |
| | | | | 370/315 |
| 2011/0219169 | A1 | 9/2011 | Zhang | |
| 2012/0109888 | A1 | 5/2012 | Zhang | |
| 2012/0151118 | A1 * | 6/2012 | Flynn | |
| 2012/0155389 | A1 * | 6/2012 | McNamee | H04L 67/63 |
| | | | | 370/328 |
| 2012/0185866 | A1 | 7/2012 | Couvee | |
| 2012/0252355 | A1 * | 10/2012 | Huang | H04W 36/0033 |
| | | | | 455/7 |
| 2012/0254252 | A1 | 10/2012 | Jin | |
| 2012/0311246 | A1 | 12/2012 | Mcwilliams | |
| 2013/0064357 | A1 * | 3/2013 | Hao | H04M 3/537 |
| | | | | 379/88.11 |
| 2013/0322321 | A1 * | 12/2013 | Zhang | H04L 1/0076 |
| | | | | 370/315 |
| 2013/0332484 | A1 | 12/2013 | Gajic | |
| 2013/0339407 | A1 * | 12/2013 | Sharpe | G06F 16/137 |
| | | | | 707/827 |
| 2014/0006354 | A1 * | 1/2014 | Parkison | G06F 3/0635 |
| | | | | 707/661 |
| 2014/0006357 | A1 * | 1/2014 | Davis | G06F 16/182 |
| | | | | 707/667 |
| 2014/0006465 | A1 * | 1/2014 | Davis | G06F 16/1752 |
| | | | | 707/827 |
| 2014/0007239 | A1 * | 1/2014 | Sharpe | G06F 16/183 |
| | | | | 726/24 |
| 2014/0047095 | A1 | 2/2014 | Breternitz | |
| 2014/0115319 | A1 | 4/2014 | May | |
| 2014/0136510 | A1 | 5/2014 | Parkkinen | |
| 2014/0188841 | A1 | 7/2014 | Sun | |
| 2015/0205607 | A1 | 7/2015 | Lindholm | |
| 2015/0212838 | A1 * | 7/2015 | Pirvu | G06F 8/4441 |
| | | | | 717/148 |
| 2015/0244804 | A1 * | 8/2015 | Warfield | H04L 49/9078 |
| | | | | 709/219 |
| 2015/0248366 | A1 | 9/2015 | Bergsten | |
| 2015/0293966 | A1 | 10/2015 | Cai | |
| 2015/0310045 | A1 | 10/2015 | Konik | |
| 2016/0021599 | A1 * | 1/2016 | Fitzek | H04W 40/248 |
| | | | | 370/310 |
| 2016/0034547 | A1 | 2/2016 | Lerios | |
| 2017/0026263 | A1 * | 1/2017 | Gell | H04L 67/1023 |
| 2017/0208490 | A1 * | 7/2017 | Lu | H04W 76/14 |
| 2017/0255663 | A1 * | 9/2017 | Woschitz | G06F 16/1748 |
| 2017/0303159 | A1 * | 10/2017 | Ma | H04L 1/0001 |
| 2018/0006796 | A1 * | 1/2018 | Hui | H04B 7/15557 |
| 2018/0025025 | A1 * | 1/2018 | Davis | G06F 16/182 |
| | | | | 709/219 |
| 2018/0159951 | A1 * | 6/2018 | Bender | H04L 47/2433 |
| 2018/0309636 | A1 * | 10/2018 | Strom | H04L 43/08 |
| 2018/0343200 | A1 * | 11/2018 | Jana | H04L 43/0876 |
| 2020/0136667 | A1 * | 4/2020 | Gerszberg | H04L 12/2878 |
| 2020/0236038 | A1 * | 7/2020 | Liu | H04L 45/302 |
| 2020/0259633 | A1 * | 8/2020 | Gallagher-Lynch | |
| | | | | H04L 9/3297 |
| 2021/0092095 | A1 * | 3/2021 | Kim | H04L 63/0876 |

OTHER PUBLICATIONS

Alechina, N. (2006-2007). B-Trees. School of Computer Science, University of Nottingham, http://www.cs.nott.ac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci57212011Spring/presentations/Taheriyan.pptx.

International Searching Authority; International Search Report and Written Opinion; International Application No. PCT/US2017/054773; Feb. 13, 2018; 17 pgs.

International Searching Authority; International Search Report and Written Opinion; International Application No. PCT/US2017/054784; Dec. 28, 2017; 10 pgs.

(56) References Cited

OTHER PUBLICATIONS

International Searching Authority; International Search Report and Written Opinion; International Application No. PCT/US2017/066145; Mar. 5, 2018; 13 pgs.
International Searching Authority; International Search Report and Written Opinion; International Application No. PCT/US2017/066169; Mar. 6, 2018; 15 pgs.
International Searching Authority; International Search Report and Written Opinion; International Application No. PCT/US2018/025729; Jun. 27, 2018; 9 pgs.
International Searching Authority; International Search Report and Written Opinion; International Application No. PCT/US2018/034859; Oct. 30, 2018; 8 pgs.
MapReduce: Simplified Data Processing on Large Clusters, OSDI 2004, Jeffrey Dean and Sanjay Ghemawat, Google, Inc., 13 pgs.
Rodero-Merino, L.; Storage of Structured Data: Big Table and HBase, New Trends In Distributed Systems, MSc Software and Systems, Distributed Systems Laboratory; Oct. 17, 2012; 24 pages.
Step 2: Examine the data model and implementation details, 2016, Amazon Web Services, Inc., http://docs.aws.amazon.com/amazondynamodb/latestldeveloperguide!Ti . . . .

\* cited by examiner database system 10 computing device 18 computing device 18 computing device 18 node 37 node 37 node 37

DB OS = DataBase Operating Sysetm
CD OS = computing device operating system node 37 data set 32 columns 80 rows or records

FIG. 21

| segment 1 | segment 2 | segment 3 | segment 4 | segment 5 |
|---|---|---|---|---|
| data & parity section | data & parity section | data & parity section | data & parity section | data & parity section |
| manifest section | manifest section | manifest section | manifest section | manifest section |
| index 0 section | index 0 section | index 0 section | index 0 section | index 0 section |
| • • • | • • • | • • • | • • • | • • • |
| index x section | index x section | index x section | index x section | index x section |
| statistics section | statistics section | statistics section | statistics section | statistics section | segment group

FIG. 23 node A's data block
routing module 2535 node F's data block
routing module 2535

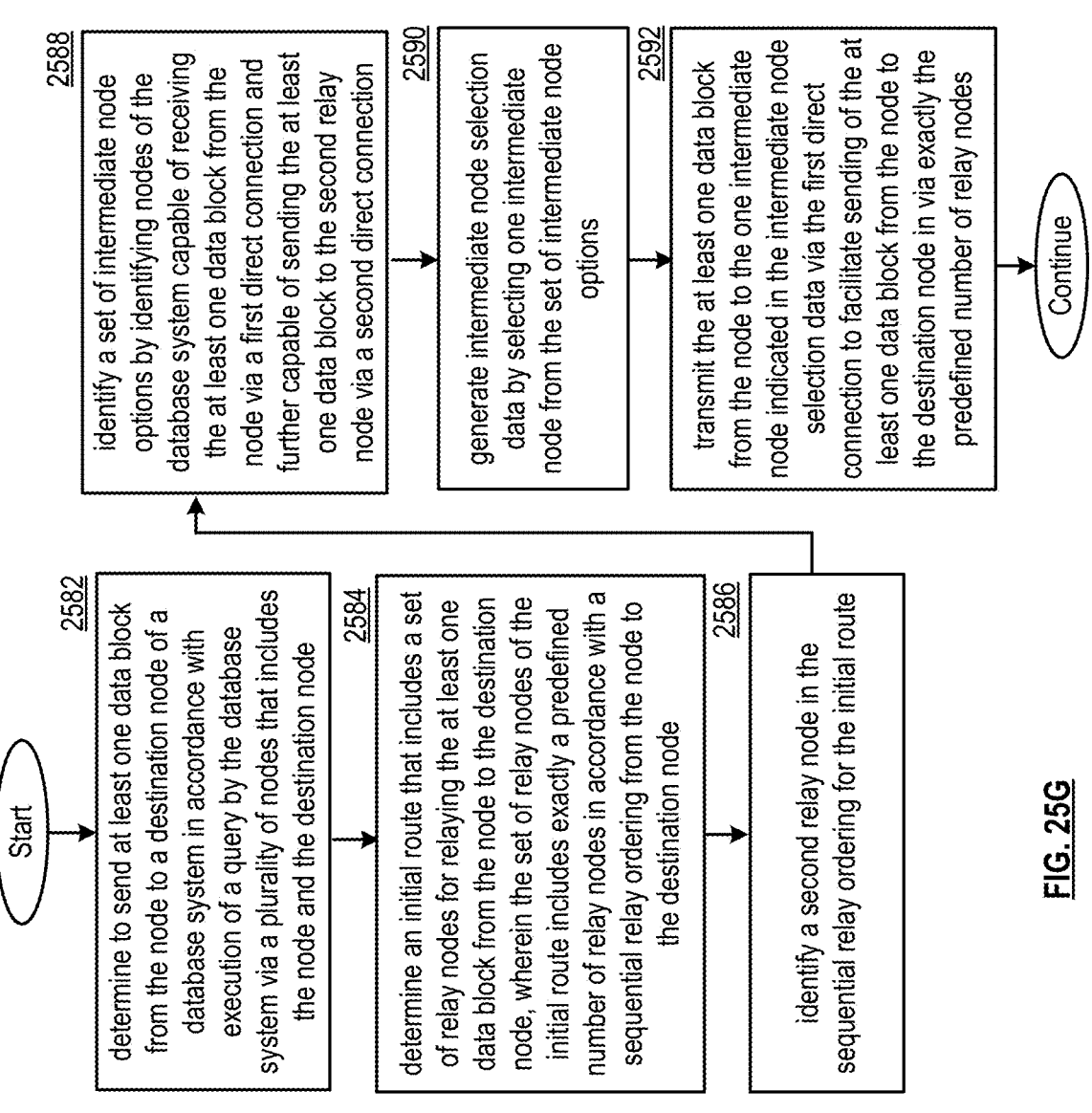

Start 2582
determine to send at least one data block from the node to a destination node of a database system in accordance with execution of a query by the database system via a plurality of nodes that includes the node and the destination node 2584
determine an initial route that includes a set of relay nodes for relaying the at least one data block from the node to the destination node, wherein the set of relay nodes of the initial route includes exactly a predefined number of relay nodes in accordance with a sequential relay ordering from the node to the destination node 2586
identify a second relay node in the sequential relay ordering for the initial route 2588
identify a set of intermediate node options by identifying nodes of the database system capable of receiving the at least one data block from the node via a first direct connection and further capable of sending the at least one data block to the second relay node via a second direct connection 2590
generate intermediate node selection data by selecting one intermediate node from the set of intermediate node options 2592
transmit the at least one data block from the node to the one intermediate node indicated in the intermediate node selection data via the first direct connection to facilitate sending of the at least one data block from the node to the destination node in via exactly the predefined number of relay nodes Continue

FIG. 25G

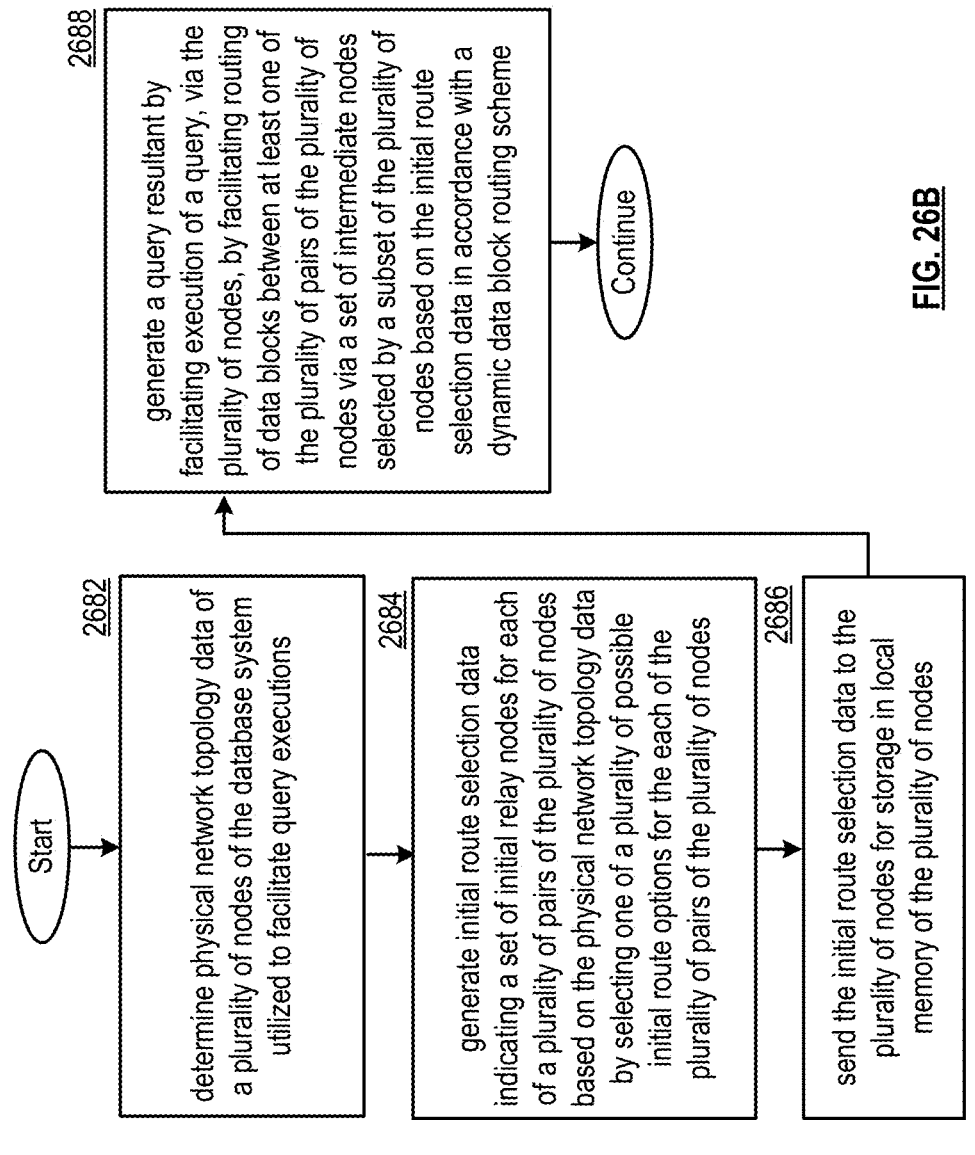

2688 generate a query resultant by facilitating execution of a query, via the plurality of nodes, by facilitating routing of data blocks between at least one of the plurality of pairs of the plurality of nodes via a a set of intermediate nodes selected by a subset of the plurality of nodes based on the initial route selection data in accordance with a dynamic data block routing scheme Continue

2682 determine physical network topology data of a plurality of nodes of the database system utilized to facilitate query executions

2684 generate initial route selection data indicating a set of initial relay nodes for each of a plurality of pairs of the plurality of nodes based on the physical network topology data by selecting one of a plurality of possible initial route options for the each of the plurality of pairs of the plurality of nodes

2686 send the initial route selection data to the plurality of nodes for storage in local memory of the plurality of nodes Start

FIG. 26B

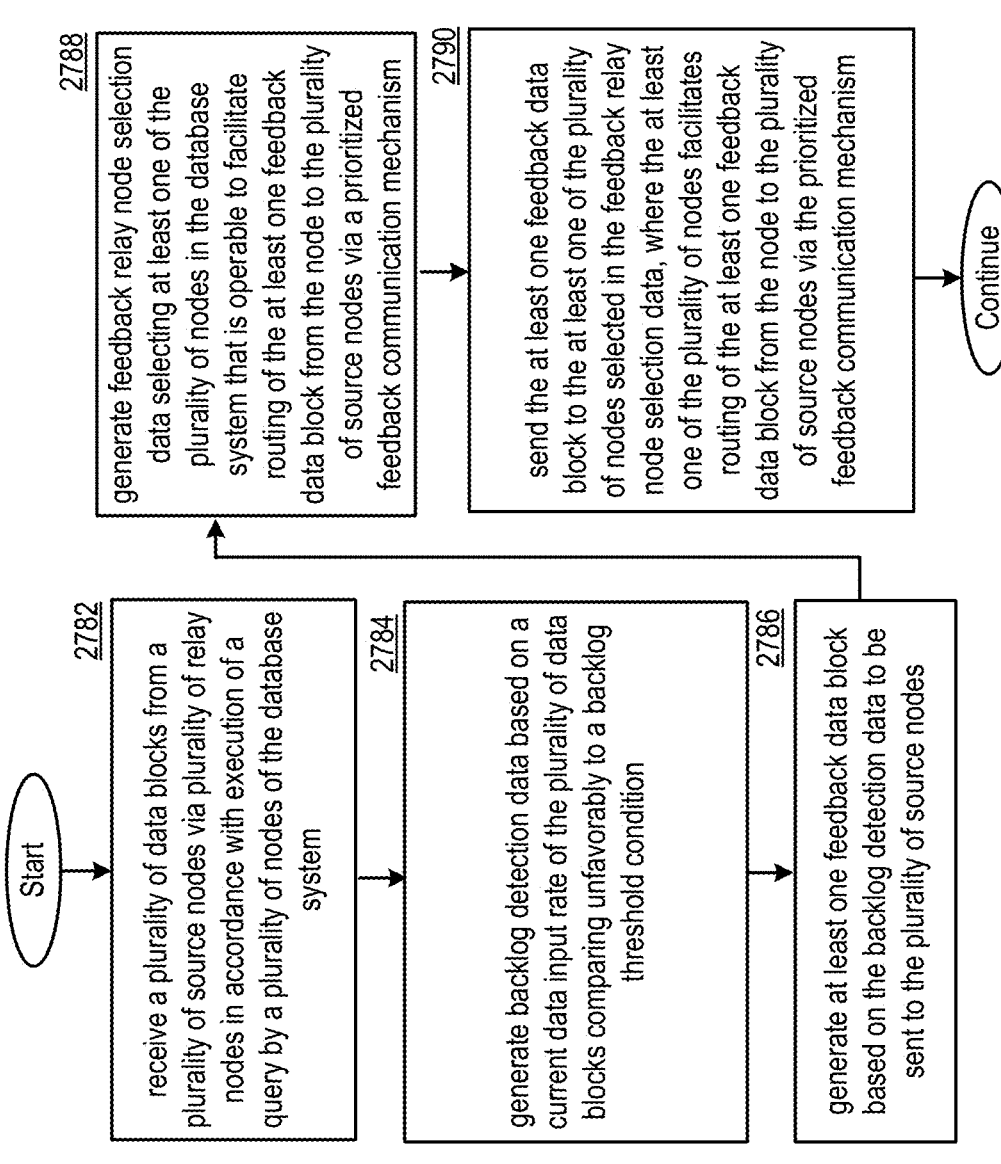

2782 receive a plurality of data blocks from a plurality of source nodes via plurality of relay nodes in accordance with execution of a query by a plurality of nodes of the database system

2784 generate backlog detection data based on a current data input rate of the plurality of data blocks comparing unfavorably to a backlog threshold condition

2786 generate at least one feedback data block based on the backlog detection data to be sent to the plurality of source nodes

2788 generate feedback relay node selection data selecting at least one of the plurality of nodes in the database system that is operable to facilitate routing of the at least one feedback data block from the node to the plurality of source nodes via a prioritized feedback communication mechanism

2790 send the at least one feedback data block to the at least one of the plurality of nodes selected in the feedback relay node selection data, where the at least one of the plurality of nodes facilitates routing of the at least one feedback data block from the node to the plurality of source nodes via the prioritized feedback communication mechanism Start Continue

FIG. 27D

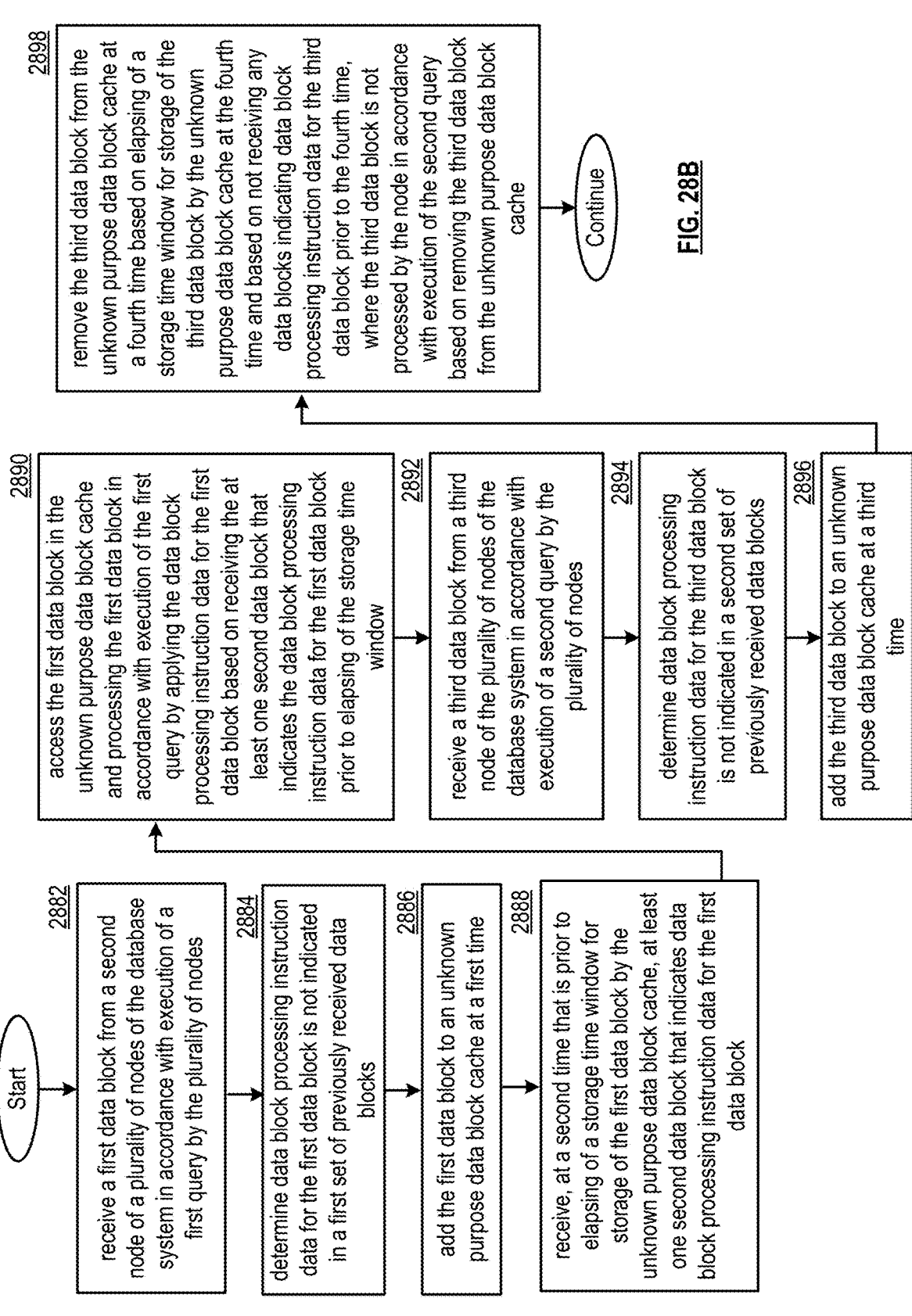

2898 remove the third data block from the unknown purpose data block cache at a fourth time based on elapsing of a storage time window for storage of the third data block by the unknown purpose data block cache at the fourth time and based on not receiving any data blocks indicating data block processing instruction data for the third data block prior to the fourth time, where the third data block is not processed by the node in accordance with execution of the second query based on removing the third data block from the unknown purpose data block cache Continue

2890 access the first data block in the unknown purpose data block cache and processing the first data block in accordance with execution of the first query by applying the data block processing instruction data for the first data block based on receiving the at least one second data block that indicates the data block processing instruction data for the first data block prior to elapsing of the storage time window

2892 receive a third data block from a third node of the plurality of nodes of the database system in accordance with execution of a second query by the plurality of nodes

2894 determine data block processing instruction data for the third data block is not indicated in a second set of previously received data blocks

2896 add the third data block to an unknown purpose data block cache at a third time

Start

2882 receive a first data block from a second node of a plurality of nodes of the database system in accordance with execution of a first query by the plurality of nodes

2884 determine data block processing instruction data for the first data block is not indicated in a first set of previously received data blocks

2886 add the first data block to an unknown purpose data block cache at a first time

2888 receive, at a second time that is prior to elapsing of a storage time window for storage of the first data block by the unknown purpose data block cache, at least one second data block that indicates data block processing instruction data for the first data block

FIG. 28B

ROUTING FEEDBACK DATA BLOCKS VIA A PRIORITIZED FEEDBACK COMMUNICATION MECHANISM BASED ON POWER

CROSS-REFERENCE TO RELATED APPLICATIONS

The present U.S. Utility Patent application claims priority pursuant to 35 U.S.C. § 120 as a continuation of U.S. Utility application Ser. No. 18/538,526, entitled "ROUTING FEEDBACK DATA BLOCKS VIA A PRIORITIZED FEEDBACK COMMUNICATION MECHANISM", filed Dec. 13, 2023, which is a continuation of U.S. Utility application Ser. No. 18/163,457, entitled "UTILIZING A PRIORITIZED FEEDBACK COMMUNICATION MECHANISM BASED ON BACKLOG DETECTION DATA", filed Feb. 2, 2023, issued as U.S. Pat. No. 11,893, 017 on Feb. 6, 2024, which is a continuation of U.S. Utility application Ser. No. 17/645,802, entitled "MAINTAINING AN UNKNOWN PURPOSE DATA BLOCK CACHE IN A DATABASE SYSTEM", filed Dec. 23, 2021, issued as U.S. Pat. No. 11,586,625 on Feb. 21, 2023, which is a continuation of U.S. Utility application Ser. No. 16/829,808, entitled "FACILITATING QUERY EXECUTIONS VIA DYNAMIC DATA BLOCK ROUTING", filed Mar. 25, 2020, issued as U.S. Pat. No. 11,238,041 on Feb. 1, 2022, each of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIGS. 15-23 are schematic block diagrams of an example of processing a table or data set for storage in the database system in accordance with the present invention;

FIG. 25G is a logic diagram illustrating a method of routing data blocks for query execution in accordance with various embodiments of the present invention;

FIG. 26B is a logic diagram illustrating a method of generating initial routes for use in data block routing in accordance with various embodiments of the present invention;

FIG. 27D is a logic diagram illustrating a method of prioritizing routing of feedback data blocks for in accordance with various embodiments of the present invention;

FIG. 28B is a schematic illustrating a method of maintaining a data block cache of data blocks with unknown purpose in accordance with various embodiments of the present invention.

DETAILED DESCRIPTION OF THE INVENTION

Figure 1:
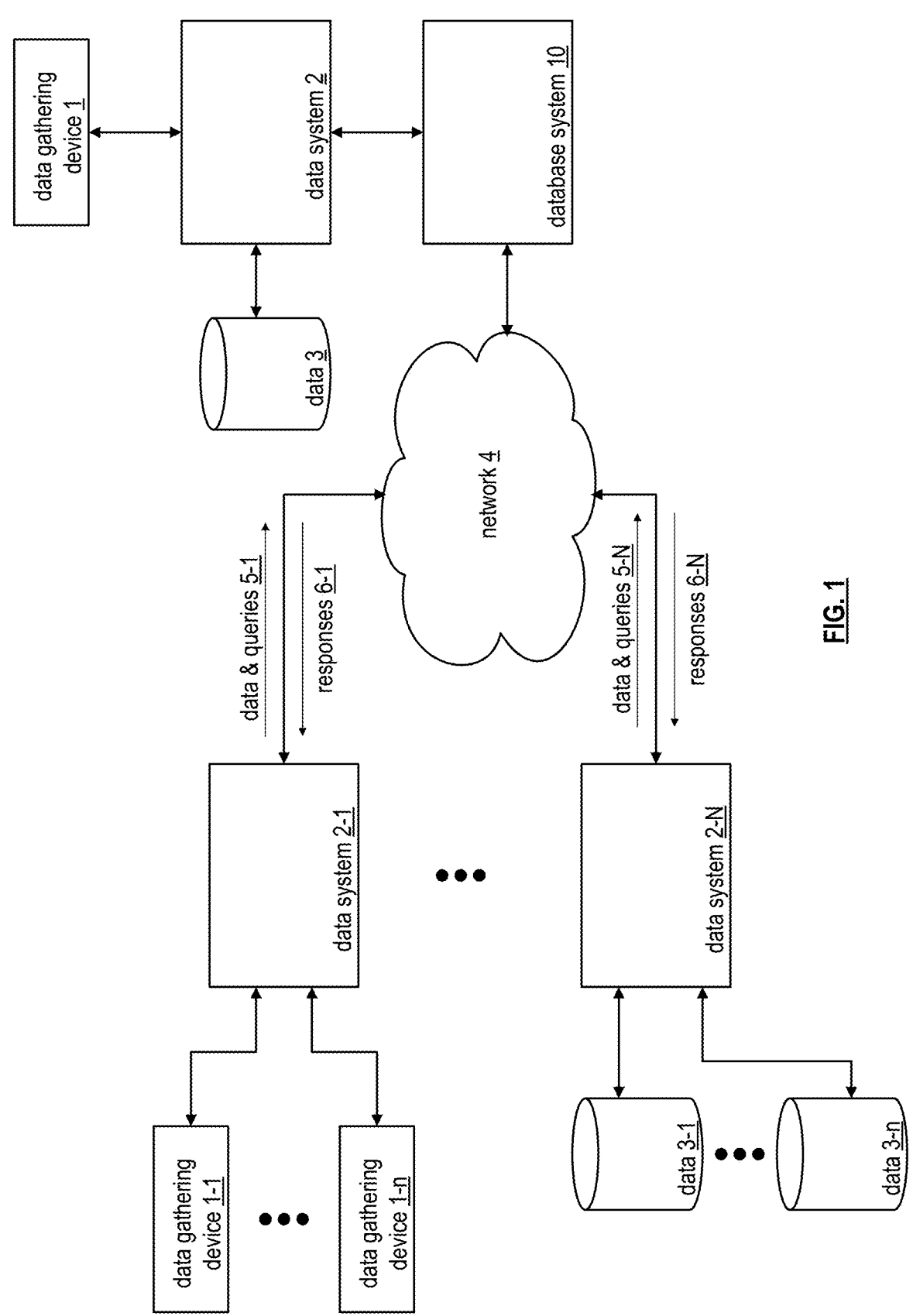
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-$n$), data systems (2, 2-1 through 2-N), data storage systems (3, 3-1 through 3-$n$), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
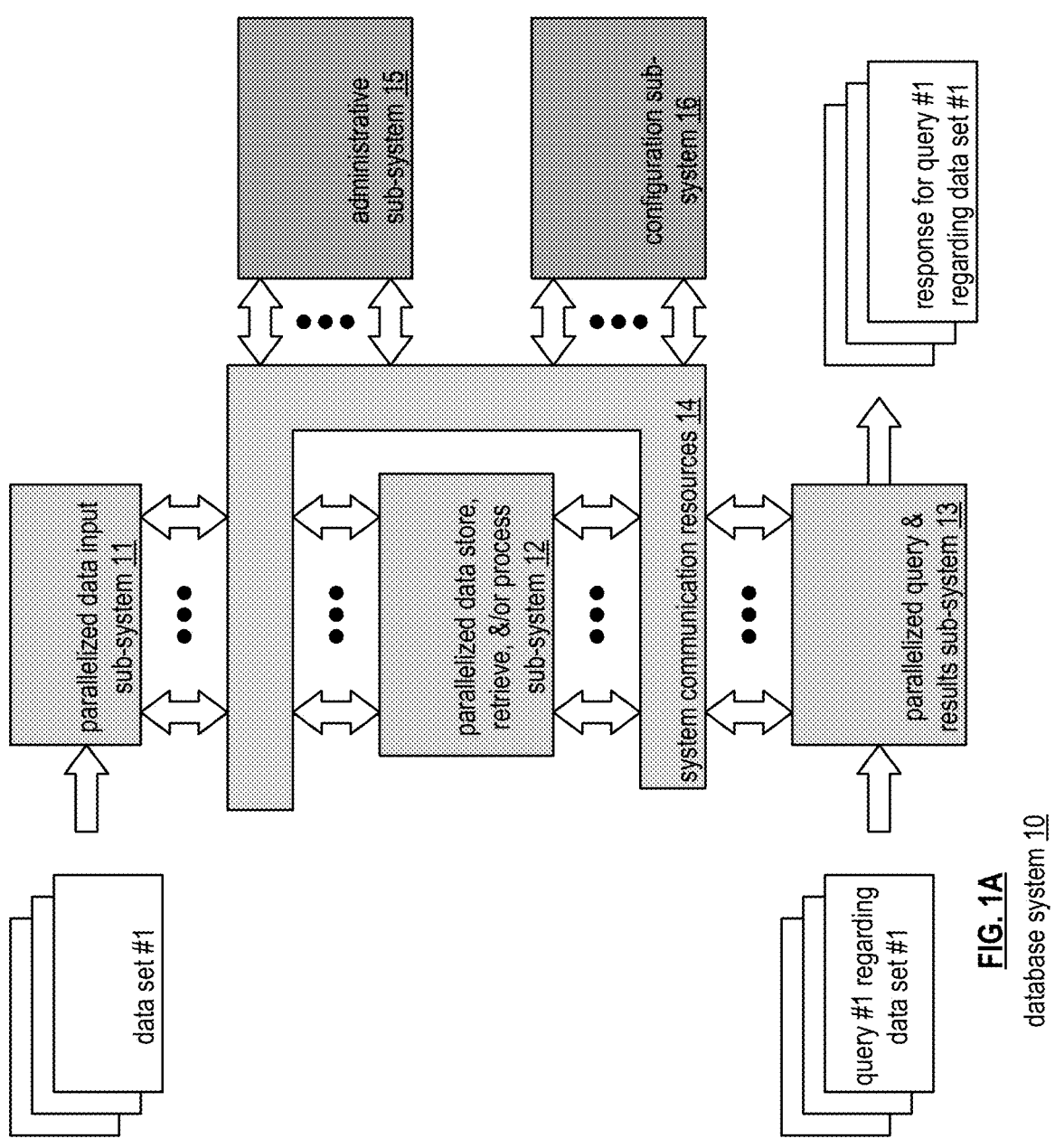
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may also be referred to as a data input sub-system, the parallelized data store, retrieve, and/or process sub-system may also be referred to as a data storage and processing sub-system, and the parallelized query and response sub-system 13 may also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table includes payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18.

The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figures 2, 3:
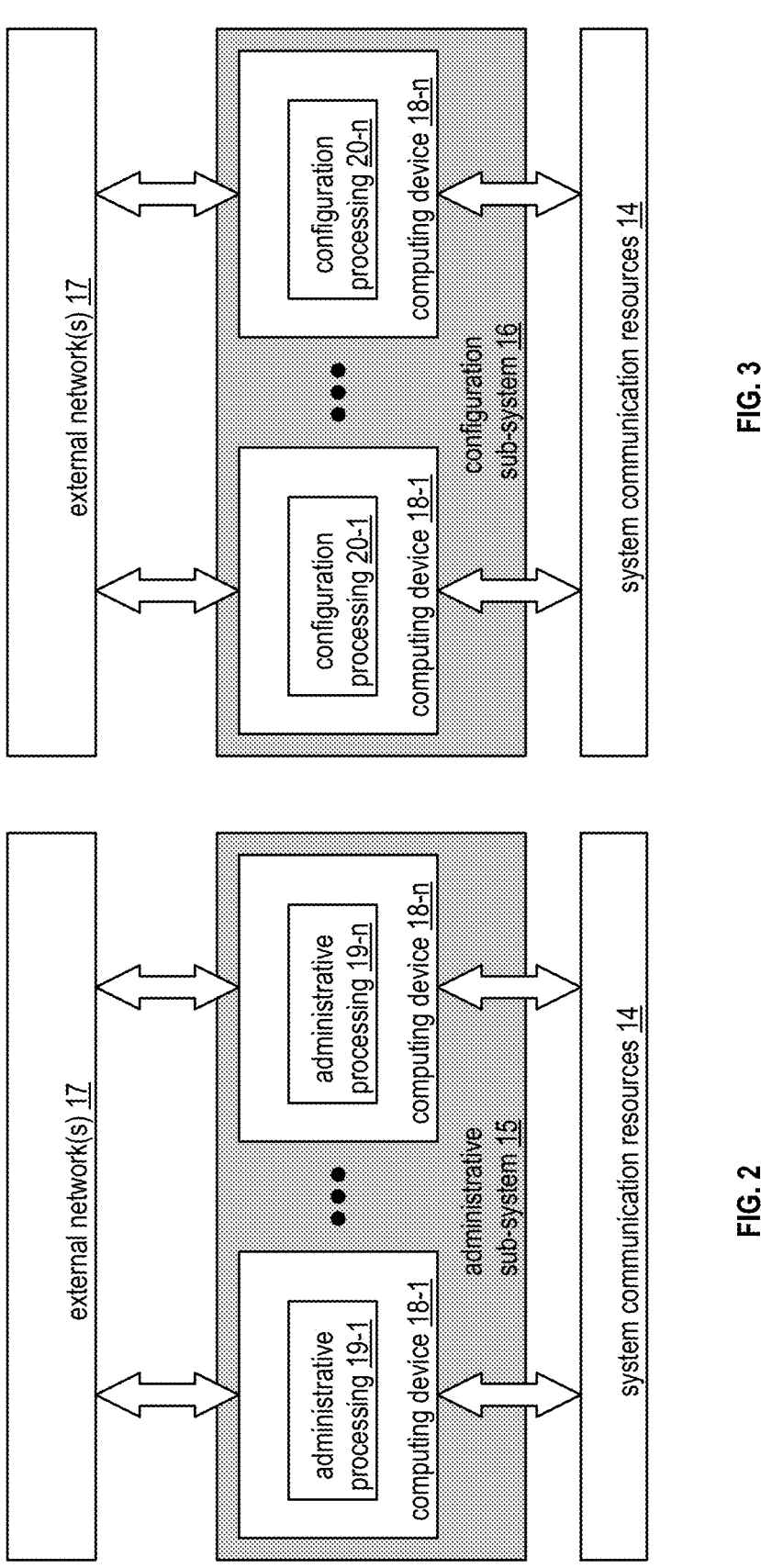
FIG. 2 is a schematic block diagram of an embodiment of an administrative sub-system in accordance with the present invention.
FIG. 3 is a schematic block diagram of an embodiment of a configuration sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

Figure 4:
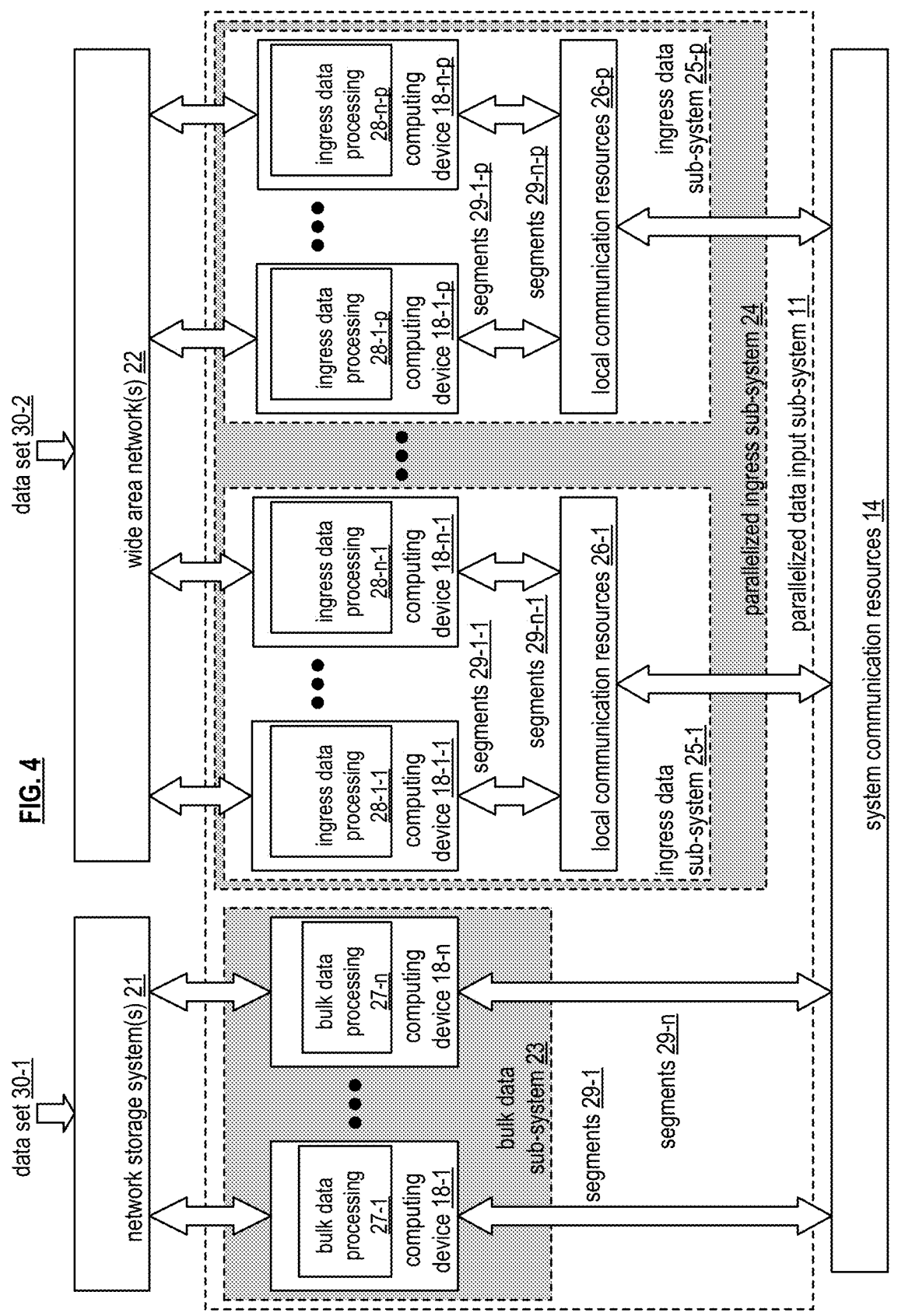
FIG. 4 is a schematic block diagram of an embodiment of a parallelized data input sub-system in accordance with the present invention.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

Figure 5:
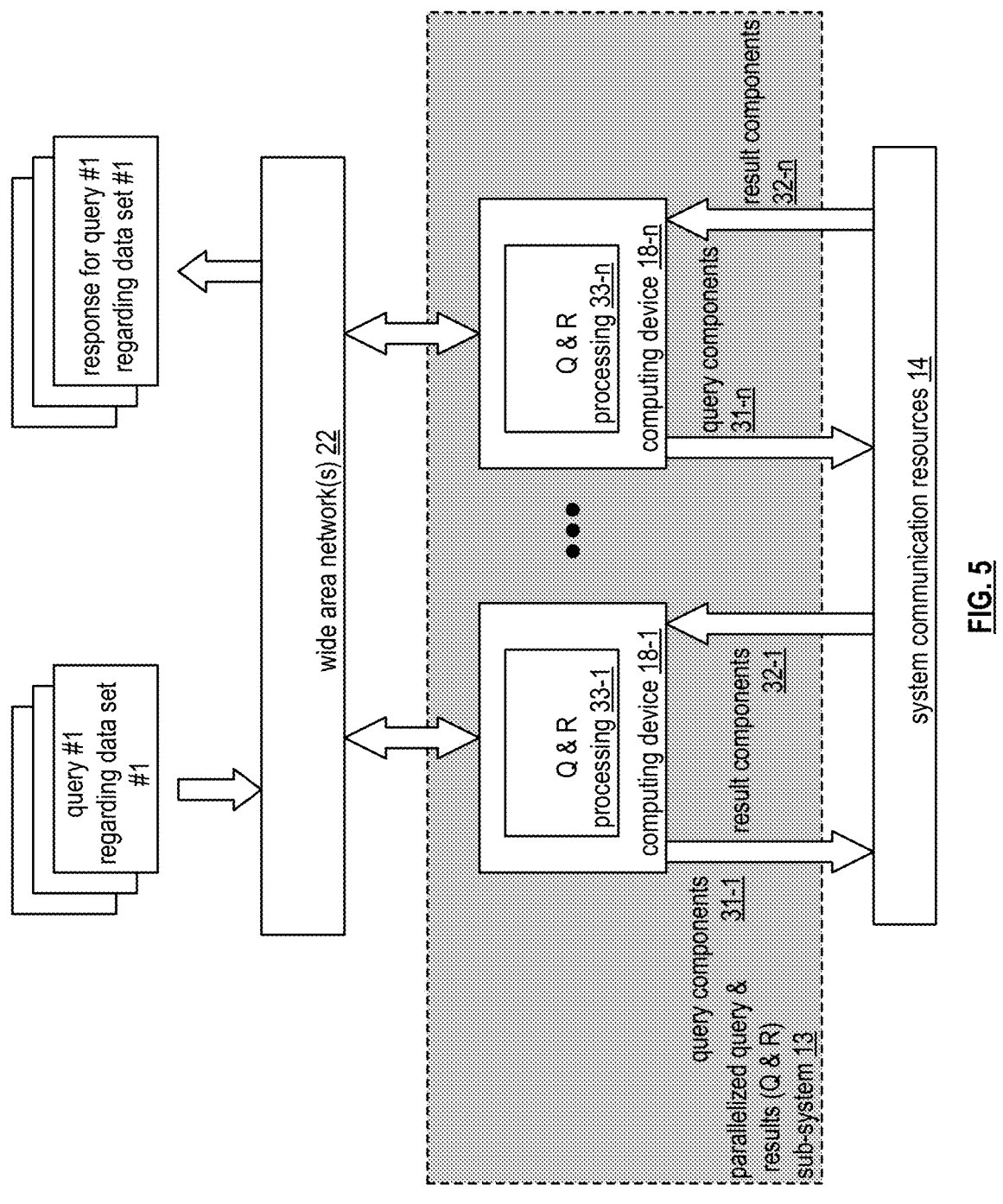
FIG. 5 is a schematic block diagram of an embodiment of a parallelized query and response (Q&R) sub-system in accordance with the present invention.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
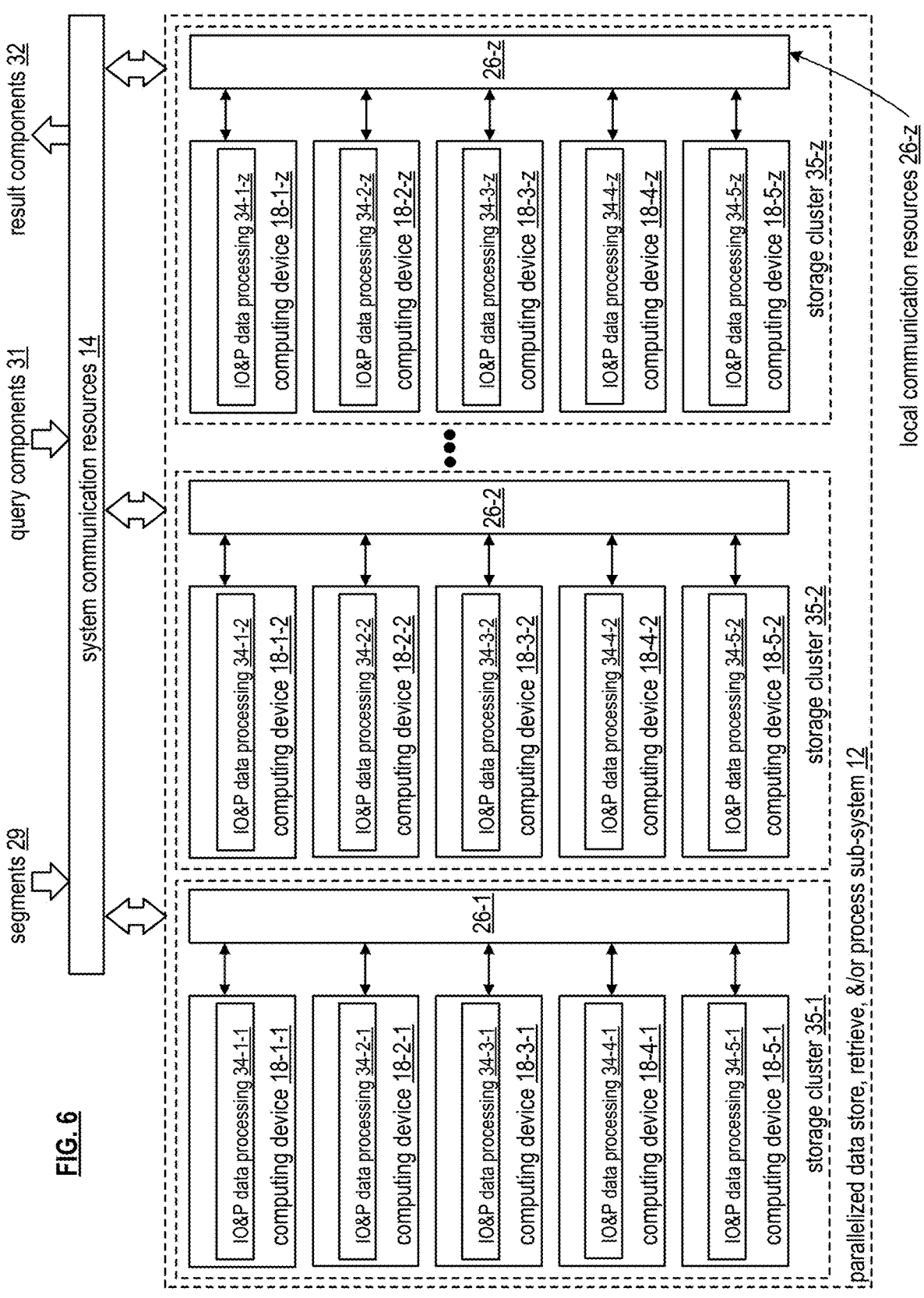
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (IO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
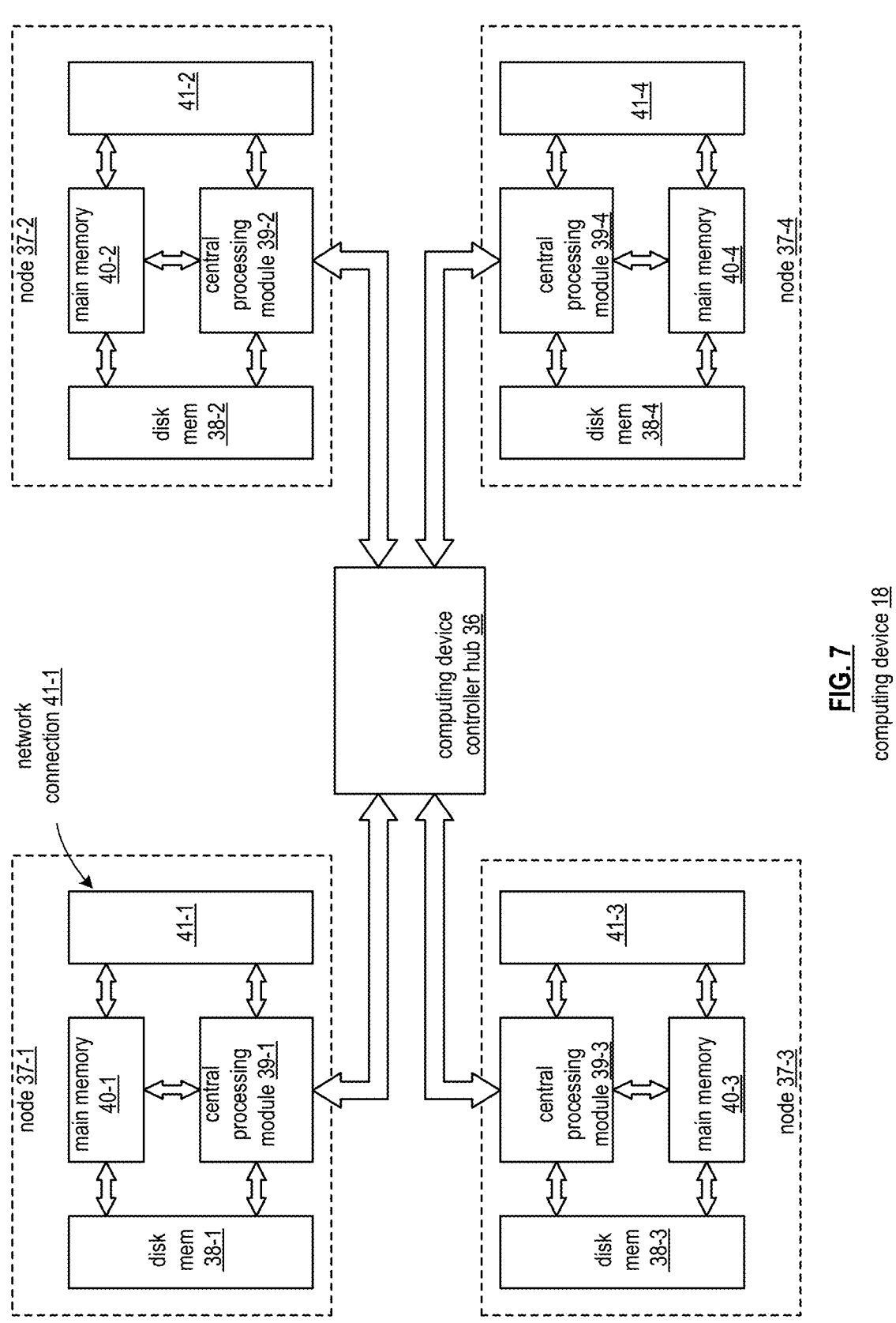
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more nodes function as co-processors to share processing requirements of a particular function, or functions.

Figure 8:
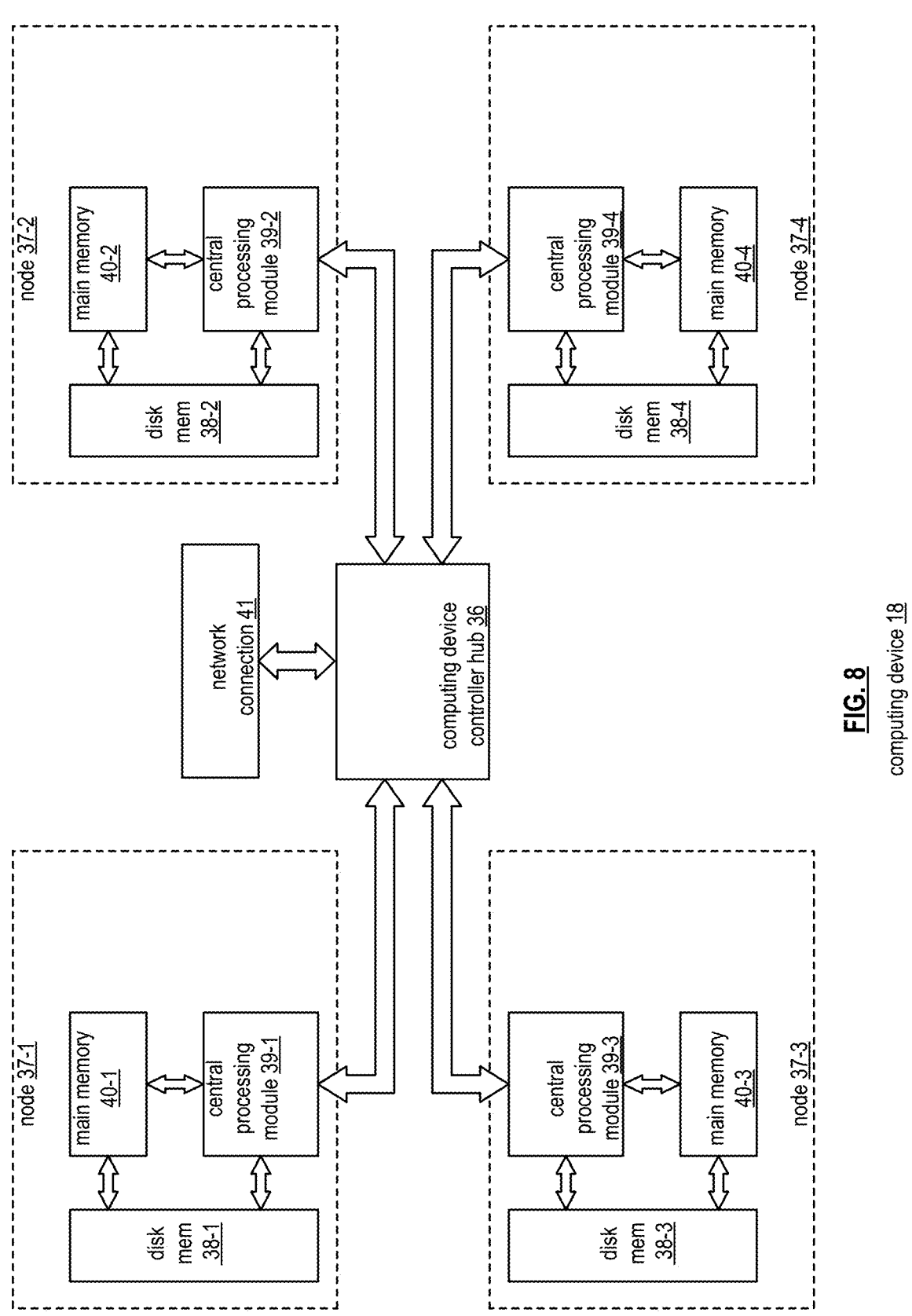
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
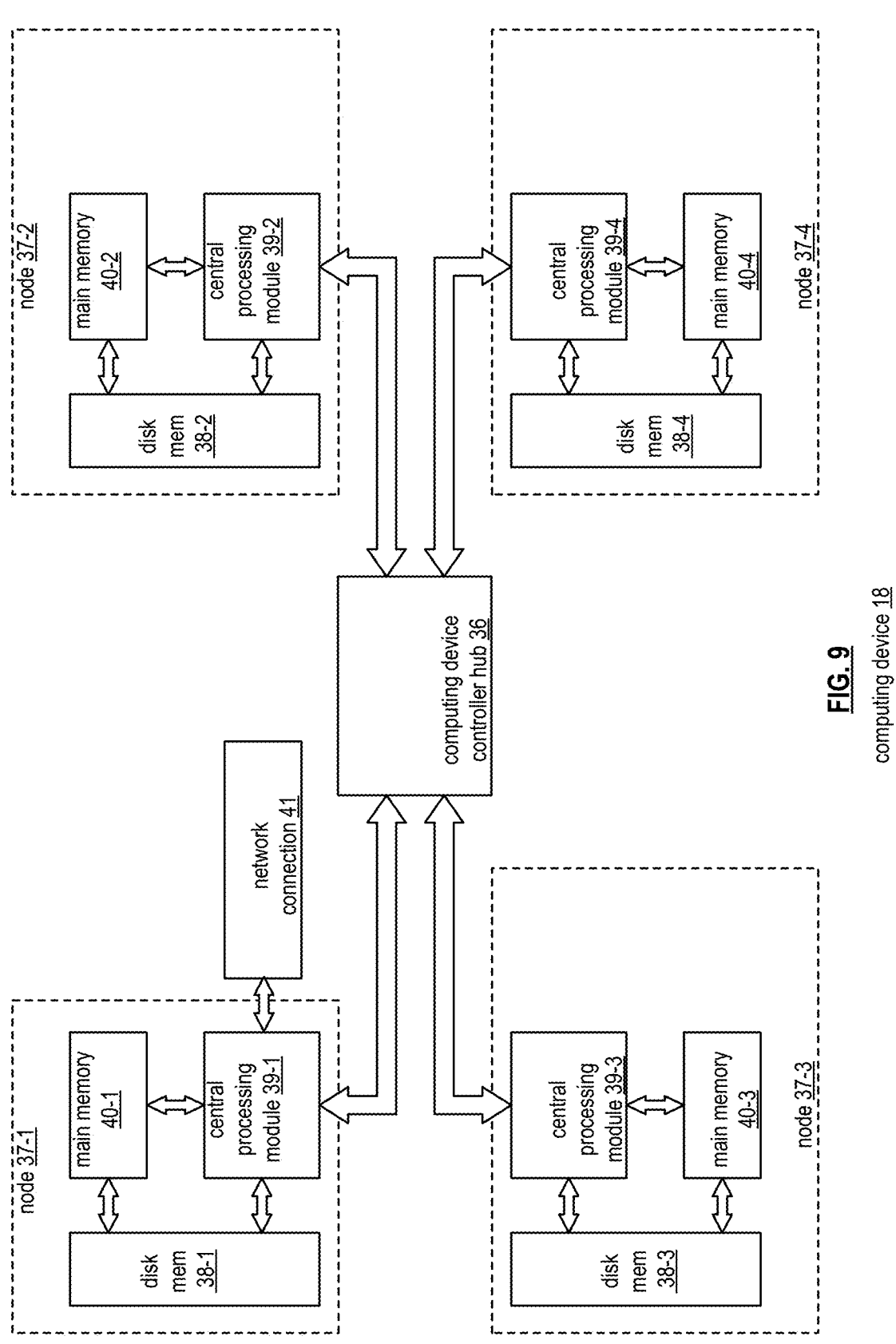
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
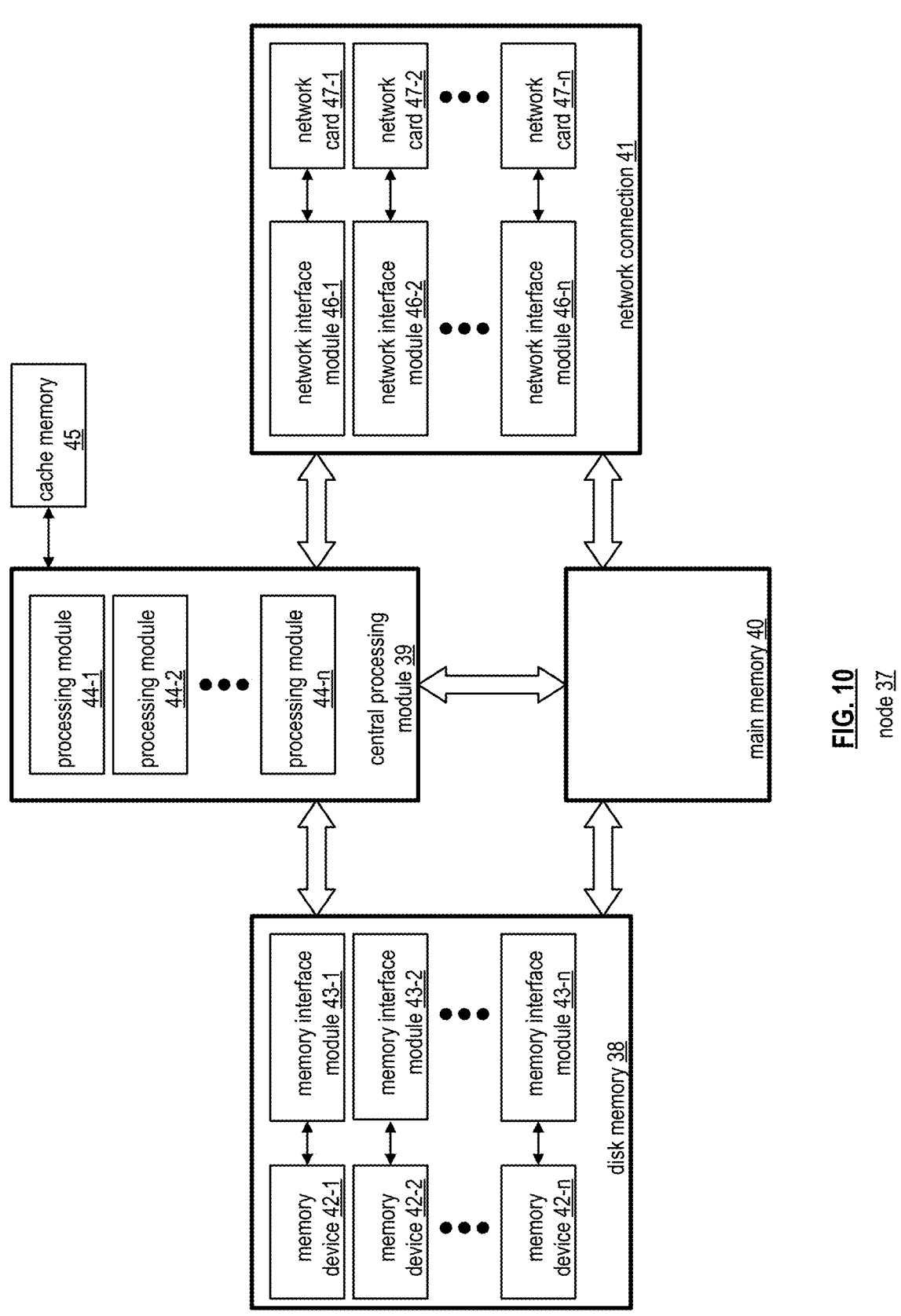
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
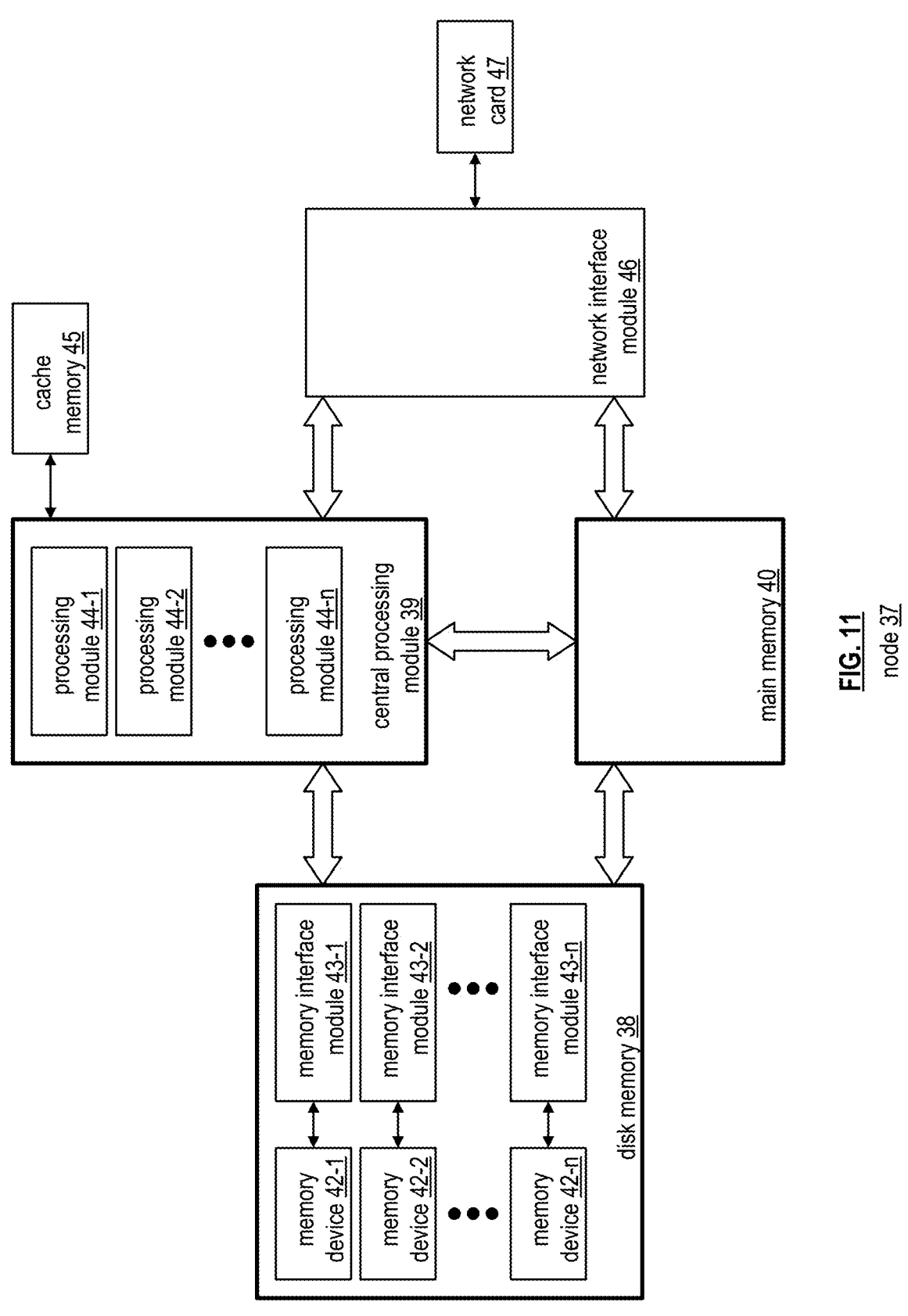
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
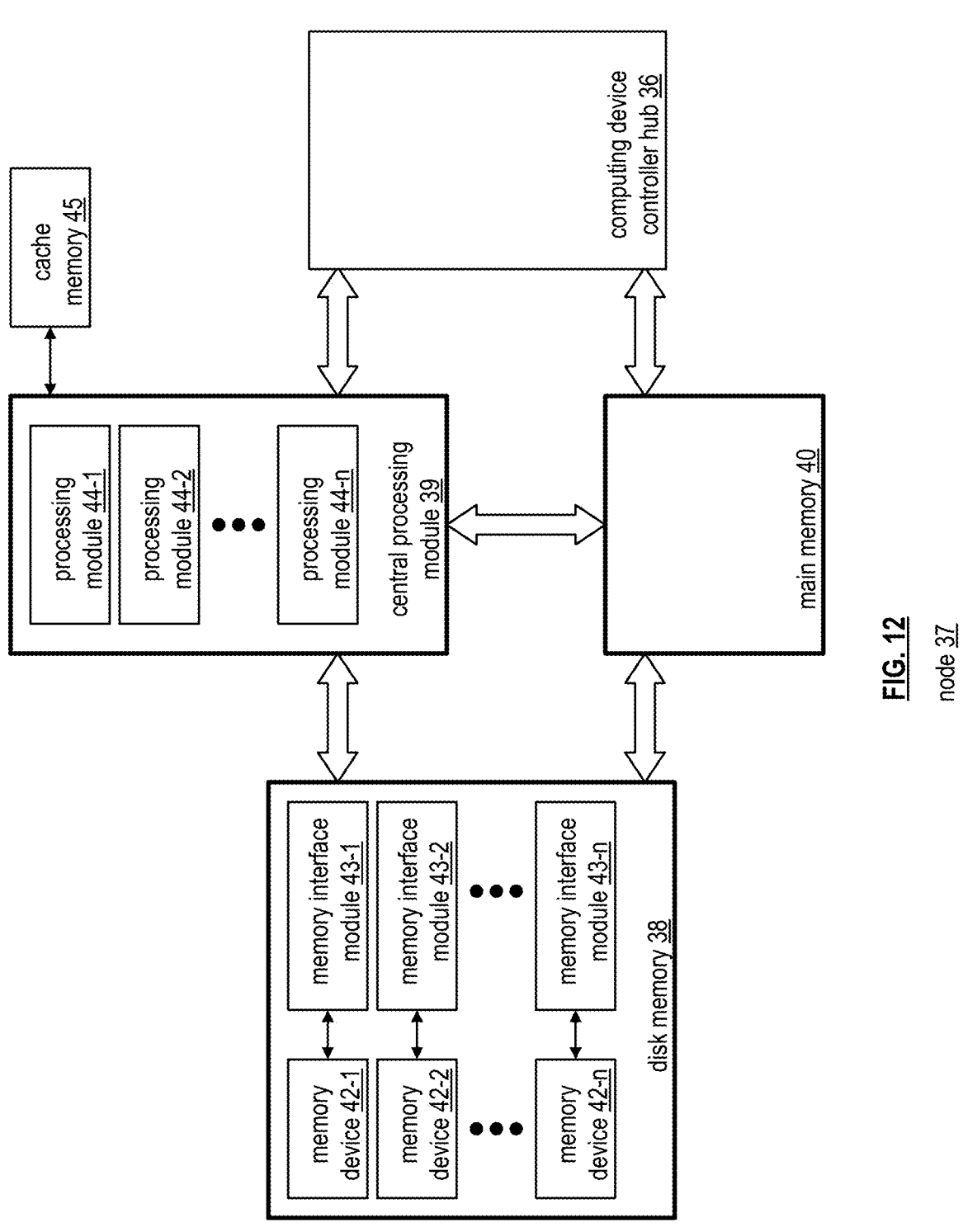
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
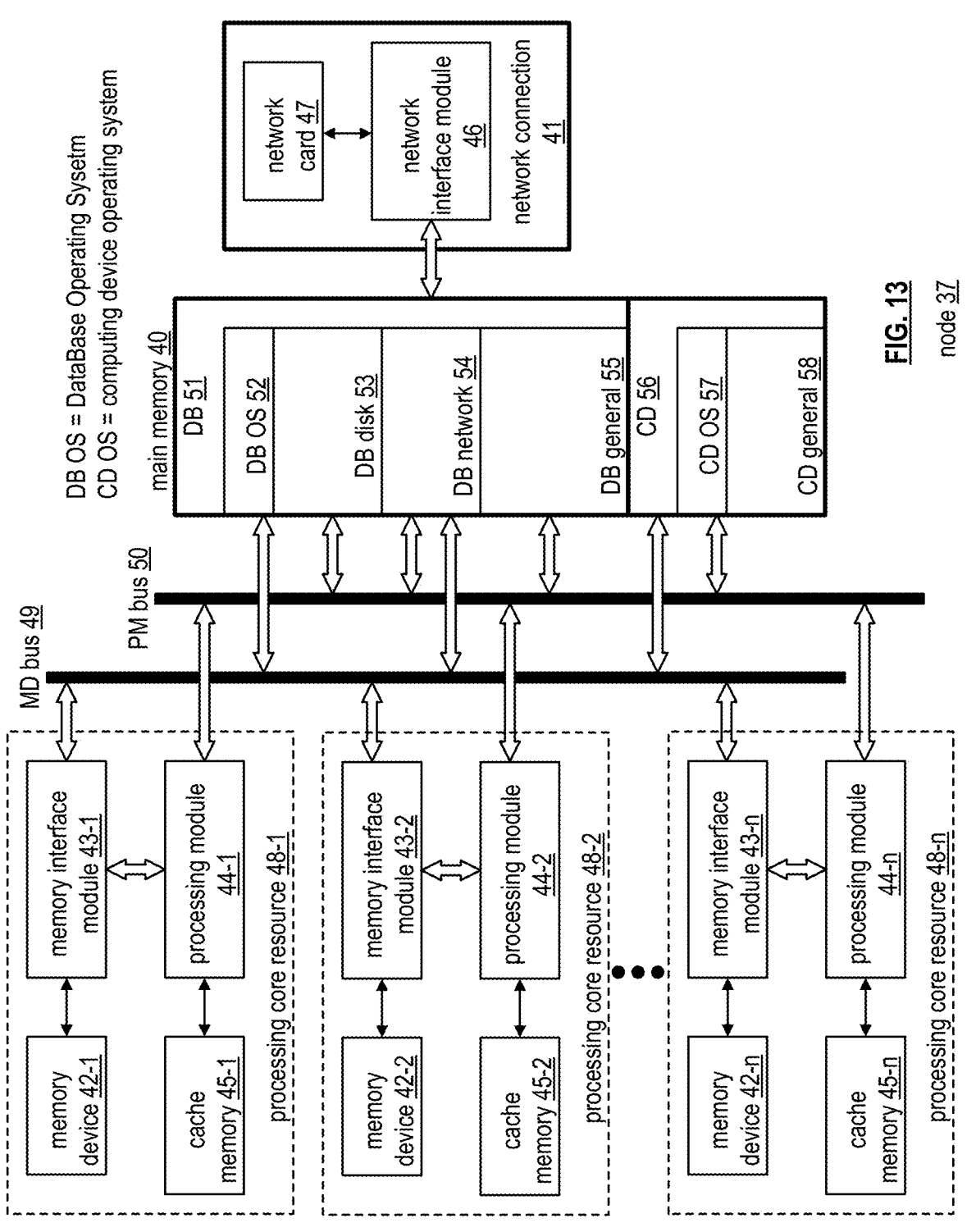
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-*n*, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-*n*, a corresponding memory interface module 43-1 through 43-*n*, a corresponding memory device 42-1 through 42-*n*, and a corresponding cache memory 45-1 through 45-*n*. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
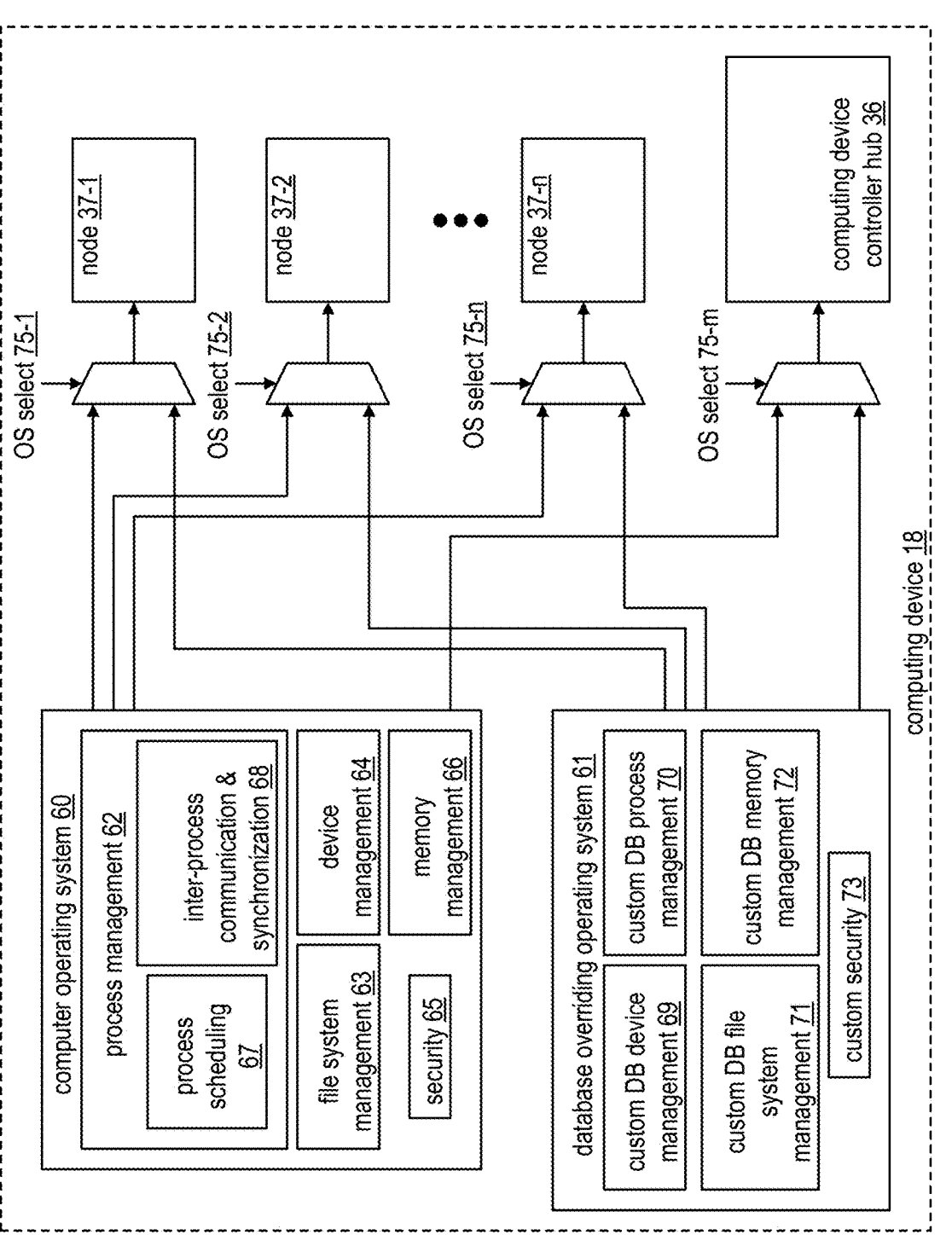
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
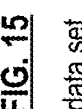

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
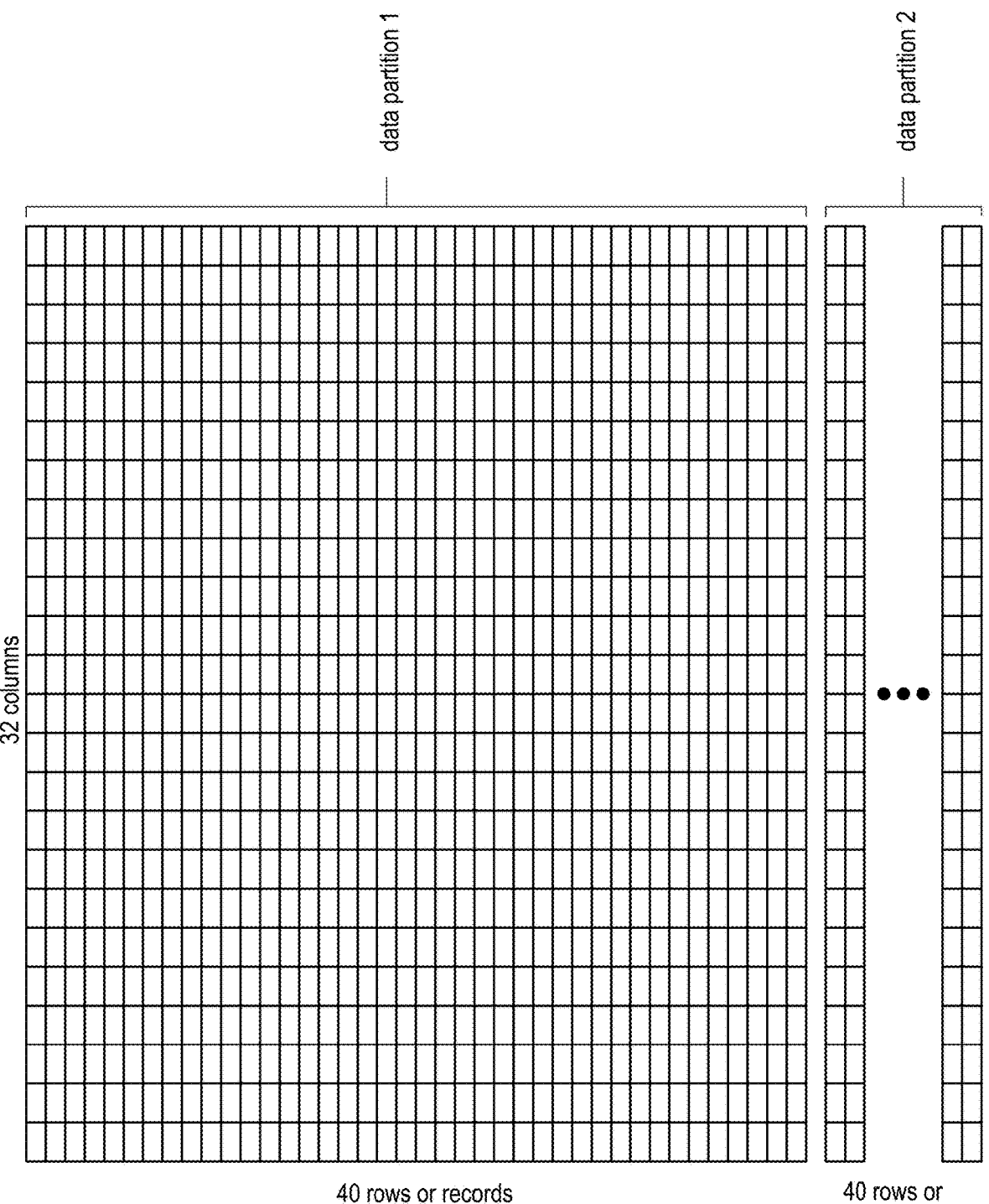

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
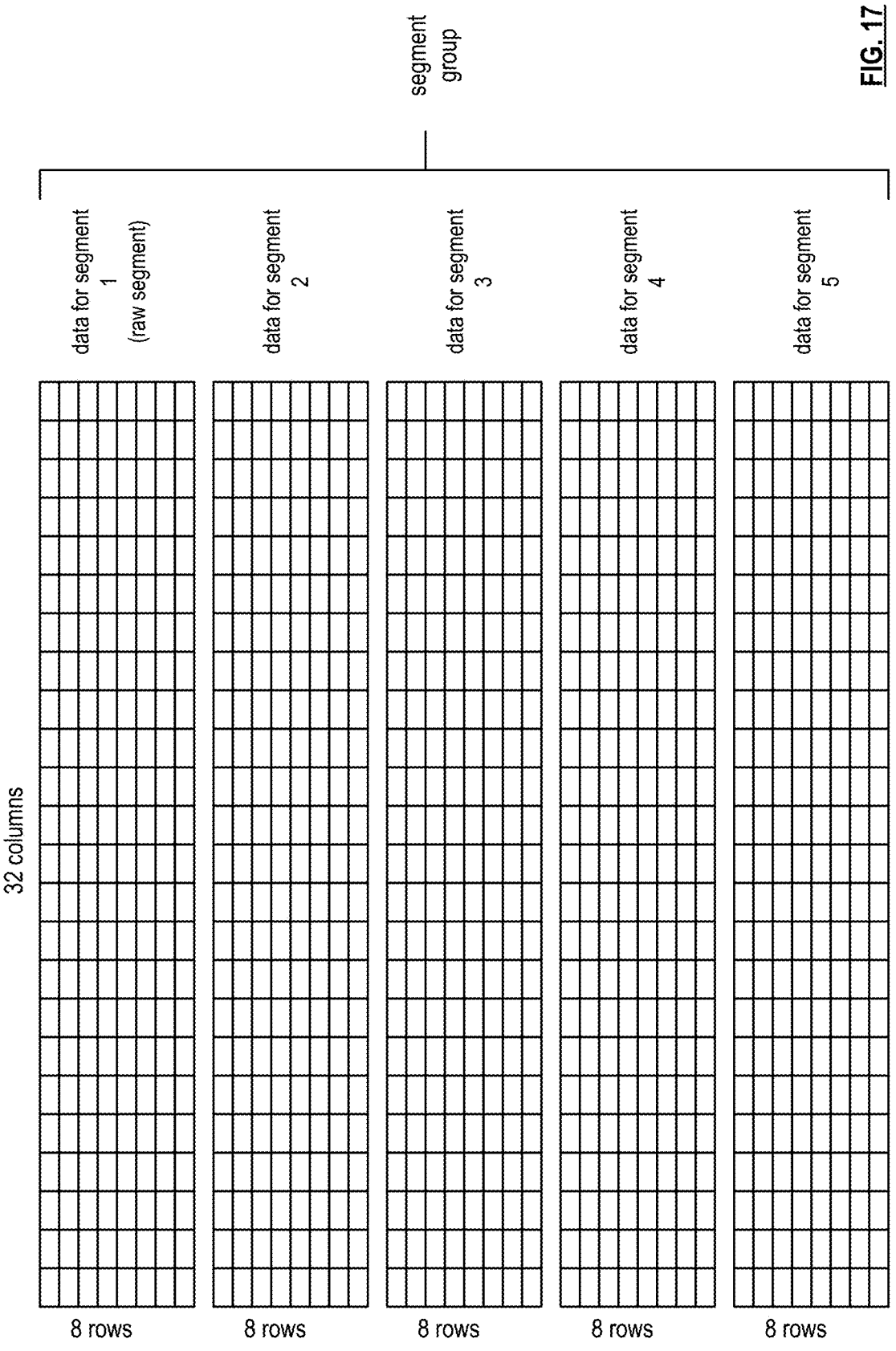

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

Figures 18, 19, 20:
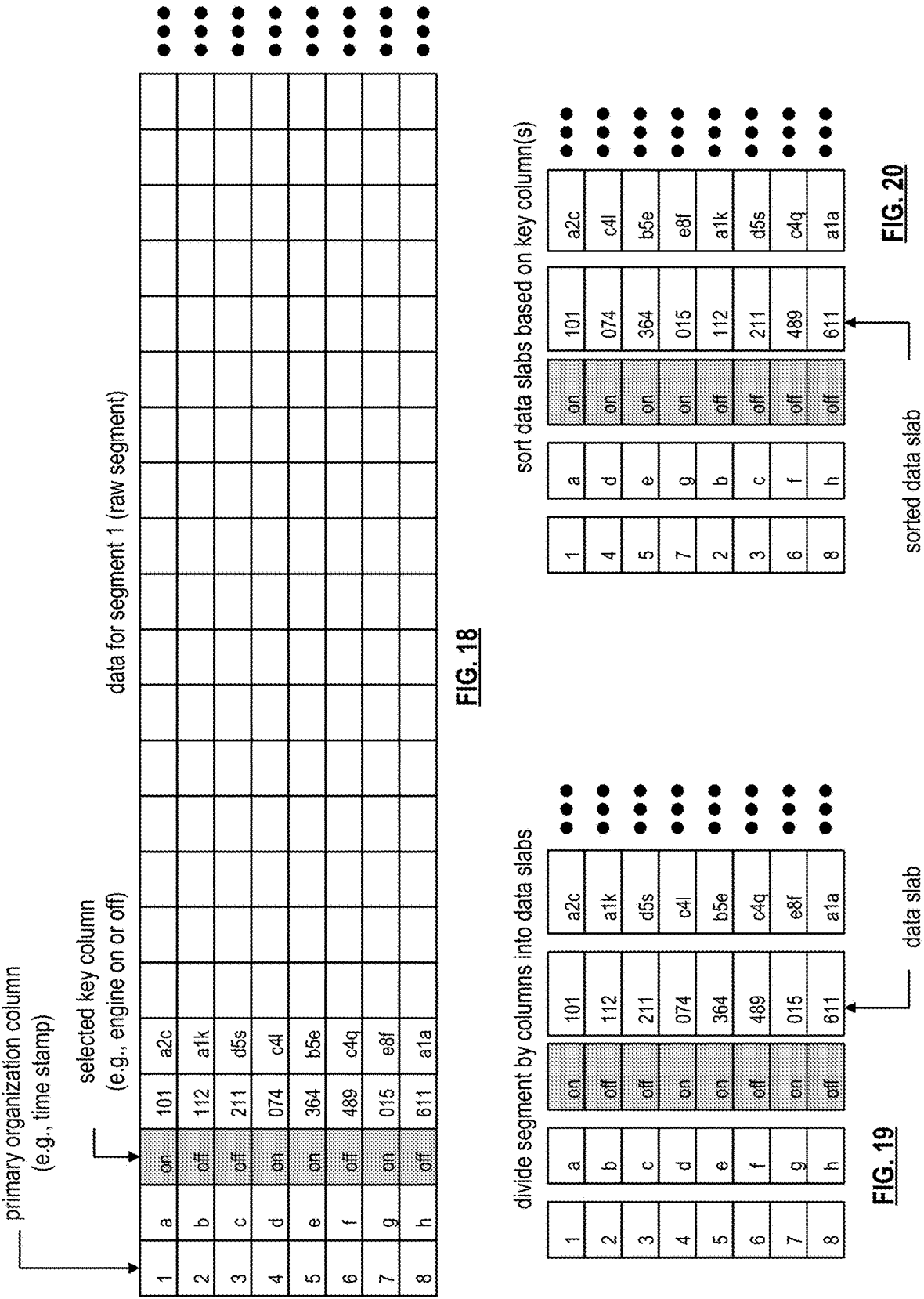

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
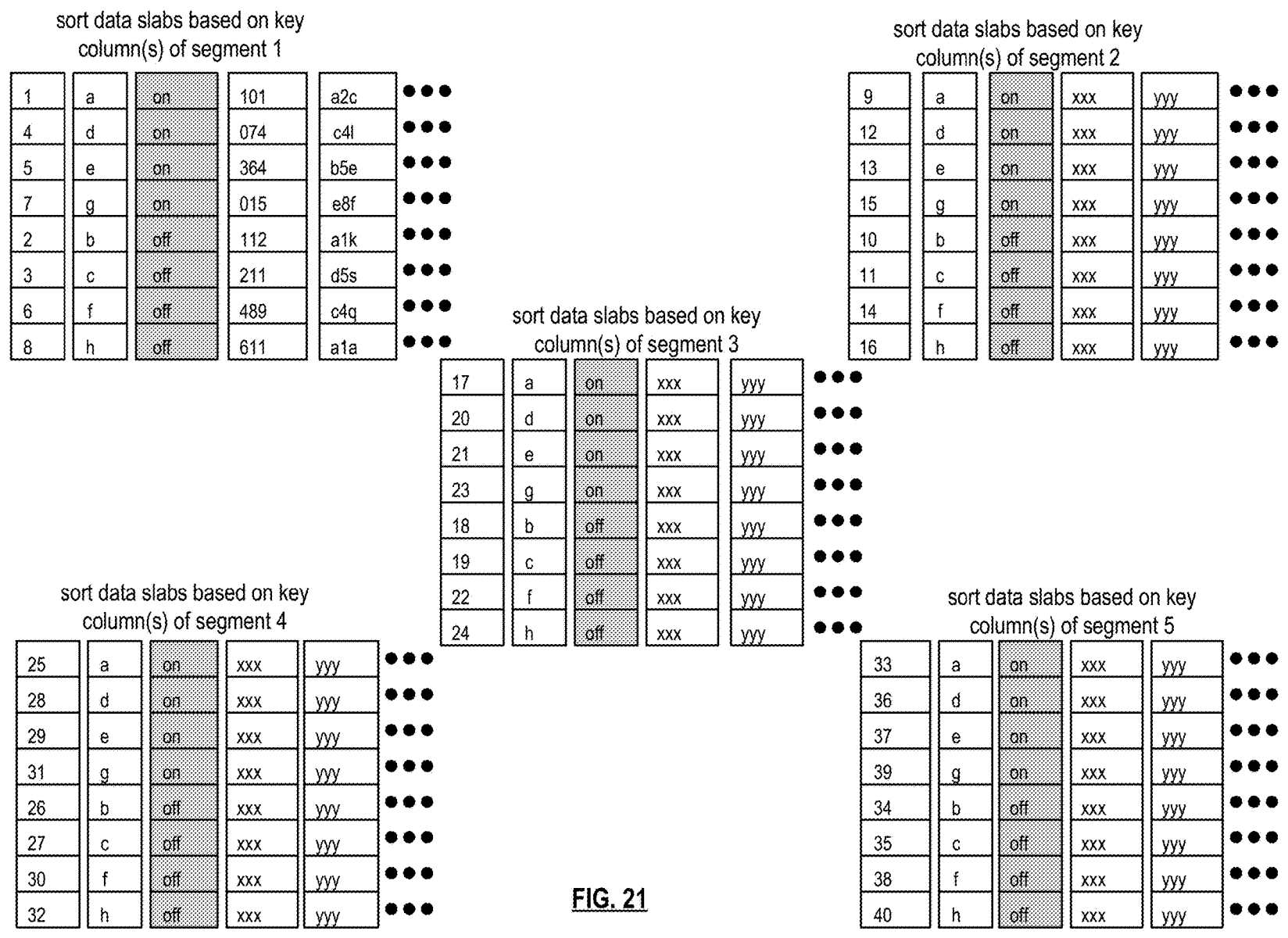

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
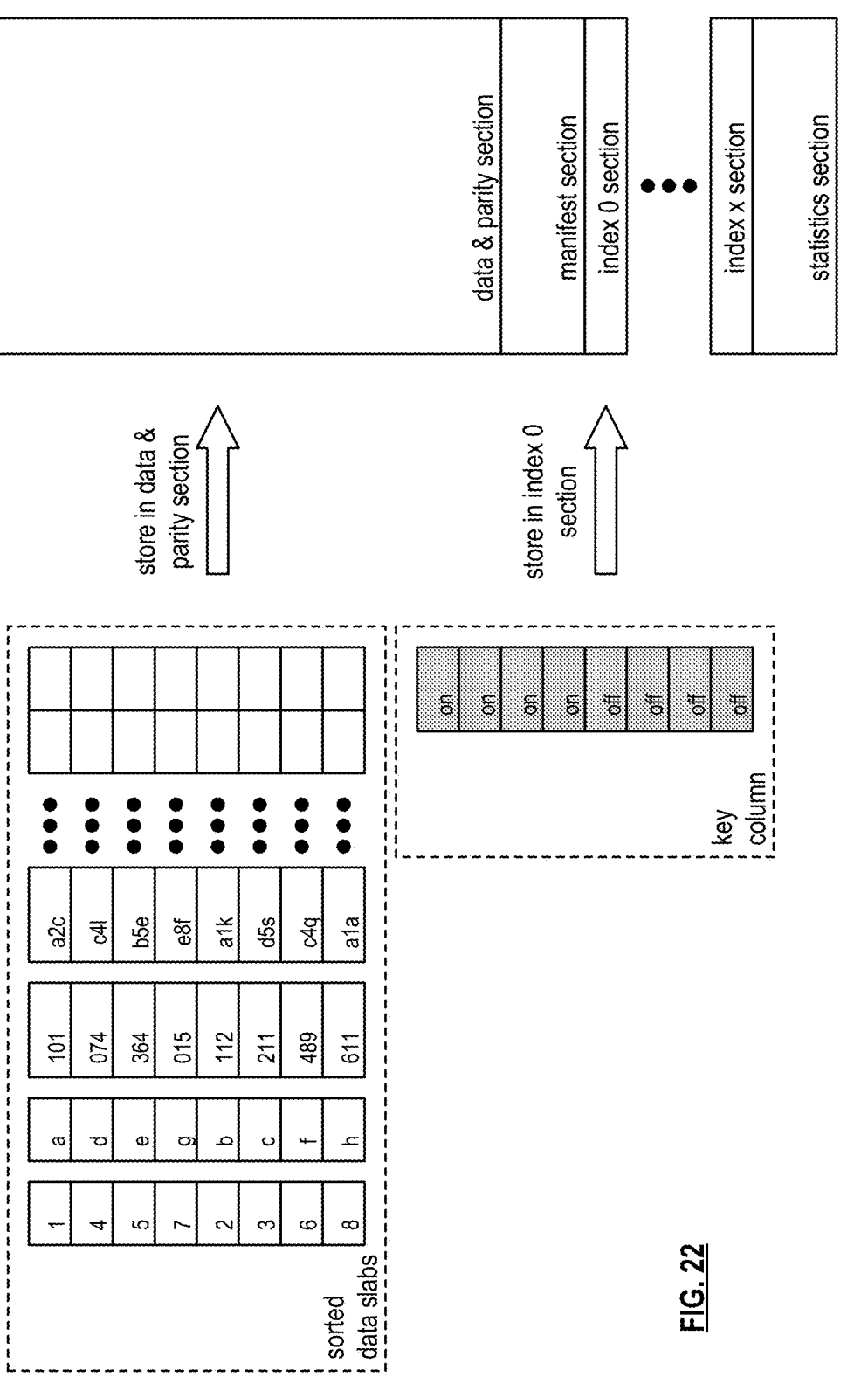

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
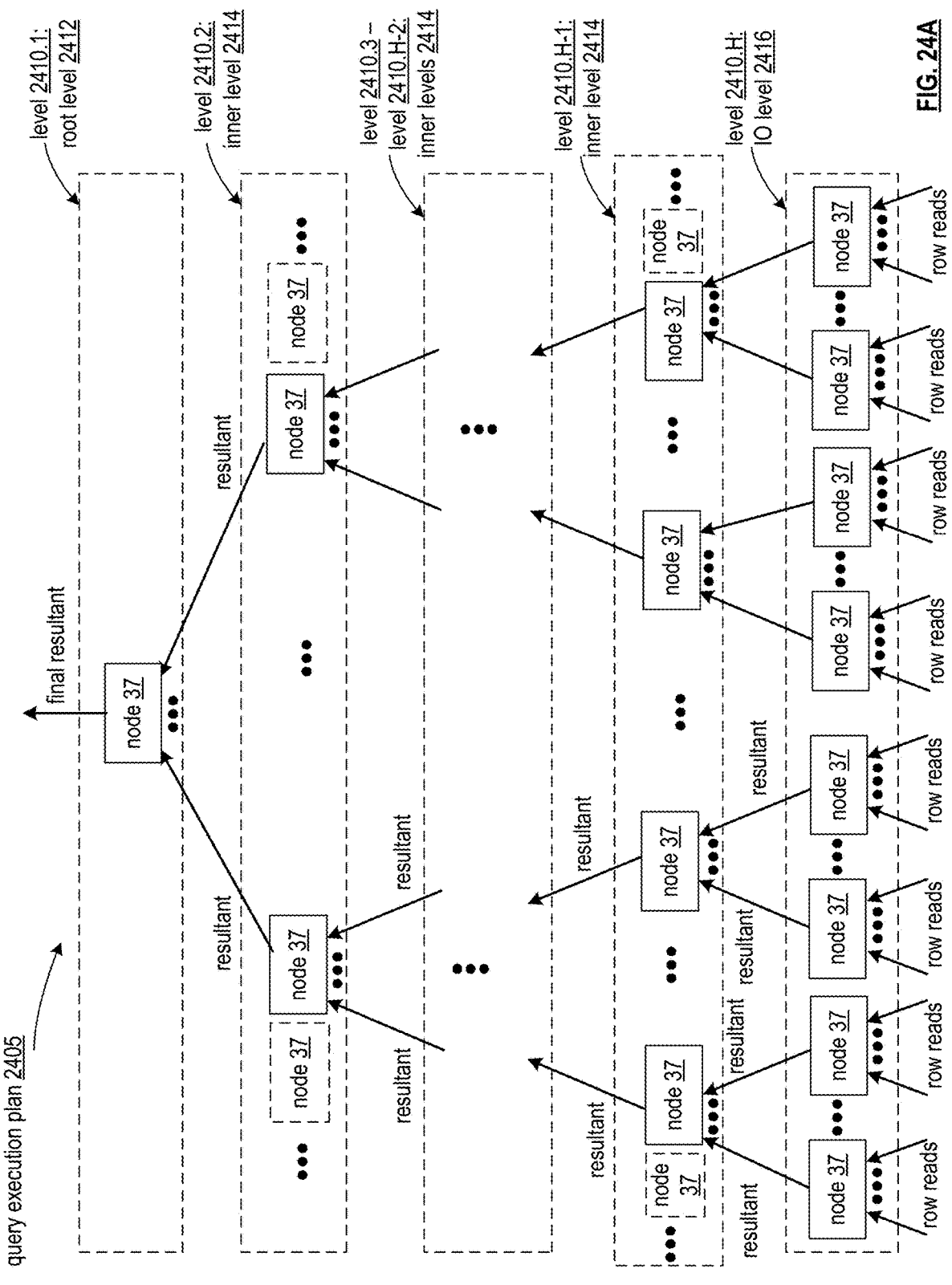
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree.

For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
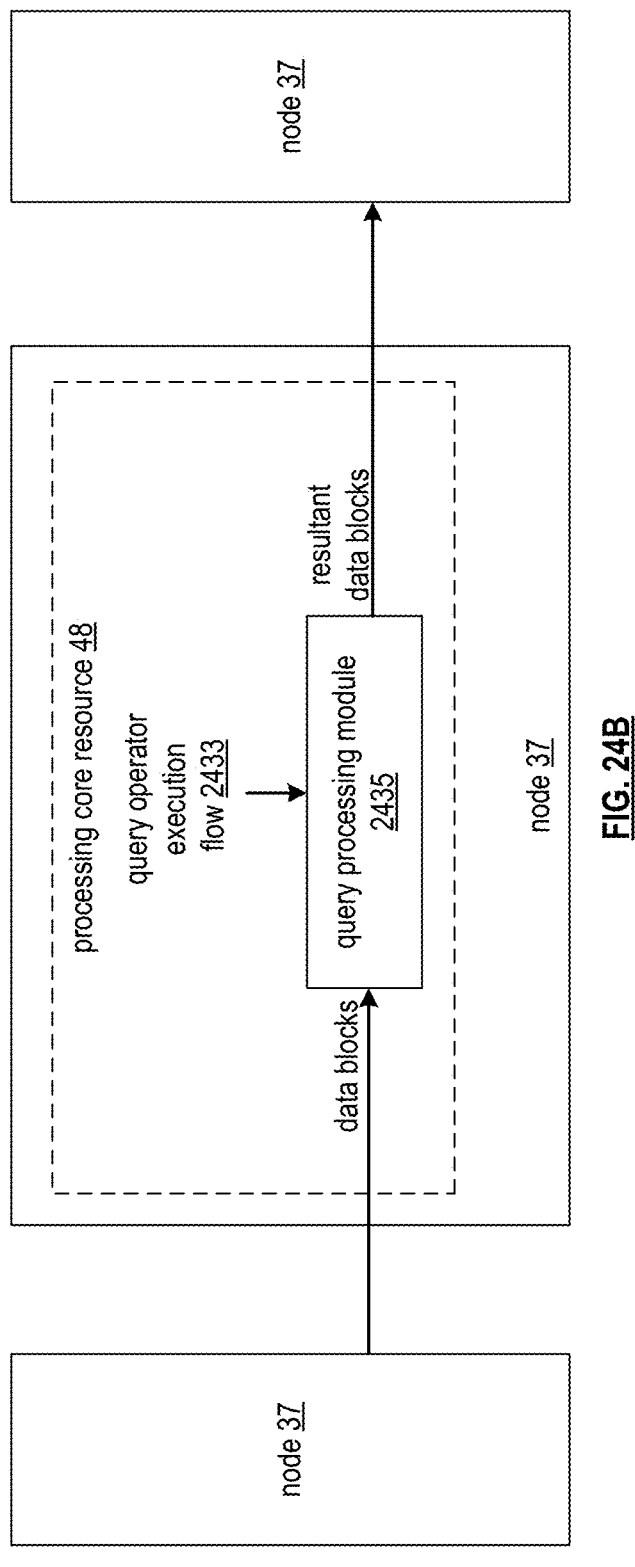
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can be operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-$n$, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-$n$ of a same node 37 can be executing at least one query concurrently via their own query processing module 2435, where a single node 37 implements each of set of operator processing modules 2435-1-2435-$n$ via a corresponding one of the set of processing core resources 48-1-48-$n$. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figures 25A, 25B:
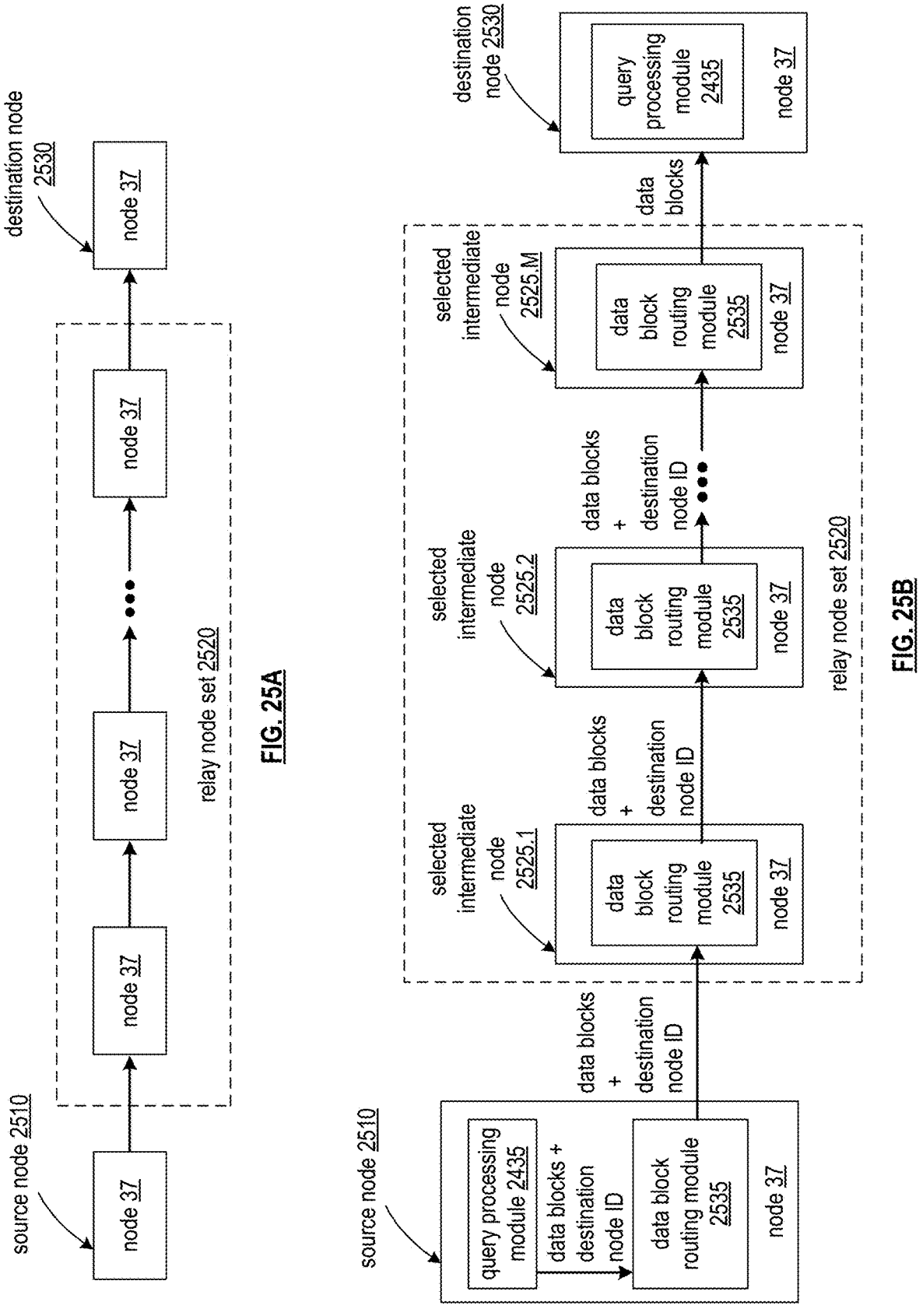
FIG. 25A is a schematic block diagram of a relay node set utilized to route data blocks from a source node to a destination node in accordance with various embodiments of the present invention.
FIG. 25B is a schematic block diagram of a plurality of nodes that each utilize a data block routing module to determine a selected intermediate node in accordance with routing data blocks from a source node to a destination node in accordance with various embodiments of the present invention.
Figure 25C:
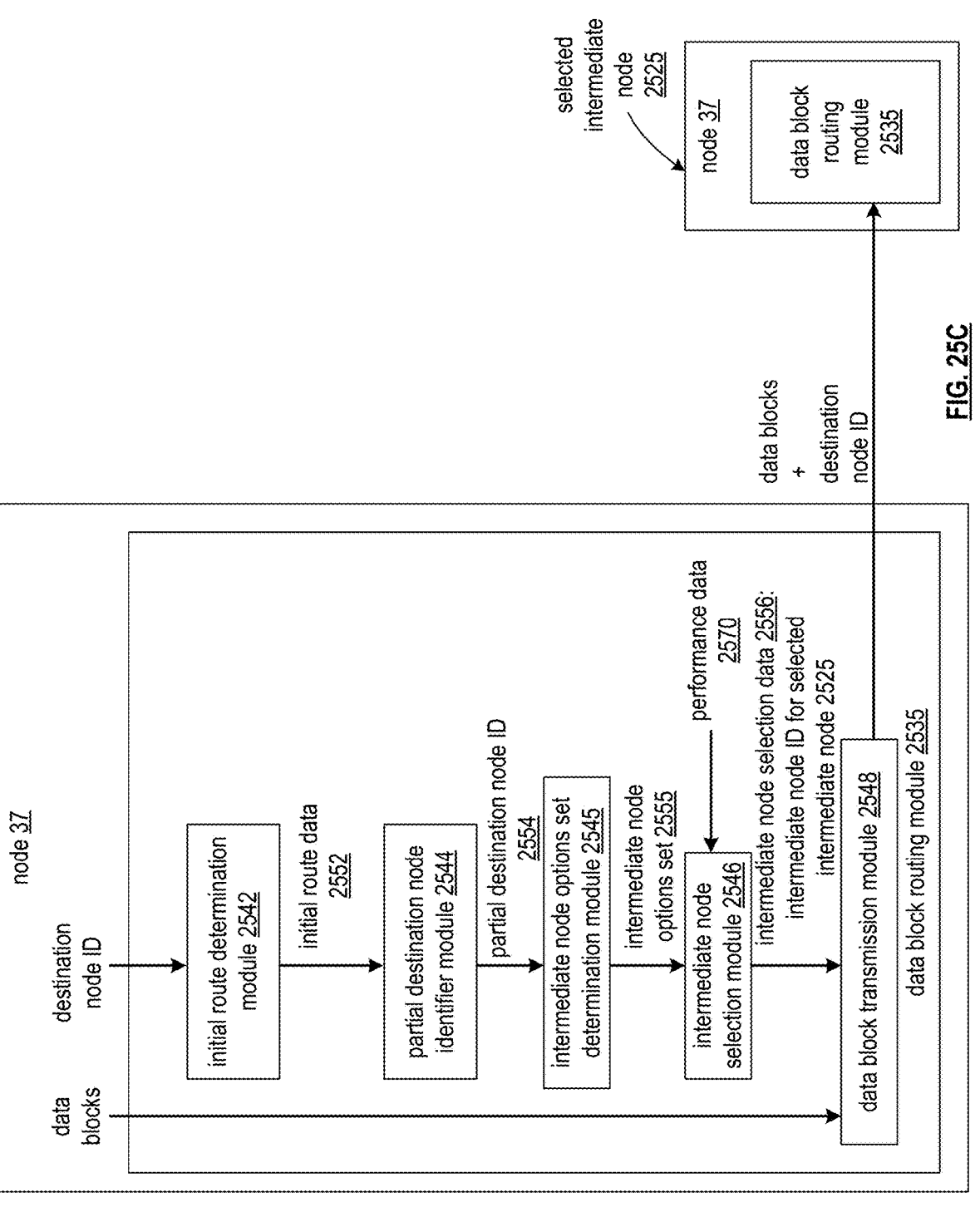
FIG. 25C is a schematic block diagram of a node that utilizes a data block routing module in accordance with various embodiments of the present invention.

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-$n$ of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or other structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted record data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
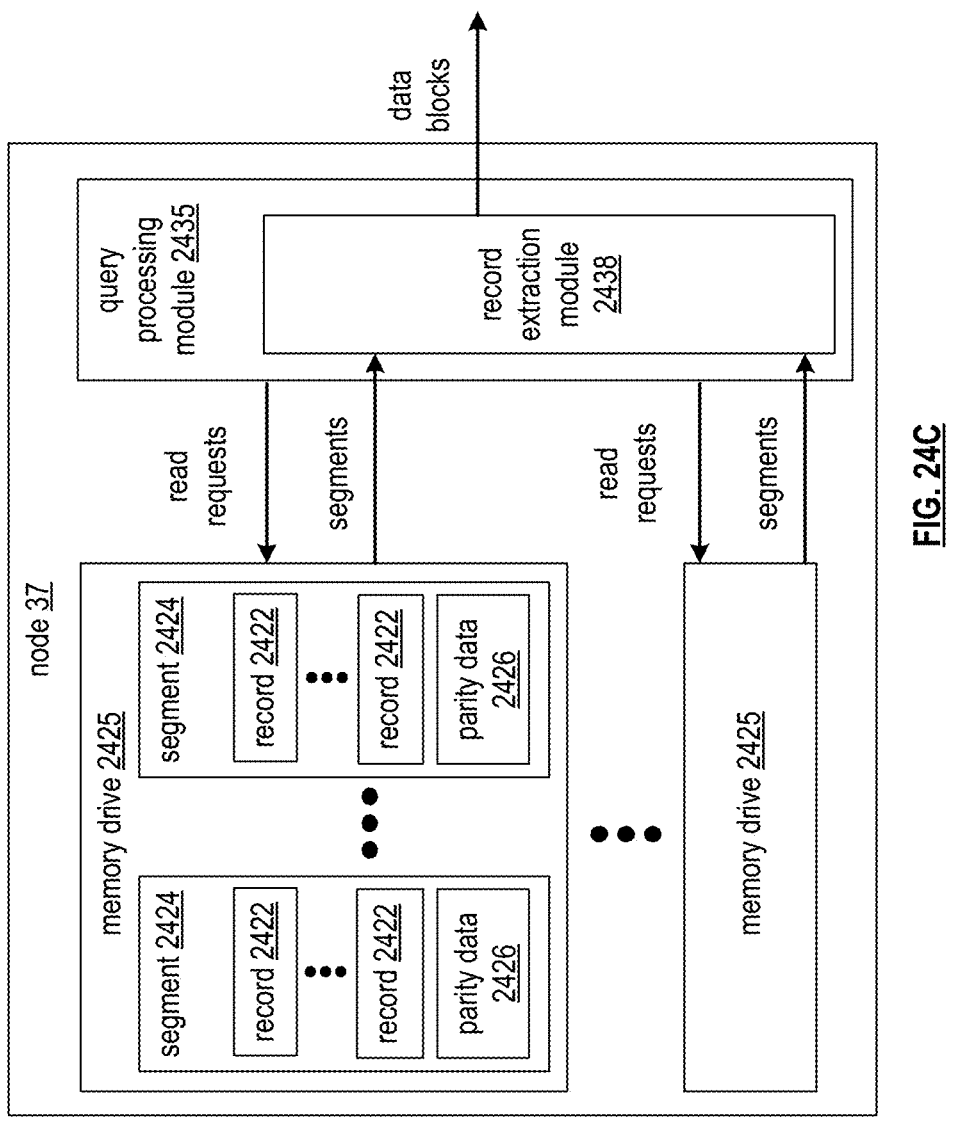
Figure 24D:
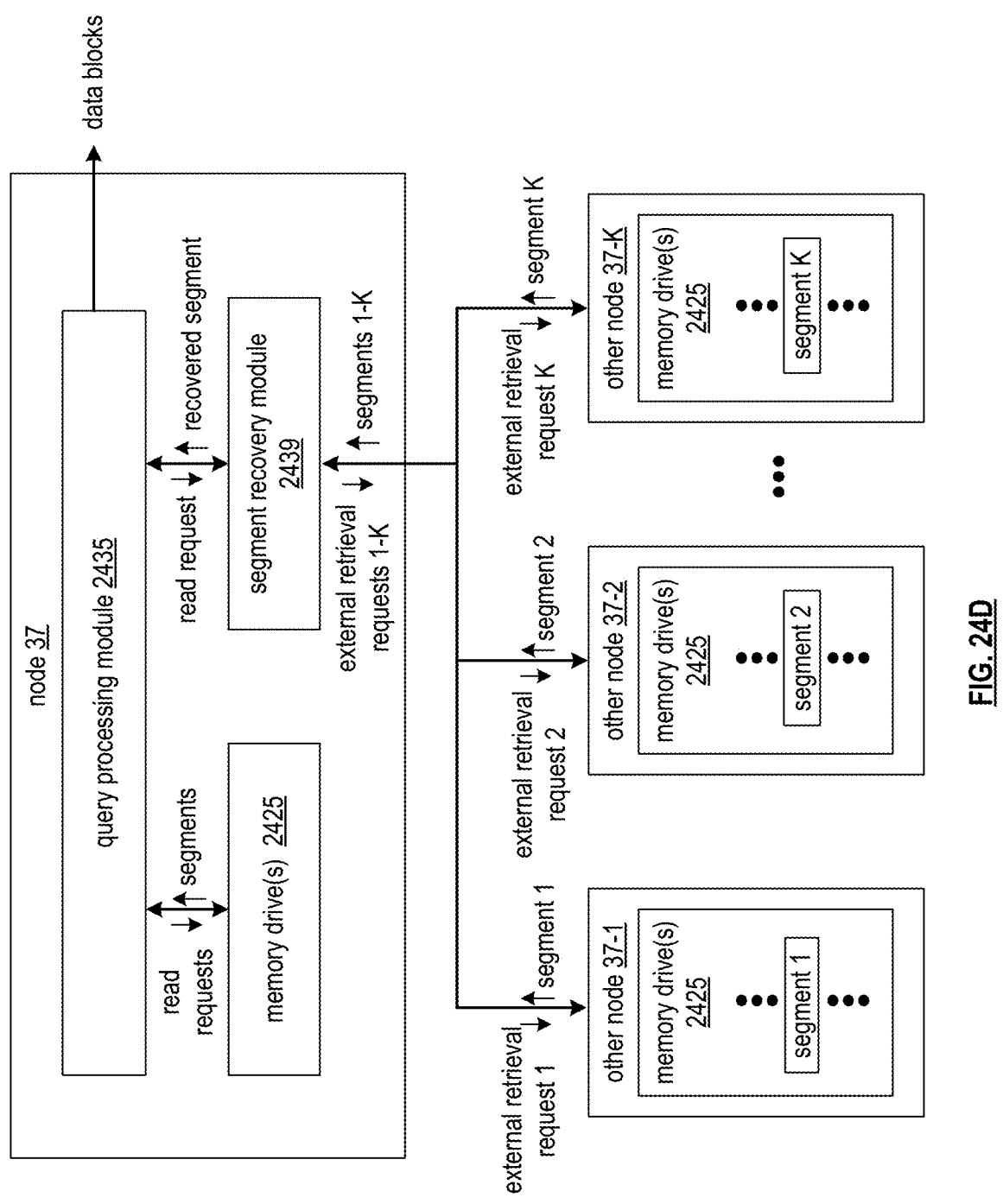

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

Figure 24E:
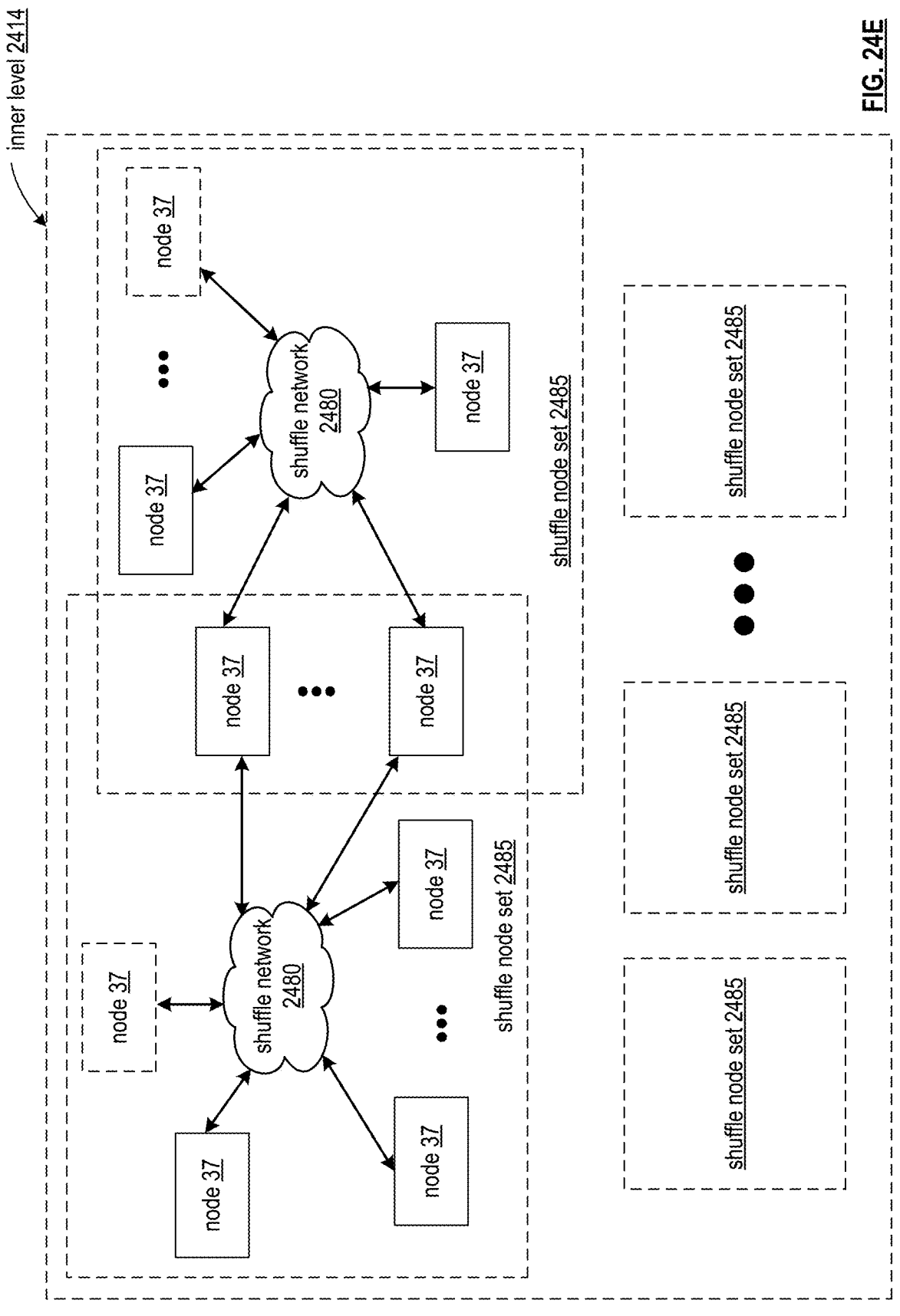
FIG. 24E is a schematic block diagram of shuffle node sets of a query execution plan in accordance with various embodiments of the present invention.

FIG. 24E illustrates an embodiment of an inner level 2414 that includes at least one shuffle node set 2485 of the plurality of nodes assigned to the corresponding inner level. A shuffle node set 2485 can include some or all of a plurality of nodes assigned to the corresponding inner level, where all nodes in the shuffle node set 2485 are assigned to the same inner level. In some cases, a shuffle node set 2485 can include nodes assigned to different levels 2410 of a query execution plan. A shuffle node set 2485 at a given time can include some nodes that are assigned to the given level, but are not participating in a query at that given time, as denoted with dashed outlines and as discussed in conjunction with FIG. 24A. For example, while a given one or more queries are being executed by nodes in the database system 10, a shuffle node set 2485 can be static, regardless of whether all of its members are participating in a given query at that time. In other cases, shuffle node set 2485 only includes nodes assigned to participate in a corresponding query, where different queries that are concurrently executing and/or executing in distinct time periods have different shuffle node sets 2485 based on which nodes are assigned to participate in the corresponding query execution plan. While FIG. 24E depicts multiple shuffle node sets 2485 of an inner level 2414, in some cases, an inner level can include exactly one shuffle node set, for example, that includes all possible nodes of the corresponding inner level 2414 and/or all participating nodes of the of the corresponding inner level 2414 in a given query execution plan.

While FIG. 24E depicts that different shuffle node sets 2485 can have overlapping nodes 37, in some cases, each shuffle node set 2485 includes a distinct set of nodes, for example, where the shuffle node sets 2485 are mutually exclusive. In some cases, the shuffle node sets 2485 are collectively exhaustive with respect to the corresponding inner level 2414, where all possible nodes of the inner level 2414, or all participating nodes of a given query execution plan at the inner level 2414, are included in at least one shuffle node set 2485 of the inner level 2414. If the query execution plan has multiple inner levels 2414, each inner level can include one or more shuffle node sets 2485. In some cases, a shuffle node set 2485 can include nodes from different inner levels 2414, or from exactly one inner level 2414. In some cases, the root level 2412 and/or the IO level 2416 have nodes included in shuffle node sets 2485. In some cases, the query execution plan 2405 includes and/or indicates assignment of nodes to corresponding shuffle node sets 2485 in addition to assigning nodes to levels 2410, where nodes 37 determine their participation in a given query as participating in one or more levels 2410 and/or as participating in one or more shuffle node sets 2485, for example, via downward propagation of this information from the root node to initiate the query execution plan 2405 as discussed previously.

The shuffle node sets 2485 can be utilized to enable transfer of information between nodes, for example, in accordance with performing particular operations in a given query that cannot be performed in isolation. For example, some queries require that nodes 37 receive data blocks from its children nodes in the query execution plan for processing, and that the nodes 37 additionally receive data blocks from other nodes at the same level 2410. In particular, query operations such as JOIN operations of a SQL query expression may necessitate that some or all additional records that were access in accordance with the query be processed in tandem to guarantee a correct resultant, where a node processing only the records retrieved from memory by its child IO nodes is not sufficient.

In some cases, a given node 37 participating in a given inner level 2414 of a query execution plan may send data blocks to some or all other nodes participating in the given inner level 2414, where these other nodes utilize these data blocks received from the given node to process the query via their query processing module 2435 by applying some or all operators of their query operator execution flow 2433 to the data blocks received from the given node. In some cases, a given node 37 participating in a given inner level 2414 of a query execution plan may receive data blocks to some or all other nodes participating in the given inner level 2414, where the given node utilizes these data blocks received from the other nodes to process the query via their query processing module 2435 by applying some or all operators of their query operator execution flow 2433 to the received data blocks.

This transfer of data blocks can be facilitated via a shuffle network 2480 of a corresponding shuffle node set 2485. Nodes in a shuffle node set 2485 can exchange data blocks in accordance with executing queries, for example, for execution of particular operators such as JOIN operators of their query operator execution flow 2433 by utilizing a corresponding shuffle network 2480. The shuffle network 2480 can correspond to any wired and/or wireless communication network that enables bidirectional communication between any nodes 37 communicating with the shuffle network 2480. In some cases, the nodes in a same shuffle node set 2485 are operable to communicate with some or all other nodes in the same shuffle node set 2485 via a direct communication link of shuffle network 2480, for example, where data blocks can be routed between some or all nodes in a shuffle network 2480 without necessitating any relay nodes 37 for routing the data blocks. In some cases, the nodes in a same shuffle set can broadcast data blocks.

In some cases, some nodes in a same shuffle node set 2485 do not have direct links via shuffle network 2480 and/or cannot send or receive broadcasts via shuffle network 2480 to some or all other nodes 37. For example, at least one pair of nodes in the same shuffle node set 37 cannot communicate directly. In some cases, some pairs of nodes in a same shuffle node set 37 can only communicate by routing their data via at least one relay node 37. For example, two nodes in a same shuffle node set 37 that do not have a direct communication link and/or cannot communicate via broadcasting their data blocks. However, if these two nodes in a same shuffle node set 37 can each communicate with a same third node via corresponding direct communication links and/or via broadcast, this third node can serve as a relay node to facilitate communication between the two nodes. Nodes that are "further apart" in the shuffle network 2480 may require multiple relay nodes.

Thus, the shuffle network 2480 can facilitate communication between all nodes 37 in the corresponding shuffle node set 2485 by utilizing some or all nodes 37 in the corresponding shuffle node set 2485 as relay nodes, where the shuffle network 2480 is implemented by utilizing some or all nodes in the nodes shuffle node set 2485 and a corresponding set of direct communication links between pairs of nodes in the shuffle node set 2485 to facilitate data transfer between any pair of nodes in the shuffle node set 2485. Note that these relay nodes facilitating data blocks for execution of a given query within a shuffle node sets 2485 to implement shuffle network 2480 can be nodes participating in the query execution plan of the given query and/or can be nodes that are not participating in the query execution plan of the given query. In some cases, these relay nodes facilitating data blocks for execution of a given query within a shuffle node sets 2485 are strictly nodes participating in the query execution plan of the given query. In some cases, these relay nodes facilitating data blocks for execution of a given query within a shuffle node sets 2485 are strictly nodes that are not participating in the query execution plan of the given query.

Different shuffle node sets 2485 can have different shuffle networks 2480. These different shuffle networks 2480 can be isolated, where nodes only communicate with other nodes in the same shuffle node sets 2485 and/or where shuffle node sets 2485 are mutually exclusive. For example, data block exchange for facilitating query execution can be localized within a particular shuffle node set 2485, where nodes of a particular shuffle node set 2485 only send and receive data from other nodes in the same shuffle node set 2485, and where nodes in different shuffle node sets 2485 do not communicate directly and/or do not exchange data blocks at all. In some cases, where the inner level includes exactly one shuffle network, all nodes 37 in the inner level can and/or must exchange data blocks with all other nodes in the inner level via the shuffle node set via a single corresponding shuffle network 2480.

Alternatively, some or all of the different shuffle networks 2480 can be interconnected, where nodes can and/or must communicate with other nodes in different shuffle node sets 2485 via connectivity between their respective different shuffle networks 2480 to facilitate query execution. As a particular example, in cases where two shuffle node sets 2485 have at least one overlapping node 37, the interconnectivity can be facilitated by the at least one overlapping node 37, for example, where this overlapping node 37 serves as a relay node to relay communications from at least one first node in a first shuffle node sets 2485 to at least one second node in a second first shuffle node set 2485. In some cases, all nodes 37 in a shuffle node set 2485 can communicate with any other node in the same shuffle node set 2485 via a direct link enabled via shuffle network 2480 and/or by otherwise not necessitating any intermediate relay nodes. However, these nodes may still require one or more relay nodes, such as nodes included in multiple shuffle node sets 2485, to communicate with nodes in other shuffle node sets 2485, where communication is facilitated across multiple shuffle node sets 2485 via direct communication links between nodes within each shuffle node set 2485.

Note that these relay nodes facilitating data blocks for execution of a given query across multiple shuffle node sets 2485 can be nodes participating in the query execution plan of the given query and/or can be nodes that are not participating in the query execution plan of the given query. In some cases, these relay nodes facilitating data blocks for execution of a given query across multiple shuffle node sets 2485 are strictly nodes participating in the query execution plan of the given query. In some cases, these relay nodes facilitating data blocks for execution of a given query across multiple shuffle node sets 2485 are strictly nodes that are not participating in the query execution plan of the given query.

In some cases, a node 37 has direct communication links with its child node and/or parent node, where no relay nodes are required to facilitate sending data to parent and/or child nodes of the query execution plan 2405 of FIG. 24A. In other cases, at least one relay node may be required to facilitate communication across levels, such as between a parent node and child node as dictated by the query execution plan. Such relay nodes can be nodes within a and/or different same shuffle network as the parent node and child node, and can be nodes participating in the query execution plan of the given query and/or can be nodes that are not participating in the query execution plan of the given query.

FIGS. 25A-25F present embodiments of a database system 10 that utilizes relay nodes to facilitate communication between nodes 37 of a query execution plan 2405 in conjunction with their execution of a given query by implementing a dynamic data block routing scheme. As discussed herein, the relay nodes of FIGS. 25A-25F can include relay nodes facilitating communication between nodes 37 of a same shuffle node set 2485 to implement a corresponding shuffle network 2480 as discussed in conjunction with FIG. 24E. As discussed herein, the relay nodes of FIGS. 25A-25H can include relay nodes facilitating communication between nodes 37 of different shuffle node sets 2485 as discussed in conjunction with FIG. 24E. As discussed herein, the relay nodes of FIGS. 25A-25H can include relay nodes facilitating communication between nodes 37 of different levels, such as facilitating communication between parent nodes and child nodes of a query execution plan.

At scale, when queries require transfer of data within large shuffle node sets 2485 and/or between many shuffle node sets 2485, direct communication between all nodes may node be possible as data exchange between a large number of nodes of a network of nodes 37 implementing database system 10 is required. Communication between nodes 37 can thus be facilitated between one or more nodes 37 of the database 10 that serve as relay nodes to enable queries to execute and to enable all data to be exchanged as necessary.

Note that any node 37 participating in a query execution plan 2405 for a given query and/or not participating in a query execution plan 2405 for a given query can serve as a source node that generates data blocks in accordance with the given query to be routed to at least one destination node via one or more relay nodes; can serve as a destination node that receives data blocks from at least one source node via one or more relay nodes for processing in accordance with the given query; and/or can serve as a relay node that facilitates routing of data blocks from at least one source node to at least one destination node in accordance with the given query. For example, in execution of a same query, a given node can serve as a source node that generates a first set of data blocks in accordance with the query for routing to a destination node; can also serve as a destination node that receives and processes a second set of data blocks in accordance with the query that were generated by another node; and/or can also serve as a relay node that receives a third set of data blocks generated by a source node in accordance with the query and received from the source node directly or from a different relay node, and send the third set of data blocks to another relay node and/or to the destination node directly for processing in accordance with the query.

As illustrated in FIG. 25A, transfer of at least one data block from a node 37 serving as a source node 2510 to a node 37 serving as a destination node 2530 can be facilitated via at least one node 37 in a relay node set 2520. In particular, the source node 2510 can send the at least one data block to a relay node 37 with which it has a direct connection and/or otherwise can communicate with without necessitating other relay nodes. Each relay node can send the received data blocks to another relay node in the relay nodes set 2520 with which it has a direct connection and/or otherwise can communicate with without necessitating other relay nodes. A final relay node in the relay nodes set 2520 can send the at least one data block to the destination node based on having a direct connection with the destination node and/or otherwise being able to communicate with the destination node without necessitating other relay nodes.

FIG. 25B illustrates how this transfer of at least one data block from a node 37 serving as a source node 2510 to a node 37 serving as a destination node 2530 can be facilitated by a data block routing module 2535 implemented by the source node 37 and/or implemented by the at least one node 37 in the relay node set 2520. For example, some or all nodes 37 of the database system 10, of a query execution plan 2405, and/or any other nodes 37 described herein can be operable to implement the data block routing module 2535, for example, by utilizing the central processing module 39 of the node, the main memory 40 of the node, the disk memory 38 of the node, the network connection 41 of the node, and/or by utilizing any other processing module, memory, and/or communication interface of the node 37 and/or of the corresponding computing device 18.

A node 37 serving as a source node for particular transfer of data block can generate the data blocks to be sent via the query processing module 2435, for example, in accordance with generating data blocks as discussed in conjunction with FIGS. 24B-24D via the query processing module 2435. In some cases, the data blocks are not resultant data blocks to be sent to a parent node, but instead intermediate data blocks generated via applying only a proper subset of a plurality of query operators of a query operator execution flow 2433, for example, when an exchange of data with other nodes at the same inner level 2414 is required to ultimately generate the resultant data blocks, For example, a JOIN operator to be executed by a given node can require that some or all partially processed data blocks be generated and sent via at least one other node at the same level by applying the same or different proper subset of the plurality of query operators of a same or different query operator execution flow 2433, where the JOIN operator is executed by the given node upon the partially processed data blocks generated itself via execution of the proper subset of the plurality of query operators and/or upon the partially processed data blocks received from one or more other nodes, and where the given node cannot generate its resultant data blocks to be sent to a parent node at a subsequently higher level in the query execution plan 2405 until the JOIN operator is performed upon data blocks, in tandem, that were generated by and received from multiple other nodes.

The node 37 serving as a source node 37 can further determine a destination node to which these given data blocks generated by executing at least one query operator of query operator execution flow 2433 via the query processing module 2435 are to be sent. This can be dictated by the query execution plan 2405 and/or indicated in query instruction received by the node 37 upon initiation of the query execution plan. This can be determined by the query processing module 2435 upon generating the corresponding data blocks and/or can otherwise be determined by the node. The determined destination node can be denoted with an identifier to indicate a network address of the destination node, a location of the destination node, and/or other information necessary to route the data blocks to the appropriate destination node.

The data blocks and destination node identifier can be processed by a data block routing module 2535 of the source node to determine a first relay node to which the data blocks are to be sent, and to send the data blocks to the first relay node, for example, via a direct connection. This first relay node corresponds to a selected intermediate node 2525.1 that was selected by the source node 37 via the data block routing module 2535. The destination node identifier can also be sent in conjunction with the data blocks. The selected intermediate node 2525.1 utilizes its own data block routing module 2535 to process the incoming data blocks and the destination node identifier, in a same or similar fashion as the data block routing module 2535 implemented by the source node 37, to determine a second relay node to which the data blocks are to be sent by determining the selected intermediate node 2525.2 and sending the data blocks and the destination node identifier to the selected intermediate node 2525.2. The selected intermediate node 2525.2 utilizes its own data block routing module 2535 to process the incoming data blocks and the destination node identifier in a same or similar fashion to determine a third relay node to which the data blocks are to be sent and sending the data blocks and the destination node identifier to a subsequently selected intermediate node 2525, where each subsequently selected intermediate node 2525 continues this process until a final selected intermediate node 2525.M receives the incoming data blocks and the destination node identifier from a penultimately selected intermediate node 2525.M-1. The final selected intermediate node 2525.M utilizes its own data block routing module 2535 to process the incoming data blocks and the destination node identifier in a same or similar fashion to determine to send the data blocks directly to the destination node 2530 denoted by the destination node identifier, for example, based on having a direct connection with the destination node 2530.

Note that while data is being routed from a particular source node to a particular destination node 2530 via nodes of the relay node set 2520, each node 37 can be performing additional processing and/or data routing for the same query or one or more additional queries that are being performed concurrently via the same or different query execution plan 2405. For example, relay nodes of the relay node set 2520 can be concurrently receiving and routing different sets of data blocks for the same or different query, where the data block routing module 2535 also routes other data blocks to other destination nodes via other selected intermediate nodes. While not illustrated in FIG. 25B, each relay node 37 of the relay node set 2520 can implement their own query processing module 2435 for processing of other input data blocks to generate their own output data blocks for routing within the same or different shuffle node set 2485 and/or for routing to a corresponding parent node of the query execution plan, for example, where some or all of these nodes in relay node set 2520 are serving as source nodes 2510 for different sets of data blocks for the same or different query and/or are servicing as destination nodes 2530 for different sets of data blocks for the same or different query. In some cases, if the relay nodes 37 are participating in the query at a same level as the source node, the data blocks received from the source node can be processed as input data blocks by some or all relay nodes 37, for example, in accordance with execution of a JOIN operator of the query operator execution flow 2433 if the plurality of operators and their corresponding flow of query operator execution flow 2433 is common to all nodes 37 in the corresponding level 2410 and/or in the corresponding shuffle node set 2485.

In some cases, while not depicted in FIG. 24B, the source node 2510 may be simultaneously serving as a relay node for different sets of data blocks for the same or different query, where the data block routing module 2535 also routes other data blocks to other destination nodes via other selected intermediate nodes. Alternatively or in addition, the source node 2510 may be simultaneously serving as a destination node 2530, concurrently utilizing the query processing module 2435 for processing received data blocks of the same or different query. In some cases, while not depicted in FIG. 24B, the destination node 2530 may be simultaneously serving as a relay node for different sets of data blocks for the same or different query by utilizing its own data block routing module 2535. Alternatively or in addition, destination node 2530 may be simultaneously serving as a source node 2510, simultaneously utilizing the query processing module 2435 for generating data blocks of the same or different query to be routed to other destination nodes.

Different routing of data blocks from source nodes 2510 to destination nodes 2530 can include a same or different number of selected intermediate nodes M in the respective relay node set 2520. Some routing of data blocks from source nodes 2510 to destination nodes 2530 can include no relay nodes based on the source node 2510 having a direct connection with the destination node 2530. As will be discussed in further detail in conjunction with FIGS. 25C-25F, any given (source node, destination node) pair can have a fixed, predefined number of relay nodes M in their respective relay node set 2520. However, different communication between a given (source node, destination node) pair can have multiple possible paths via different nodes in various possible relay node sets 2520. The database system 10 can be operable to facilitate communication with any given (source node, destination node) pair via different possible paths for communication of various data that satisfy the fixed, predefined number of relay nodes M via implementation of the data block routing module 2535 of the nodes 37 in the database system 10 operable to route data between each given (source node, destination node) pair.

In this fashion, rather than dictating a fixed path of relay nodes between two given nodes, the path can be dynamically selected. This dynamic selection can be based on selecting a path from the source node, one node at a time, that is known to result in a preset number of "hops" to the destination node, as dictated by the predefined number of relay nodes M. This process can include determining an initial route with the predefined number of relay nodes M, where each node always evaluates a predefined number of nodes ahead, such as exactly two nodes ahead. From a given node to a node two hops away, an intermediate node can be selected from a set of known nodes that are a single hop away from a node two hops away in the initial route. For example, the particular intermediate node can be selected from the set of known nodes based on its current determined or estimated load and/or can be distributed over time via a turn-based selection or a random selection process to balance the load across various nodes in the various paths to destination nodes. The next node is then also selected based from a next set of intermediate nodes to a subsequent two-hops-away node in a similar fashion, and so on until the destination is ultimately reached in the predefined number of hops.

Dynamic selection of paths for routing data blocks in this fashion improves the technological field of database systems by improving efficiency in query execution. In particular, efficiency of query execution can be improved based on enabling necessary data to be routed based on current performance of possible sets of relay nodes and/or by otherwise evenly distributing load induced by routing data blocks across various different nodes. Furthermore, by dictating that a fixed number of nodes always be utilized, expected query execution speed can remain relatively constant across different queries due to data transfer requiring the same number of nodes regardless of path. This improves database systems by ensuring that various queries can be processed consistently over time while enabling balanced load distribution. Finally, segregating the decision-making process across multiple nodes, where each relay node only determines the next node based on predefined node that is two nodes ahead, without having to path plan the entirety of the data's route to the destination, maintains decentralization in the database system to reduce coordination and corresponding exchange of additional data between nodes in the system, while enabling adaptation to neighboring circumstances by individual nodes as they select the next node in the path.

FIGS. 25C-25F illustrate such embodiments of dynamic selection of data block routes via this mechanism. In particular, FIG. 25C illustrates an embodiment of the data block routing module 2535 that can be implemented by some or all nodes 37 to enable this functionality. The data block routing module 2535 of FIG. 25C can be utilized to implement the data block routing module 2535 of some or all nodes of FIG. 25B and/or can be implemented by any other embodiments of node 37 discussed herein. The node illustrated in FIG. 25C can be implementing the data block routing module in its participation as a source node 2510 and/or as a relay node of a relay node set 2520.

As illustrated in FIG. 25C, for given data blocks generated by the node 37 and/or received by the node 37 from another node for routing, an initial route determination module 2542 can generate initial route data 2552 based on a destination node ID generated by the node's query processing system 2435 and/or received from another node from which the data blocks were received. The initial route of initial route data 2552 can be predetermined based on the destination node ID, can be determined via a deterministic function performed by the node given the destination node ID, can be received by the node, can be accessed via local memory of the node that stores a plurality of predefined initial routes for a plurality of possible destination nodes in the database system 10, and/or can otherwise be determined by the node 37. In some cases, the initial route of initial route data 2552 corresponds to a route of a plurality of possible routes that is expected to be and/or historically determined on average to be most efficient of the plurality of possible routes; to have the least latency of the plurality of possible routes; to have the lowest current and/or historical load of the plurality of possible routes; to best balance communication load across nodes and/or direct connections in the system as a whole in accordance with other communication paths utilized between other pairs of nodes in the system concurrently; and/or to otherwise be most favorable of the plurality of possible routes.

The initial route data can indicate some or all of an initial route to the destination node indicated by the destination node ID. The initial route data 2552 can indicate a sequentially ordered set of nodes from the given node to the destination node, such as an ordering of the nodes and their corresponding identifiers such as network addresses, location data, or other identifying information, that can facilitate transfer of data blocks. Each node of the sequentially ordered set of nodes can correspond to nodes can have a direct communication link with its neighbors, and only its neighbors, in the sequentially ordered set nodes, where communication of data blocks can be facilitated from each node to a subsequent node in the sequentially ordered set of nodes via a corresponding direct link of a plurality of corresponding plurality of direct links, where the number of direct links in this corresponding plurality of direct links dictates the predetermined number of relay nodes for communicating from the node to the destination node.

The initial route data 2552 can alternatively indicate only a sequentially ordered set of nodes from the given node to a predetermined partial destination node that is a predefined number of hops away that can route data blocks to the destination node via the predefined number of relay nodes, even when all of these predefined number of relay nodes are not stored by the node or indicated in the initial route data 2552, as only the most immediate ones of the relay nodes are pertinent in making routing decisions in this fashion. For example, the initial route data 2552 determined by a particular node or can simply indicate an initial route to a node two hops away, for example, where the initial route data indicates an initial first node and an initial second node, and where the initial first node and an initial second node are included in a full route to the destination node that utilizes the predetermined number of relay nodes.

Figure 26A:
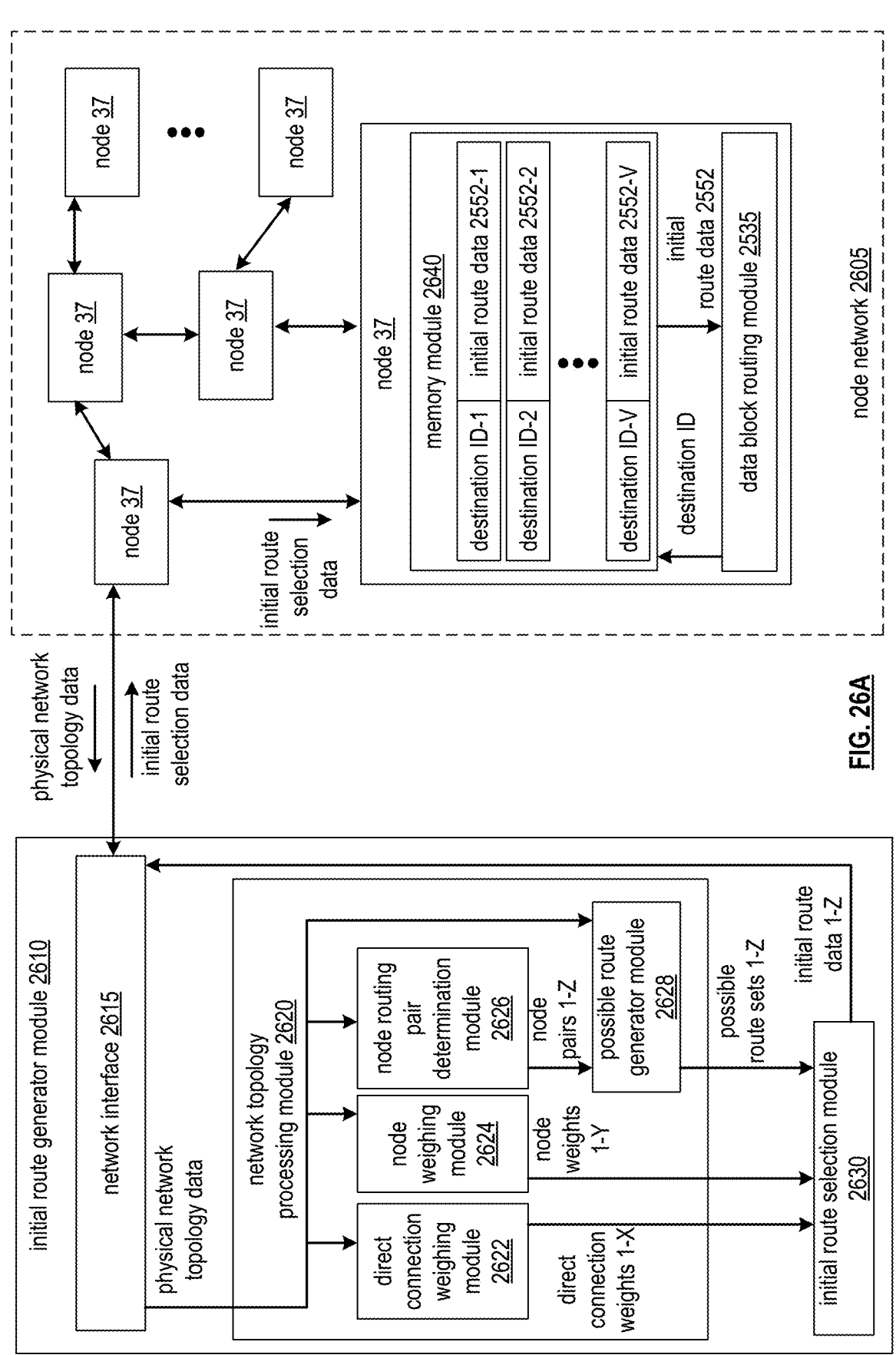
FIG. 26A is a schematic block diagram of an initial route generator module in accordance with various embodiments of the present invention.

The initial route of initial route data 2552 can correspond to some or all of a fixed, known route to the destination, for example, where this fixed route only changes in circumstances where the network topology of the plurality of nodes changes; in circumstances where node outages occur, such as when at least a predefined threshold number of node failures that directly communicate with the node and/or are in the database system 10 are detected to occur since the initial fixed route was determined; in circumstances where new nodes are added, such as when at least a predefined threshold number of nodes that directly communicate with the node and/or are in the database system 10 are detected to have been added since the initial fixed route was determined; when a new fixed initial route is configured via user input, for example, via administrative sub-system 15 and/or configuration sub-system 16, where the new fixed initial route is disseminated to some or all nodes of the database system and/or based on other criteria; when a new fixed initial route is automatically generated by an initial route generating module of the database system, for example, as discussed in conjunction with FIGS. 26A-26B; and/or based on the initial route otherwise being updated.

A partial destination node identifier module 2544 of the data block routing module 2535 can utilize the initial route data 2552 to determine a partial destination node ID. For example, this partial destination node ID can correspond to a node that is a predefined number of nodes away, such as exactly two nodes away, from the given node 37. The partial destination node ID can be identified by simply determining the node in the sequentially ordered set of nodes that is the predefined number of nodes away. In cases where the initial route data only includes a subset of the full route, such as only nodes in the route up to the predefined number of nodes away, the partial destination node ID thus can be determined as the last node in the sequentially ordered set of nodes.

An intermediate node options set determination module 2545 can utilize the partial destination node ID to determine an intermediate node options set 2555 corresponding to some or all possible nodes, some or all paths of multiple nodes when the predefined number of hops is greater than two, that can be utilized to route data blocks from the given node 37 to the node indicated by the partial destination node ID. In particular, if partial destination node ID corresponds to a selected node exactly two nodes away, only one relay node is required, and intermediate node options set 2555 can include some or all possible nodes 37 that can receive data blocks from the given node 37 via a direct connection and that can also transmit data blocks to the identified partial destination node, which is two nodes away from the given node 37 in the initial route data 2552, via a direct connection. In some cases, this includes some or all nodes 37 with direct communication links with the given node 37 and the partial destination node of the initial route data 2552 that are: participating in the query execution plan 2405 for the given query; assigned to the same level 2410 but not necessarily participating in the query execution plan 2405 for the given query; included in the same shuffle node set 2485; and/or are otherwise included in the database system 10 and are operable to relay nodes via their own data block routing module 2535.

The intermediate node options set 2555 can be predetermined based on the partial destination node ID, can be determined via a deterministic function performed by the node based on the partial destination node ID; can be received by the node; can be accessed via local memory of the node that stores a plurality of predefined intermediate node options set 2555 for a plurality of possible partial destination node ID in the database system 10 that are the predefined number of nodes away; can be accessed via the local memory of the node that stores the plurality of initial route data, where a given predefined intermediate node options set 2555 is mapped to and/or stored in conjunction with a corresponding initial route of the plurality of initial routes; and/or can otherwise be determined by the node 37.

The intermediate node options set 2555 can correspond to a fixed, known set of nodes that are intermediate nodes to the identified partial destination node. For example, this fixed, known set of nodes only changes in circumstances where the network topology of the plurality of nodes changes; in circumstances where node failures of nodes in the fixed, known set of nodes occur; in circumstances where new nodes are added that can be operable as intermediate nodes to the identified partial destination node; when a new fixed, known set of nodes to some or all different partial destination nodes is configured via user input, for example, via administrative sub-system 15 and/or configuration sub-system 16; when a new fixed, known set of nodes is automatically generated by the initial route generating module of the database system, for example, as discussed in conjunction with FIGS. 26A-26B; and/or based on the fixed, known set of nodes otherwise being updated. In some cases, the intermediate node options set 2555 is automatically filtered from the fixed, known intermediate node options set and/or is otherwise dynamically determined to include only currently available nodes and/or nodes that are currently performing at a determined performance level that meets a predetermined performance level threshold are included in the intermediate node options set.

An intermediate node selection module can generate intermediate node selection data 2556 by selecting a single node from the intermediate node options set, if the partial destination node is two nodes away in the initial route, to reach the identified partial destination node. Alternatively, the intermediate node selection module can generate intermediate node selection data 2556 by selecting set of multiple sequential relay nodes from multiple sets of multiple sequential relay node options of the intermediate node options set 2555 if the partial destination node is more than two nodes away in the initial route to reach the identified partial destination node. For example, the intermediate node selection data 2556 indicates an intermediate node identifier of the selected intermediate node 2525 to which the corresponding data blocks are to be routed, for example, where the selected intermediate nodes 2525.1-2525.M of FIG. 25B were each selected in the intermediate node selection data 2556 generated by the previous node in this fashion.

The intermediate node selection data can be generated by selecting a single option from the intermediate node options set 2555, whether it be a single node or path of multiple nodes depending on the distance to the partial destination node, based on: a randomized and/or pseudo-randomized approach; a uniform turn-based approach, for example, where different ones of the set of options are selected in a predefined sequence as new data blocks are determined to be routed with selection of the corresponding partial destination node and/or where a number of turns is distributed equally; an non-uniform turn-based approach, for example, where different ones of the set of options are selected in a predefined sequence as new data blocks are determined to be routed with selection of the corresponding partial destination node and/or where a proportion of turns in the predefined sequence is distributed unequally based on different known and/or historical load and/or performance levels of the corresponding set of options, where more turns are distributed to options with more favorable known and/or historical load and/or performance levels; and/or based on performance data 2570 determined for some or all of the set of options in intermediate node options set 2555, for example, where the option with the most favorable performance data is selected and/or where an option is selected based on having performance data that compares favorably to a predetermined threshold performance level.

In cases where performance data 2570 is utilized to generate the intermediate node selection data 2556, the performance data can be detected, received, and/or otherwise determined by the node 37. The performance data 2570 for a given option can be based on: determining current and/or predicted utilization levels of nodes in the set of intermediate node options; determining current and/or predicted communication latency of nodes in the set of intermediate node options, determining current and/or predicted health degradation of nodes in the set of intermediate node options, determining current and/or predicted outages of nodes in the set of intermediate node options, and/or determining the amount of recently routed data blocks to nodes in the set of intermediate node options, for example, based on tracking data blocks recently sent to each node in the set of intermediate node options by the given node via previous selection of these nodes in the intermediate node selection data 2556.

A data block transmission module 2548 route the corresponding data blocks to the selected intermediate node 2525 identified in the intermediate node selection data 2556. The selected intermediate node 2525, upon receiving the data blocks and corresponding destination node ID, can utilize its own data block routing module 2535 to facilitate the next step of routing the data towards the destination node via a next selected intermediate node 2525. This process continues until the data block reaches the last, $M^{th}$ selected intermediate node 2525, which can automatically determine to route the data blocks to the destination node via its direct connection with the destination node.

Figure 25D:
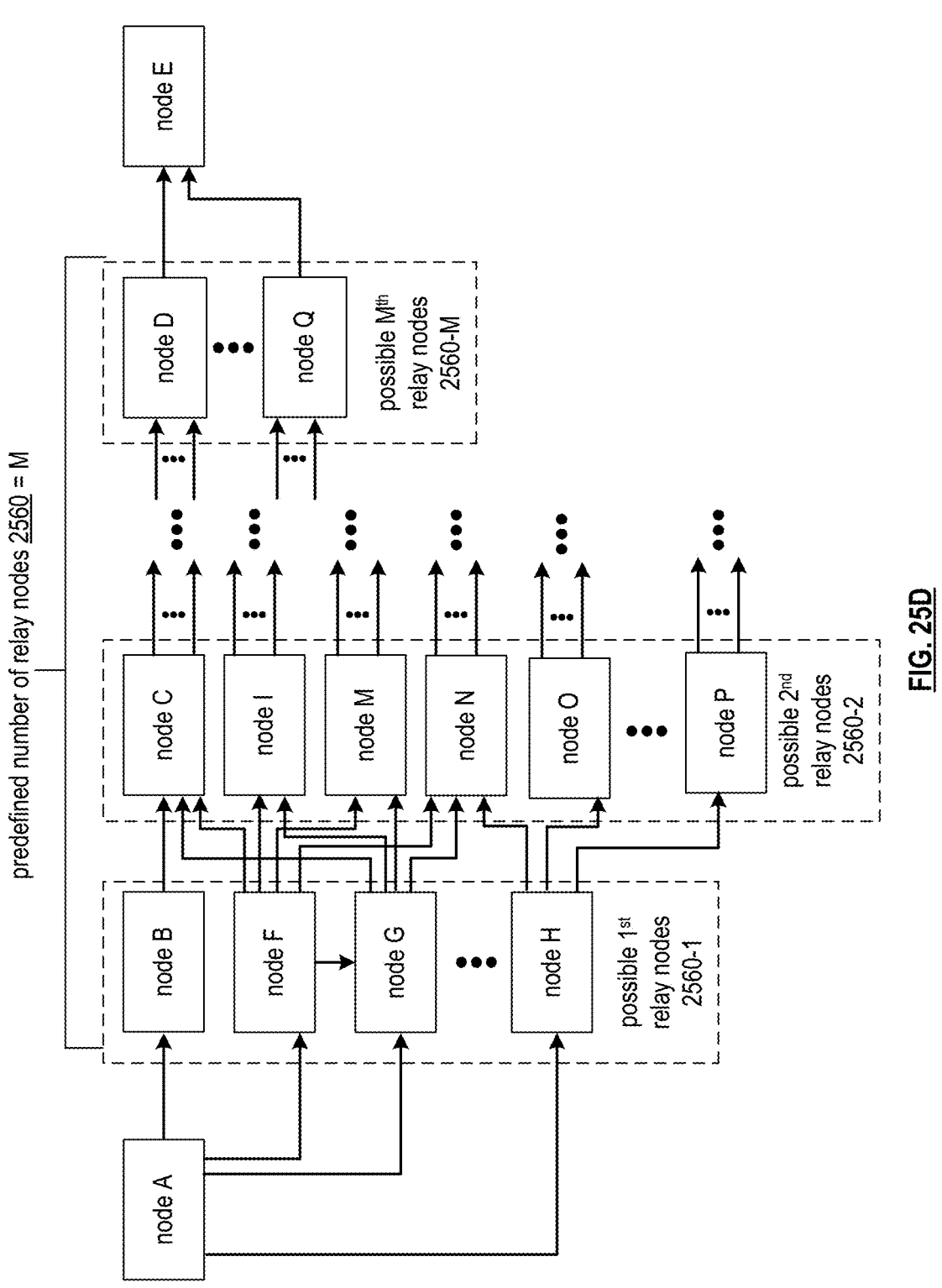
FIG. 25D is a schematic block diagram illustrating an example network of possible routes for routing data blocks in accordance with various embodiments of the present invention.

FIG. 25D illustrates direct connections in an example network of a plurality of nodes 37 that includes at least nodes A-Q. In particular, a plurality of possible paths from node A to node E is possible via exactly M relay nodes. Possible direct connections are denoted by an arrow. While these arrows indicate at least a unidirectional connection towards the destination node, some or all of these connections can be bidirectional connections between the corresponding pair or nodes. Some or all of these connections can alternatively be strictly the unidirectional connection indicated. For example, a set of M relay nodes that can facilitate communication from node A to node E may not necessarily be operable to facilitate transfer from node E to node A. Note that not every pair of nodes depicted has a direct connection. For example, node A does not have a direct connection to node E, node B does not have a direct connection to node I, etc. Note that node A can be a source node, or can be a relay node of a predetermined number of relay nodes M+r from a different source node, where r is a positive integer.

In some cases, M is determined to be the minimum number of relay nodes possible to communicate from node A to node E, where at least M relay nodes must be utilized to send data blocks from A to E. As another example, M is greater than the minimum number of relay nodes possible to communicate from node A to node, but is selected as the predefined number of relay nodes 2565 due to having a greater number of path options than those facilitated via the minimum possible number of relay nodes M-s, where s is a positive integer. For example, M is selected as the smallest number of relay nodes to communicate between the source node and destination node that also has at least a threshold predefined number of possible paths via M number or relay nodes from the source node to the destination node.

As illustrated in FIG. 25D, each of the plurality of possible relay nodes that can be included in one or more possible paths from node A to node E can be included in a single, particular set of possible relay nodes 2560. The sets of possible relay nodes 2560 can be mutually exclusive and/or collectively exhaustive with regards to all possible relay nodes from node A to node E. For example, at least nodes B, F, G, and H are included in a set of possible $1^{st}$ relay nodes; at least nodes C, I, M, N, O and P are included in a set of possible $2^{nd}$ relay nodes; and at least nodes D and Q are included in a set of possible $M^{th}$ relay nodes.

Note that if a particular node is selected from the set of possible $1^{st}$ relay nodes, the set of possible $2^{nd}$ relay nodes may need to be filtered due to some or all nodes in the set of possible $1^{st}$ relay nodes not having direct connections to some or all of the set of possible $2^{nd}$ relay nodes. In this example, if B is selected as the first relay node, node C must be selected as the second relay node in this example because node B only has a direct connection with node C in the possible 2nd set of relay nodes. Also note that while it would be possible for node F to relay to node G, node G is not included in the possible $2^{nd}$ set of relay nodes because it is already included in the first set of relay nodes and/or because it does not have direct connections to any nodes in the set the possible $3^{rd}$ set of relay nodes. In particular, if node F were to relay to node G, node G would then need to relay to a node in the possible $2^{nd}$ set of relay nodes, which would necessitate that M was not fixed, and that at least M+1 relay nodes are required.

While not depicted in this example, in some cases, every node in a given set of possible $i^{th}$ relay nodes 2560 has a same number of possible connections to a same number of nodes in the set of possible $(i+1)^{th}$ relay nodes 2560. While not depicted in this example, in some cases, every node in a given set of possible $i^{th}$ relay nodes 2560 has a same number of possible connections from a same number of nodes in the set of possible $(i-1)^{th}$ relay nodes 2560. This can be ideal in ensuring that no single path becomes too conjected based on some possible routes being selected more than others. For example, in this case, node B may be an unideal choice as a first node, compared to other first nodes with more options for the second node, as node C must be chosen and may become congested with routing data blocks compared to other nodes due to having to route all data blocks to node E from node A when node B is selected.

Figure 25E:
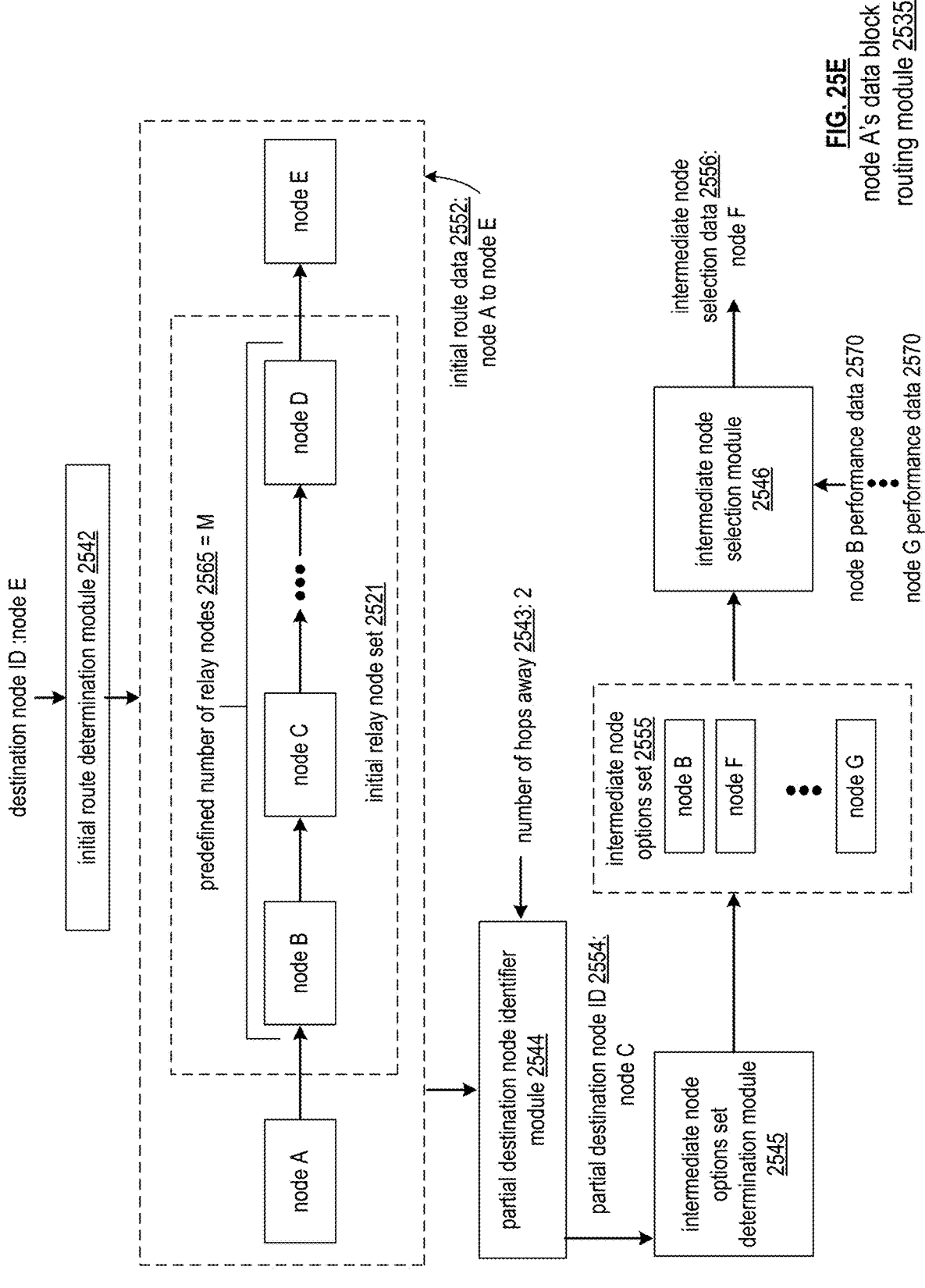
FIGS. 25E-25F are schematic block diagrams of data block routing modules used by different nodes to route data blocks in the example network of possible routes in accordance with various embodiments of the present invention.

FIG. 25E illustrates an example of utilizing the data block routing module by node A in response to determining to send data blocks to node E, for example, as a source node as a relay node. This example continues from the example connections from node A to node E illustrated in FIG. 25D. Based on determining node E is the destination node, the initial route determination module determines initial route data 2552 for routing data from node A to node E, which indicates the initial route of M nodes includes at least node B, C, and D in an initial relay node set 2521. As discussed previously, node A itself may only determine and/or store the first two nodes, such as node B and node C in this case, of the initial route, as node A only selects an intermediate node that can send data to node C.

The partial destination node identifier module 2544 identifies node C as the node in the initial route that is two hops away. This can be based on utilizing a configurable or preset parameter of the partial destination node identifier module 2544 denoting the number of hops away 2543 of the partial destination node in the initial route, where node C is selected based on the number of hops away 2543 being set to 2. The number of hops away 2543 can be set to different integers that are less than M in other embodiments.

The intermediate node options set determination module 2545 can determine the intermediate node options set 2555 based on selecting all nodes that can receive data from node A via a direct connection and can send data to node C via a direct connection based on node C being identified by partial destination node identifier 2554. In this example, the intermediate node options set 2555 includes at least nodes B, F, and G because these nodes have a direct connection to node C, but not node H because node H does not have a direct connection to node C. In particular, the subset of nodes in the set of possible $1^{st}$ relay nodes 2560-1 of FIG. 25D that are able to communicate with node C are selected. In some cases, node A stores the entirety of the set of possible $1^{st}$ relay nodes 2560-1 for communication with node E, and selects from this set based on the node identified in the initial route. For example, a plurality of sets of possible $1^{st}$ relay nodes 2560-1 are stored in local memory by node A for a plurality of different destination nodes that includes node E and/or for a plurality of different possible partial destination nodes that includes node C. In other cases, node A only stores the intermediate node options set 2555 for node C. For example, node A stores only intermediate node options set 2555 plurality of different destination nodes that includes node E and/or for a plurality of different possible partial destination nodes that includes node C, based on the initial route to node E being fixed and/or based on the initial route to each of the plurality of different destination nodes being fixed.

The intermediate node selection module 2546 generates the intermediate node selection data 2556 to select node F from the intermediate node options set 2555. This can be based on performance data for some or all of the set of nodes in the intermediate node options set 2555 that is determined, stored, estimated, and/or received by node A. While not illustrated, the corresponding data blocks for which this routing selection was made can then be sent to node F by node A based on the intermediate node selection data 2556 indicating node F, with an indication that these data blocks are to be sent to node E.

Figure 25F:
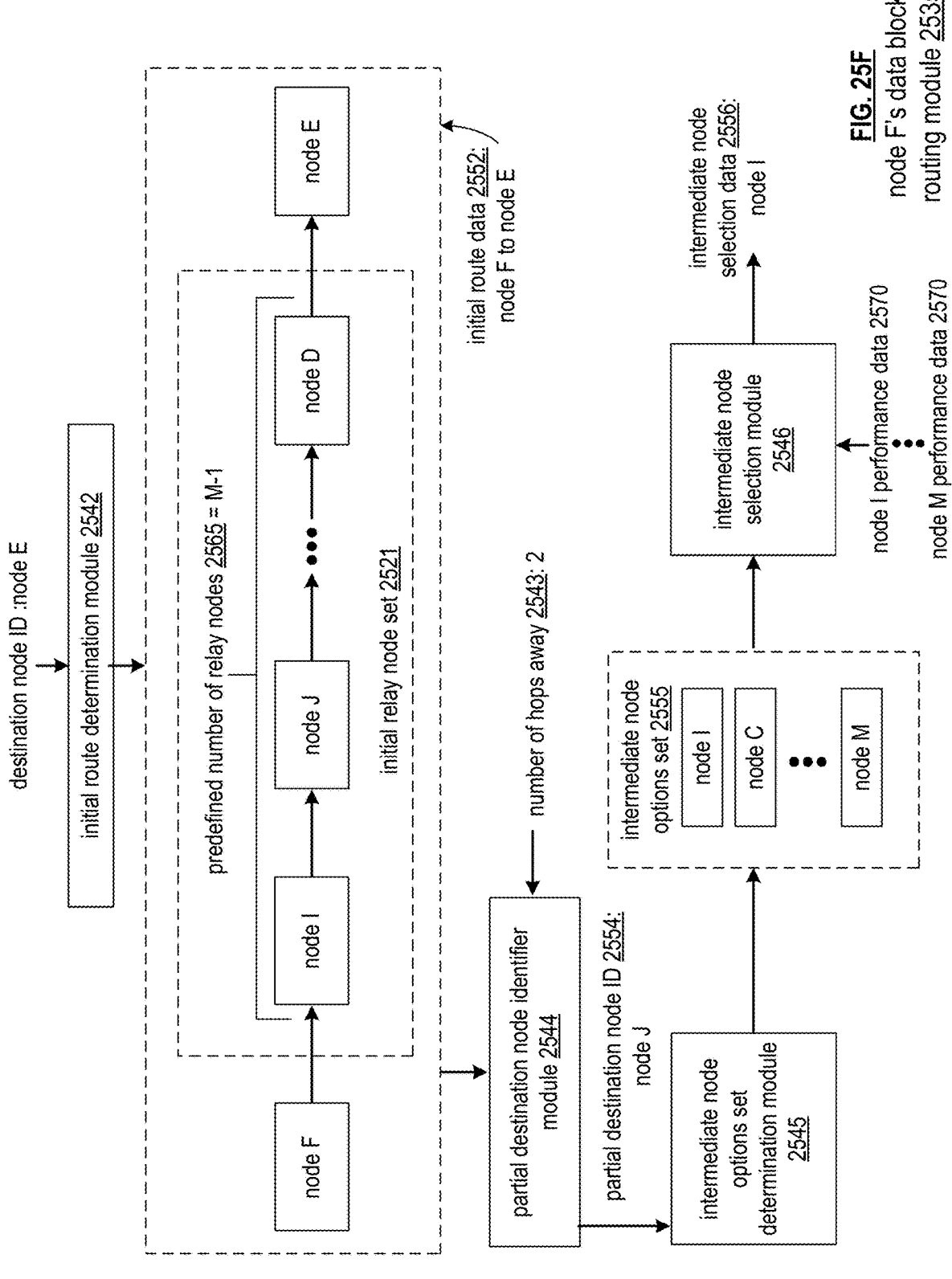

FIG. 25F continues this example by illustrating the data block routing module 2535 of node F when receives the data blocks from node A as a relay node in routing the data blocks to node E, and determines these received data blocks are destined for node E. The initial route data is generated by the initial route determination module to dictate the initial route from node F to node E. Note that this is distinct from the initial route from node A to node E, particularly because node B was not selected as the intermediate node by node A, and because node F was not included in node A's initial route to node E. However, node F stores and/or determines its own initial route to node E that is perhaps independent of the initial route from node A to node E. This initial route includes an initial relay node set that includes node I, node J and node D. This is valid as node I is in the possible $2^{nd}$ relay node set 2560-2 of FIG. 25D, node J can be in a possible 3rd relay node set 2560-3 not depicted in FIG. 25D, and node D is in the possible $M^{th}$ node relay node set 2560-M.

In cases where node B was selected by node A, the initial route determined by node B for communication from node B to node E may have included all of the same set of nodes in node A's initial route, starting from node B and continuing to node C, where this initial route is a truncated version of node A's initial route. In some cases, any node included in an initial route by a previous node must have a truncated version of that nodes initial route to the same destination node to continue with the path of this initial route. Alternatively, any node can have an independent initial route to the destination node regardless of whether they were in a previous initial route, where node B's initial route to node E does not include node C as the first relay node despite node C being the relay node after node B in node A's initial route.

Node F similarly applies the partial destination node identifier module 2544 to identify node J as the partial destination node ID based on node J being two hops away in the initial route data 2552, as denoted by the set number of hops away 2543 being set to two. The intermediate node options set determination module 2545 identifies at least nodes I, C, and M in the intermediate node options set 2555 based on these nodes having a direct connection to node J and based on node F having a direct connection to these nodes. For example, nodes O and P are not included, despite being in the possible $2^{nd}$ relay node set 2560-2 of FIG. 25D, because node F does not have a direct connection to nodes O and P. As another example, node N is not included, despite being in the possible $2^{nd}$ relay node set 2560-2 of FIG. 25D and being able to receive direct communications from node F, because while not depicted, node N does not have a direct connection to node J. The intermediate node selection module 2546 selects node I in the intermediate node selection data 2556, for example, by utilizing performance data for at least nodes I, C, and M of the intermediate node options set 2555. Node F then routes the data blocks to node I, designated for routing to node E, and this process continues until exactly M relay nodes are selected via this process and when the $M^{th}$ relay node ultimately sends the data blocks directly to node E.

In various embodiments, a node 37 includes at least one processor and memory that stores operational instructions that, when executed by the at least one processor, cause the node 37 to implement the data block routing module 2535 and/or to execute some or all of the functionality of the data block routing module 2535 described herein, for example, in conjunction with FIGS. 25A-25F. In particular, the operational instructions, when executed by the at least one processor, can cause the data block routing module 2535 to: determine to send at least one data block from the node to a destination node of a database system in accordance with execution of a query by the database system via a plurality of nodes that includes the node and the destination node; determine an initial route that includes a set of relay nodes for relaying the at least one data block from the node to the destination node, where the set of relay nodes of the initial route includes exactly a predefined number of relay nodes in accordance with a sequential relay ordering from the node to the destination node; identify a second relay node in the sequential relay ordering for the initial route; identify a set of intermediate node options by identifying nodes of the database system capable of receiving the at least one data block from the node via a first direct connection and further capable of sending the at least one data block to the second relay node via a second direct connection; generate intermediate node selection data by selecting one intermediate node from the set of intermediate node options; and/or transmit the at least one data block from the node to the one intermediate node indicated in the intermediate node selection data via the first direct connection to facilitate sending of the at least one data block from the node to the destination node via exactly the predefined number of relay nodes.

FIG. 25G illustrates a method for execution by at least one processing module of a node 37. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 25G. In particular, a node 37 can utilize the data block routing module 2535 to execute some or all of the steps of FIG. 25G, where multiple nodes 37 implement their own data block routing modules 2535 to independently execute the steps of FIG. 25G, for example, where some or all nodes 37 of a query execution plan 2405 implement data block routing modules 2535 to facilitate execution of a query. Some or all of the method of FIG. 25G can be performed by an initial route determination module 2542, a partial destination node identifier module 2544, an intermediate node option set determination module 2545, an intermediate node selection module 2546, and/or a data block transmission module 2548. Some or all of the steps of FIG. 25G can optionally be performed by any other processing module of the database system 10. Some or all of the steps of FIG. 25G can be performed to implement some or all of the functionality of the data block routing module 2535 and/or of one or more individual nodes 37 as described in conjunction with FIGS. 25A-25F. Some or all of the steps of FIG. 25G can be performed to implement some or all of the functionality regarding execution of a query via the plurality of nodes in the query execution plan 2405 as described in conjunction with FIGS. 24A-24E. Some or all steps of FIG. 25G can be performed by database system 10 in accordance with other embodiments of the database system 10 and/or nodes 37 discussed herein.

Step 2582 includes determining, by the node, to send at least one data block from the node to a destination node of the database system in accordance with execution of a query by the database system via a plurality of nodes that includes the node and the destination node. Step 2584 includes determining, by the node, an initial route, such as initial route data 2552, that includes a set of relay nodes, such as initial relay node set 2521, for relaying the at least one data block from the node to the destination node. For example, the initial route can be determined by utilizing initial route determination module 2542 and/or can be retrieved from storage in at least one memory of the node. The set of relay nodes of the initial route can include exactly a predefined number of relay nodes, such as the predefined number of relay nodes 2565, in accordance with a sequential relay ordering from the node to the destination node. Step 2586 includes identifying a second relay node in the sequential relay ordering for the initial route, for example, by utilizing the partial destination node identifier module 2544 to determine a node that is two hops away from the node in the initial route. Step 2588 includes identifying a set of intermediate node options by identifying nodes of the database system capable of receiving the at least one data block from the node via a first direct connection and further capable of sending the at least one data block to the second relay node via a second direct connection. For example, the set of intermediate node options can be identified by utilizing the intermediate node options set determination module 2545 and/or can be retrieved from storage in at least one memory of the node. Step 2590 includes generating intermediate node selection data, such as immediate node selection data 2556, by selecting one intermediate node from the set of intermediate node options. For example, the intermediate node selection data can be generated by utilizing the intermediate node selection module 2546. The one intermediate node can be the same or different from the first intermediate node indicated in the sequential relay ordering for the initial route. Step 2592 includes transmitting the at least one data block from the node to the one intermediate node indicated in the intermediate node selection data via the first direct connection to facilitate sending of the at least one data block from the node to the destination node via exactly the predefined number of relay nodes. For example, the a least one data block can be transmitted by utilizing data block transmission module 2548.

In various embodiments the set of intermediate node options includes a first relay node in the sequential relay ordering for the initial route, and the one intermediate node is different from the first relay node. In other cases, the one intermediate node can be selected to be the same as the first relay node in the sequential relay ordering for the initial route.

In various embodiments, the one intermediate node can facilitate sending of the at least one data block from the node to the destination node, for example, by implementing its own data block routing module 2535. This can include receiving the at least one data block from the node and/or determining the at least one data block is to be routed to the destination node. This can include determining a second initial route for relaying the at least one data block from the one intermediate node to the destination node that includes exactly one less than the predefined number of relay nodes in accordance with a second sequential relay ordering from the node to the destination node. The second sequential relay ordering can be a truncated version of the sequential relay ordering, for example, when the one intermediate node is selected by the node to be the first node in the sequential relay ordering of the initial route. Alternatively, the second sequential relay ordering can be distinct from the sequential relay ordering of the initial route, where one, multiple, or all nodes in the second sequential relay ordering are not included in the sequential relay ordering of the initial route.

The one intermediate node facilitating sending of the at least one data block from the node to the destination node can include identifying another second relay node in the second sequential relay ordering for the second initial route. This other second relay node can be the third relay node in the sequential relay ordering for the initial route. Alternatively, this other second relay node can be different from the third relay node in the sequential relay ordering for the initial route based on the second sequential relay ordering being distinct from the sequential relay ordering of the initial route. A second set of intermediate node options can be identified by the one intermediate node by identifying nodes of the database system capable of receiving the at least one data block from the one intermediate node via a third direct connection and further capable of sending the at least one data block to the another second relay node via a fourth direct connection. Second intermediate node selection data can be generated by selecting a second one intermediate node from the second set of intermediate node options. The at least one data block can be transmitted from the one intermediate node to the second one intermediate node indicated in the second intermediate node selection data via the third direct connection to facilitate sending of the at least one data block from the one intermediate node to the destination node via exactly the one less than the predefined number of relay nodes.

In various embodiments, a last intermediate node facilitates sending of the at least one data block from the node to the destination node, for example, by utilizing its own data block routing module 2535. This can include receiving the at least one data block from a penultimate intermediate node and/or by determining the at least one data block is to be routed to the destination node. This can include determining a third initial route for relaying the at least one data block from the last intermediate node to the destination node that includes no relay nodes based on a set of previously selected intermediate nodes having a size exactly equal to the predefined number of relay nodes. The set of previously selected intermediate nodes can include all relay nodes that received the at least one data block in conjunction with facilitating routing of the at least one data block from the node to the destination node, and the set of previously selected intermediate nodes includes last intermediate node based on being selected in intermediate node selection data generated by the penultimate intermediate node.

The last intermediate node can transmit the at least one data block from the last intermediate node to the destination node via a fifth direct connection based on the third initial route including no relay nodes, completing the full transmission from the node to the destination node via exactly the predefined number of intermediate nodes. In various embodiments, a set difference between the set of previously selected intermediate nodes and the set of relay nodes of the initial route is non-null. In various embodiments, an intersection between the set of previously selected intermediate nodes and the set of relay nodes of the initial route is null.

In various embodiments, the method includes determining a query operator execution flow, such as query operator execution flow 2433, for the query that includes a JOIN operator. For example, this can be based on receiving the query operator execution flow in accordance with determining participation in the corresponding query execution plan. The method can further include determining to send at least one data block from the node to the destination node of the database system based on execution of the JOIN operation. Alternatively or in addition, the destination node can be designated to perform the JOIN operation. The destination node can receive the at least one data block from the node based on its assignment to perform the JOIN operation in accordance with the query execution plan, and/or can process the at least one data block routed from the node in accordance with performing the JOIN operation.

In various embodiments, the method can include determining a query execution plan for the query, such as a query execution plan 2405, that indicates the node and the destination node are included in a shuffle set of nodes, such as a same shuffle node set 2485. Each of set of shuffle nodes can be included in an inner level, such as an inner level 2414, of a plurality of levels of the query execution plan. The method can include determining to send at least one data block from the node to the destination node of the database system based on determining the node and the destination node are included in the set of shuffle nodes of the query execution plan.

In various embodiments, the method includes determining performance data for the set of intermediate node options, such as performance data 2570 that is generated, received, or otherwise determined for some or all of the nodes in the set of intermediate node options. Generating the intermediate node selection data can be based on the performance data for the determined for the set of intermediate node options. In various embodiments, determining the performance data is based on determining utilization levels of nodes in the set of intermediate node options, determining communication latency of nodes in the set of intermediate node options, determining health degradation of nodes in the set of intermediate node options, determining outages of nodes in the set of intermediate node options, and/or determining an amount of recently routed data blocks to nodes in the set of intermediate node options. In various embodiments, generating the intermediate node selection data includes selecting the one intermediate node based on determining the one intermediate node has most favorable performance data of the set of intermediate node options. In various embodiments, generating the intermediate node selection data includes selecting the one intermediate node based on determining the performance data for the one intermediate node compares favorably to a predetermined performance threshold.

In various embodiments, the method further includes determining to send at least one additional data block from the node to the destination node of the database system in accordance with execution of the same query, and/or in accordance with a different query that is run concurrently and/or in sequence in relation to the query. The method can include determining the same or different initial route for relaying the at least one additional data block from the node to the destination node. For example, the initial route is the same as the initial route determined in step 2584 based on the initial route being fixed and/or stored in memory of the node. As another example, the initial route is different based on having changed from the initial route determined in step 2584. The method can include identifying the same or different second relay node in the sequential relay ordering for the initial route as determined in step 2586, for example, where the second relay node is the same when the initial route is the same and where the second relay node can be different when the initial route is different. The method can include identifying a new set of intermediate node options by identifying nodes of the database system capable of receiving the at least one data block from the node via a first direct connection and further capable of sending the at least one data block to the second relay node via a second direct connection. The new set of intermediate node options can be the same or different from the set of intermediate node options of step 2588.

In various embodiments, a set difference between the new set of intermediate node options and the set of intermediate node options is null. For example, the new set of intermediate node options can be the same based on the second relay node being the same and/or based on the set of intermediate node options for the second relay node being fixed and/or stored in memory of the node. In various embodiments, a set difference between the new set of intermediate node options and the set of intermediate node options is non-null. For example, the new set of intermediate node options can be different based on the second relay node being the different and/or based on the set of intermediate node options for the same second relay node being different. As another example, the set difference between the new set of intermediate node options and the set of intermediate node options is non-null based on detecting a failure of one of the set of intermediate node options, detecting a previously unavailable one of set of intermediate node options available, detecting a change in performance level of at least one of the set of intermediate node options, and/or detecting a change in physical network topology.

The method can further include generating new intermediate node selection data by selecting another intermediate node from the new set of intermediate node options, where this other intermediate node is distinct from the one intermediate node. For example, this other intermediate node is distinct from the one intermediate node based on a random, pseudo-random, and/or turn-based selection being applied to select the intermediate node from the same set of intermediate node options for each instance that data blocks are to be routed via the particular second relay node. As another example, this other intermediate node is distinct from the one intermediate node based on the performance data changing from the performance data utilized to generate the intermediate node selection data in step 2590, where this other intermediate node is selected based on having more favorable performance data than its performance data utilized in step 2590 and/or is selected based on having more favorable performance data at this time than the one intermediate node selected in step 2590. As another example, this other intermediate node is distinct from the one intermediate node based on the new set of intermediate node options being different than the new set of intermediate node options for the same second node of the initial route, for example, where this other intermediate node was not included in the set of intermediate node options determined in step 2588. As another example, this other intermediate node is distinct from the one intermediate node based on the second relay node being different due to a change in the initial route, where the corresponding set of intermediate node options is therefore different. In other cases, this other intermediate node is the same as the one intermediate node. The method can further include transmitting the at least one additional data block from the node to the another intermediate node indicated in the new intermediate node selection data via the same or different first direct connection to initiate sending of the at least one data block from the node to the destination node via exactly the predefined number of relay nodes.

In various embodiments, the method includes receiving the at least one data block from a previous node, for example, where the node serves as a relay node for transmitting the at least one data block to the destination node. For example, the previous node routed the at least one data block to the node by utilizing its own data block routing module 2535. The method includes determining to send at least one data block from the node to a destination node is based on determining the at least one data block is to be routed to the destination node via the node's participation as a relay node.

In various embodiments, the previous node determined to send the at least one data block to the node by determining another initial route that includes another set of relay nodes for relaying the at least one data block from the previous node to the destination node, where the another set of relay nodes of the another initial route includes exactly one more than the predefined number of relay nodes in accordance with another sequential relay ordering from the previous node to the destination node. The previous node identified another second relay node in this other sequential relay ordering for this other initial route. This other second relay node can be included in the set of intermediate node options identified by the node, for example, based on the node being operable to directly communicate with this another second relay node. The previous node identified another set of intermediate node options by identifying nodes of the database system capable of receiving the at least one data block from the previous node via a sixth direct connection and further capable of sending the at least one data block to the second relay node via a seventh direct connection. This another set of intermediate node options included the node, where the node may or may not have been the first node the other sequential relay ordering of the other initial route determined by the previous nodes. The previous node generated other intermediate node selection data by selecting the node from the set of intermediate node options. The previous node transmitted the at least one data block from the previous node to the node based on the other intermediate node selection data via the sixth direct connection to facilitate sending of the at least one data block from the previous node to the destination node.

In various embodiments, the method includes storing initial route data for a plurality of initial routes to at least a subset of the plurality of nodes in at least one memory of the node. For example, each of the plurality of initial routes were automatically calculated and/or generated by the node itself prior to storage, or were received, for example, based on being generated by another node or another processing module of the database system. One of the plurality of initial routes includes the initial route from the node to the destination node. Determining the initial route can include retrieving the initial route from the at least one memory based on determining to send at least one data block from the node to the destination node. In various embodiments, the method includes updating the initial route data for the initial route in the at least one memory based detecting a failure of one of the set of intermediate node options, detecting a previously unavailable one of the set of intermediate node options becoming available, detecting a change in performance level of at least one of the set of intermediate node options, and/or detecting a change in physical network topology.

In various embodiments, a non-transitory computer readable storage medium includes at least one memory section that stores operational instructions that, when executed by a processing module that includes a processor and a memory, cause the processing module to: determine to send at least one data block from a node associated with the non-transitory computer readable storage medium to a destination node of a database system in accordance with execution of a query by the database system via a plurality of nodes that includes the node and the destination node; determine an initial route that includes a set of relay nodes for relaying the at least one data block from the node to the destination node, where the set of relay nodes of the initial route includes exactly a predefined number of relay nodes in accordance with a sequential relay ordering from the node to the destination node; identify a second relay node in the sequential relay ordering for the initial route; identify a set of intermediate node options by identifying nodes of the database system capable of receiving the at least one data block from the node via a first direct connection and further capable of sending the at least one data block to the second relay node via a second direct connection; generate intermediate node selection data by selecting one intermediate node from the set of intermediate node options; and/or transmit the at least one data block from the node to the one intermediate node indicated in the intermediate node selection data via the first direct connection to facilitate sending of the at least one data block from the node to the destination node via exactly the predefined number of relay nodes.

FIG. 26A illustrates an embodiment of an initial route generator module 2610 operable to automatically generate initial route data 2552 for some or all pairs of nodes as initial route selection data, based on physical network topology data of the physical network of the plurality of nodes. To determine the initial routes utilized in the dynamic data block routing scheme described in conjunction with FIGS. 25A-25G, the physical network topology can be leveraged to enable intelligent selection of some or all of the initial route data 2552 and/or to determine the sets of intermediate nodes indicated in intermediate node options sets 2555 utilized by nodes as described in conjunction with FIGS. 25A-25G. This can include performance of a probing phase to generate a graph of varying weights utilized to generate initial routes between any pair of nodes and/or to generate initial routes between pairs of nodes that will transfer data blocks in query execution. This improves database systems by ensuring initial routes are more optimal in accordance with characteristics of the physical network topology, which enables routing of data blocks to be more efficient and/or enables query execution to be more efficient.

The initial route generator module 2610 can be implemented by utilizing one or more processing modules of the database system 10, for example, by utilizing one or more computing devices 18. The node network 2605 can include a plurality of nodes 37, such as some or all of the plurality of nodes utilized by the database system 10 as discussed herein, for example, in accordance with executing queries via query execution plans 2405 that each utilize some or all of the plurality of nodes 37 of the node network 2605. The node network 2605 further includes a plurality of direct connections between some pairs of plurality of nodes to facilitate communication between the plurality of nodes via the node network 2605. The node network 2605 can be utilized to implement one or more shuffle networks 2480 and/or one or more query execution plans 2405 for execution of one or more corresponding queries.

The initial route generator module 2610 is operable to generate initial route selection data indicating initial route data 2552 for each of a plurality of (source node, destination node) pairs. This can be accomplished via a network topology processing module 2620 and/or an initial route selection module 2630. The initial route generator module 2610 can generate, receive, and/or otherwise determine physical network topology data corresponding to the physical network topology of the node network 2605. For example, the physical network topology data is received by the initial route generator module 2610 from the node network 2605 itself via a network interface 2615 of the initial route generator module 2610. As a particular example, the initial route generator module 2610 can send a request to some or all nodes 37 of the node network 2605 for physical network topology data, and/or can perform a network probing process of the node network 2605 to determine the physical network topology data.

The physical network topology data can indicate the set of nodes 1-Y of the node network and can further indicate a plurality of direct connections 1-X between particular pairs of the plurality of nodes. The physical network topology can indicate differing types of network connections and/or communication protocols utilized for various direct connections. The physical network topology can indicate the location of nodes with respect to their ability to communicate in the network. The physical network topology data can be represented as graph data indicating the plurality of nodes as vertices and/or the plurality of direct connections as edges. The physical network topology data can indicate communication latency and/or other favorability metrics for some or all of the direct connections. The physical network topology data can indicate communication latency and/or other favorability metrics for particular nodes.

The initial route generator module 2610 can process this information utilizing a network topology processing module 2620. A direct connection weighing module 2622 can generate and/or determine a plurality of weights for each of the plurality of direct connections 1-X of the node network 2605 based on the physical network topology data. For example, each weight can indicate a favorability metric for use of the corresponding direct connection in a particular route of a particular pair of nodes and/or for use in any route of any particular pair of nodes. This can be based on expected communication latency of the direct connection, a number of edges that each of the corresponding pair of nodes includes, a location of the direct connection with respect to other nodes and/or direct connections in the network, a connectivity metric of the direct connection, and/or other information.

Alternatively or in addition, a node weighing module 2624 can generate and/or determine a plurality of weights for each of the plurality of nodes 1-Y of the node network 2605 based on the physical network topology data. For example, each weight can indicate a favorability metric for use of the corresponding node 37 in a particular route of a particular pair of nodes and/or for use in any route of any particular pair of nodes. This can be based on expected communication latency of the node, a number of direct connections to other nodes from the node, a location of the node with respect to other nodes and/or direct connections in the network, a connectivity metric of the node, and/or other information.

Alternatively or in addition, a node route pair determination module 2626 can determine a plurality of node pairs 1-Z for which a corresponding initial route is to be determined by the initial route generator module 2610. For example, this can be based on determining nodes included in same shuffle node sets 2485 and/or determining pairs of nodes that will or will node otherwise be required to exchange data in accordance with query execution. In some cases, this can further include determining communication frequency data for some or all of the pairs of nodes 1-Z to indicate how frequently data needs to be communicated by the corresponding pair and/or how much data needs to be communicated by the corresponding pair based on historical communication data tracked for previous queries, based on level assignment data and/or other information regarding the nodes' roles in query execution plans, and/or based on other information.

Alternatively or in addition, a node route pair determination module 2628 can generate and/or determine a plurality of weights for each of the plurality of node pairs 1-Z of the node network 2605 based on the physical network topology data. In some cases, this can include determining only possible routes that include less than or equal to a threshold number of relay nodes, such as the predetermined number of relay nodes M determined for the corresponding pair of nodes. Alternatively, the predetermined number of relay nodes M is not determined until the corresponding initial route is ultimately selected based on the number of nodes in the ultimately selected initial route. Some or all node pairs 1-Z can have a set of possible routes, such as a plurality of possible routes to be considered as candidate routes for the initial route to be selected for the corresponding node pair.

An initial route selection module 2630 can generate initial route data 2552 for some or all of the node pairs 1-Z. This can include selecting a most favorable one of the set of possible routes for each node pair. This can include determining a favorability score for each of the set of possible routes for each node pair, where each possible route's favorability score is calculated as a function of the direct connection weights of direct connections included in the possible route and/or is calculated as a function of the node weights of nodes included in the possible route. The possible route for a given node pair with the most favorable favorability score of all possible routes of the given node pair is selected as the initial route, and/or where a possible route for a given node pair a favorability score that compares favorably to a favorability score threshold is selected as the initial route. In some cases, initial routes are selected for different pairs of nodes to disperse and/or balance initial paths that will be taken across the network to reduce congestion and/or load to any particular node and/or direct connection by ensuring that each node and/or direct connection is not included in more than a predefined threshold number and/or proportion of initial routes.

In some cases, the initial route for a given node pair is selected based on having a minimum possible number of relay nodes for all possible routes between the source node and destination node of the given node pair. In other cases, the number of relay nodes in the selected initial route must be included in at least a threshold number of other possible routes, for example, to enable application of the dynamic route selection scheme to achieve a sufficient number of routes selected for routing of different data between the source node and destination node with the predetermined number of relay nodes. In these cases, rather than selecting an initial route with the smallest possible number of relay nodes, for example, where this initial route is included in a small number of possible paths from the source node to the destination node that can be accomplished this smallest possible number of relay nodes, an initial route is selected such that its number of relay nodes in included in a number of possible paths that is sufficiently large and/or compares favorably to a threshold minimum number of possible routes. For example, the minimum number of relay nodes M that can be selected such that the corresponding number of possible paths that have exactly M relay nodes compares favorably to the threshold minimum number of possible routes, and the initial route is then selected from the possible paths in this corresponding number of possible paths with exactly M relay nodes.

Each initial route data 2552 data of the initial route selection data can be sent by the initial route generator module 2610 to the node network 2605 via its network interface 2615. In particular, each initial route data 2552 data of the initial route selection data corresponding source node, destination node, and/or relay nodes of the node network 2605 indicated in the initial route data 2552 via the direct connections of the node network 2605. For example, particular initial route data 2552 of the initial route selection data can be routed to appropriate nodes within the network via a plurality of relay nodes. For example, the relay nodes utilize the currently received initial route data 2552 corresponding to their own routing that was received from the initial route generator module 2610 to route other initial route data for other nodes to the corresponding nodes as data blocks via their respective data block routing modules 2535 as described in conjunction with FIGS. 25A-25G, and/or the relay nodes utilize previously versions of the initial route data 2552 corresponding to their own routing that was previous received from the initial route generator module 2610 as a prior version of the initial route selection data to route the other initial route data for other nodes to the corresponding nodes as data blocks via their respective data block routing modules 2535 as described in conjunction with FIGS. 25A-25G.

In some cases, some or all nodes 37 can implement their own initial route generator module 2610. For example, the initial route generator module 2610 of a particular node 37 can probe the network of other nodes to determine physical network topology data and/or can otherwise receive physical network topology data, and can process the physical network topology data to generate initial route data 2552 for given node to some or all possible destination nodes, where the initial route data 2552 is generated for only pairs of node that include the given node as the source node. In some cases, the node can send the initial route data 2552 to some or all relay nodes indicated in the initial route data 2552 for some or all destinations, for example, by implementing its data block routing module 2535 to route the initial route data 2552 as data blocks routed to other nodes as described in conjunction with FIGS. 25A-25G by utilizing the currently determined initial route data and/or a previous version of the initial route data. These relay nodes can receive and store the initial route data 2552 sent from the given node to determine their initial route to the corresponding some or all destinations, based on determining a truncated portion of the initial route form the source node to destination node starting from the given relay node. Alternatively, a node can implement its initial route generator module 2610 to generate some initial route data 2552 for pairs of node that include other source nodes, where the node further routes this initial route data 2552 to the other source nodes, for example, by implementing its data block routing module 2535 to route the initial route data 2552 as data blocks routed to other nodes as described in conjunction with FIGS. 25A-25G by utilizing the currently determined initial route data and/or a previous version of the initial route data.

Each node 37, upon receiving a plurality of initial route data 2552 from the initial route generator module 2610 directly via a direct connection; upon receiving a plurality of initial route data 2552 from the initial route generator module 2610 directly via a plurality of relay nodes utilizing their data block routing modules 2535 utilizing their own initial route data 2552 received from the initial route generator module 2610; and/or upon determining a plurality of initial route data 2552 by implementing its own initial route generator module 2610 utilizing its own processing and/or memory resources; can store this received and/or determined plurality of initial route data 2552 in its own local memory via a memory module 2640 implemented by each node 37. As illustrated in FIG. 26B, the memory module can store the plurality of plurality of initial route data 2552 mapped to the corresponding destination node, where a plurality of distinct destination nodes 1-V that the node is operable to communicate with has corresponding initial route data 255-1-2552-V stored by the memory module 2640, each mapped to a corresponding one of a plurality of destination identifiers 1-V. Each destination 1-V can be a distinct node: when the node determines to route a generated and/or incoming data block to a given destination node, it can indicate the corresponding destination ID in a request to the memory module, and can fetch the corresponding initial route data 2552 for the denoted destination ID from the memory module 2640 in response for use by the data block routing module 2535 to determine the selected intermediate node 2525 to which the corresponding data block is to be sent in accordance with its routing to the destination, as discussed in conjunction with FIGS. 25A-25G.

FIG. 26B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, some or all of the steps of FIG. 26B. The database system can utilize the initial route generator module 2610 of FIG. 26A and/or can utilize data block routing module 2535 of a plurality of nodes 37 to facilitate execution of some or all of the steps of FIG. 26B. In particular, a node 37 can utilize the data block routing module 2535 to execute some or all of the steps of FIG. 26B, where multiple nodes 37 implement their own data block routing modules 2535 to independently execute the steps of FIG. 25G, for example, where some or all nodes 37 of a query execution plan 2405 implement data block routing modules 2535 to facilitate execution of a query. Some or all of the steps of FIG. 26B can optionally be performed by any other processing module of the database system 10. Some or all of the steps of FIG. 26B can be performed to implement some or all of the functionality of the initial route generator module 2610, some or all data block routing modules 2535, and/or of one or more individual nodes 37 as described in conjunction with FIGS. 25A-25G and/or as described in conjunction with FIG. 26A. Some or all of the steps of FIG. 26B can be performed to implement some or all of the functionality regarding execution of a query via the plurality of nodes in the query execution plan 2405 as described in conjunction with FIGS. 24A-24E. Some or all steps of FIG. 26B can be performed by database system 10 in accordance with other embodiments of the database system and/or nodes 37 discussed herein.

Step 2682 includes determining physical network topology data of a plurality of nodes of the database system utilized to facilitate query executions, for example, by utilizing the initial route generator module 2610. The physical network topology data can indicate or be based on direct connections and/or routed connections that are possible between various pairs of relay nodes given the physical network structure.

Determining the physical network topology data can include determining minimum distances between pairs of nodes as a minimum number of relay nodes. This can include determining one or more possible routes between some or all pairs of nodes. Determining the physical network topology data can include a probing phase of the physical network to generate graph data for the plurality of nodes, where the plurality of nodes are depicted as vertices in the graph data and/or where direct connections between various ones of the plurality of nodes are depicted as unidirectional or bidirectional edges of the graph data connecting corresponding ones of the plurality of nodes with direct connections. Determining the physical network topology data can include evaluating one or more connectivity metrics of the graph data. Determining the physical network topology data can include determining a minimum spanning tree of the graph data. Determining the physical network topology data can include determining nodes with corresponding vertices in the graph data with at least a threshold number of edges and/or determining nodes with corresponding vertices in the graph data with less than a threshold number of edges.

Determining the physical network topology data can include generating a plurality of weights to be assigned to the plurality of edges of the graph based on the probing phase. For example, an edge's weight can be determined based on: expected and/or measured communication latency between the corresponding pair of nodes via the corresponding direct connection; a type of communication protocol utilized via the corresponding direct connection; an expected and/or measured load of communication via the corresponding direct connection; a number of edges of each vertex bounding the given edge; whether the edge is included in a minimum spanning tree determined for the graph data; and/or information regarding favorability of the given edge for use in a route between a given pair of nodes and/or for use in any route between any pair of nodes. In some cases, each of the plurality of weights are generated in accordance with determining weights for a minimum spanning tree of the graph data.

Step 2684 includes generating initial route selection data, for example, by utilizing the initial route generator module 2610. The initial route selection data can indicate a set of initial relay nodes for some or all of a plurality of pairs of the plurality of nodes based on the physical network topology data. The initial route selection data of a given pair of the plurality of nodes can be generated by selecting one of a plurality of possible initial route options determined for the given pair of the plurality of nodes, to generate initial routes between any pair of nodes and/or to generate initial routes between pairs of nodes that will transfer data blocks in query execution. This can include determining a plurality of possible initial route options determined for some or all possible pairs of the plurality of nodes. This can include determining route favorability data for each of the possible initial route options, based on the physical network topology data.

In some cases, the plurality of weights for the plurality of edges correlate to and/or indicate an edge favorability level of the corresponding plurality of direct connections for use in a route between a given pair of nodes and/or for use in any route between any pair of nodes. The route favorability level for each possible initial route option can be determined as a sum of, average of, or other function of the plurality of weights assigned to the plurality vertices for a plurality of direct connections of a given set of relay nodes of the possible initial route option.

For example, a first route favorability level for a first route option between a pair of nodes indicates a first sum and/or average of corresponding weights for the direct connections in the first route option. A second route favorability level for a second route option between the pair of nodes indicates a second sum and/or average of corresponding weights for direct connections in the second route option. The first route option is selected rather than the second route option based on the first route favorability level being more favorable than the second route favorability level and/or based on the based on the first route favorability level being more favorable than all other favorability levels for all other route options in the set of possible route options between the pair of nodes.

In various embodiments, the initial route selection data for the plurality of pairs is selected to disperse communication paths across different possible edges of the corresponding graph data, for example, to balance load via a plurality of different communication paths. This can include ensuring no direct connection and/or set of sequential direct connections being expected to be too congested by ensuring no direct connection and/or set of sequential direct connections is included in more than a predetermined threshold number of initial routes. This can include ensuring no individual node and/or set of nodes being expected to be too congested by ensuring no node and/or set of nodes is included in more than a predetermined threshold number of initial routes.

In some cases, pairs of nodes are rated with a communication frequency rating and/or communication load rating to indicate how much data and/or how often data is expected to be transferred between the pairs of nodes. This can be utilized to apply usage weights to the corresponding set of direct connections and/or to the corresponding set of relay nodes of each route based on how much the given route is expected to be used, in accordance with the communication frequency rating for the corresponding pair of nodes. Balancing the load via a plurality of different communication paths can be weighted by and/or based on differing communication frequency ratings for different pairs of nodes and/or the corresponding usage weights applied to the corresponding set of direct connections and/or relay nodes included in the possible initial routes or a selected initial route.

Step 2686 includes sending the initial route selection data to the plurality of nodes for storage in local memory of the plurality of nodes. For example, different initial route selection data indicating a set of initial relay nodes is generated for some or all pairs of the plurality of nodes. The initial route selection data generated for a given pair of nodes is sent to a source node of the pair of nodes, to a destination node of the pair of nodes, and/or to some or all of the set of initial relay nodes indicated in the initial route selection data generated for the given pair. For example, a given node can receive and locally store initial route selection data for a plurality of routes in which it is included as a source node, destination node, or relay node, for a plurality of different pairs.

Step 2688 includes generating a query resultant by facilitating execution of a query, for example, via the plurality of nodes in accordance with a corresponding query execution plan 2405. This can include facilitating routing of data blocks between at least one of the plurality of pairs of the plurality of nodes via a set of intermediate nodes selected by a subset of the plurality of nodes based on the initial route selection data in accordance with a dynamic data block routing scheme, for example where the dynamic data block routing scheme is implemented via one or more embodiments discussed in conjunction with FIGS. 25A-25G and/or where the where the dynamic data block routing scheme is implemented via the subset of nodes each implementing a data block routing module 2535 of FIGS. 25B-25F. For example, in facilitating execution of the query, at least one data block is routed from a source node of one of the plurality of pairs to a destination node of the one of the plurality of pairs via implementation of a data block routing module by a subset of the plurality of nodes. Implementation of the data block routing module by each node in the subset of the plurality of nodes includes utilizing the initial route selection data to determine an intermediate node based on the initial route selection data.

In various embodiments, each node in the subset of the plurality of nodes utilized to route the least one data block from the source node to the destination node is included in the set of initial relay nodes indicated in the initial route selection data generated for the pair of nodes that includes the source node and the destination node. In various embodiments, at least one node in the subset of the plurality of nodes utilized to route the least one data block from the source node to the a destination node is not included in the set of initial relay nodes indicated in the initial route selection data generated for the pair of nodes that includes the source node and the a destination node, for example, where this different node was selected from an intermediate node options set that includes one node from the initial relay node set, where the different node and the one node from the initial relay node set are both included in the same possible $i^{th}$ relay node set 2560. In various embodiments, a number of nodes in the set of initial relay nodes must be and/or otherwise is equal to a number of nodes in the subset of nodes that were utilized to relay the at least one data block from the source node to the destination node, even if a set difference between the subset of nodes that were utilized to relay the at least one data block from the source node to the destination node and the set of initial relay nodes of the initial route data for the pair of nodes that includes this source node and destination node is non-null.

In various embodiments, the initial route selection data generated for a given pair of nodes is sent only to a source node of the pair of nodes. For example, a given node can receive and locally store initial route selection data for each of a plurality of routes for which it is the source node, where each of the plurality of routes has a different destination node. One of the locally stored initial route selection data with a corresponding destination node is accessed from the local memory based on the node receiving or generating data to be routed to the corresponding destination node. Note that the given node can be implemented as a relay node in a relay node set 2520 for relaying data blocks of a source node that generated the data blocks, but the given node acts deter-mines the initial route data to the destination node for a pair in which it is the source node, as transfer of the data from the actual source node to the given node via one or more previous relay nodes is, in some or all cases, irrelevant to the given node in determining the remainder of the path to the destination node.

In various embodiments, the initial route selection data generated for a given pair of nodes and sent to a source node of the pair of nodes indicates the entirety of the set of initial relay nodes selected in the initial route selection data to the destination node. In other cases, the initial route selection data generated for a given pair of nodes and sent to a source node of the pair of nodes is only a truncated route such as truncated route data, which constitutes a proper subset of nodes of the entire initial route, that includes only up to the partial destination node in accordance with the predeter-mined number of hops away 2543.

In various embodiments, any first pair of nodes that are included within the initial route of a second pair of nodes must have their own initial route of initial relay nodes that constitute a proper subset of the initial route this second pair of nodes. In other cases, a first pair of nodes that are included within the initial route of a second pair of nodes may have their own initial route of initial relay nodes that includes at least one node not included in the initial route of this second pair of nodes.

Figures 27A, 27B:
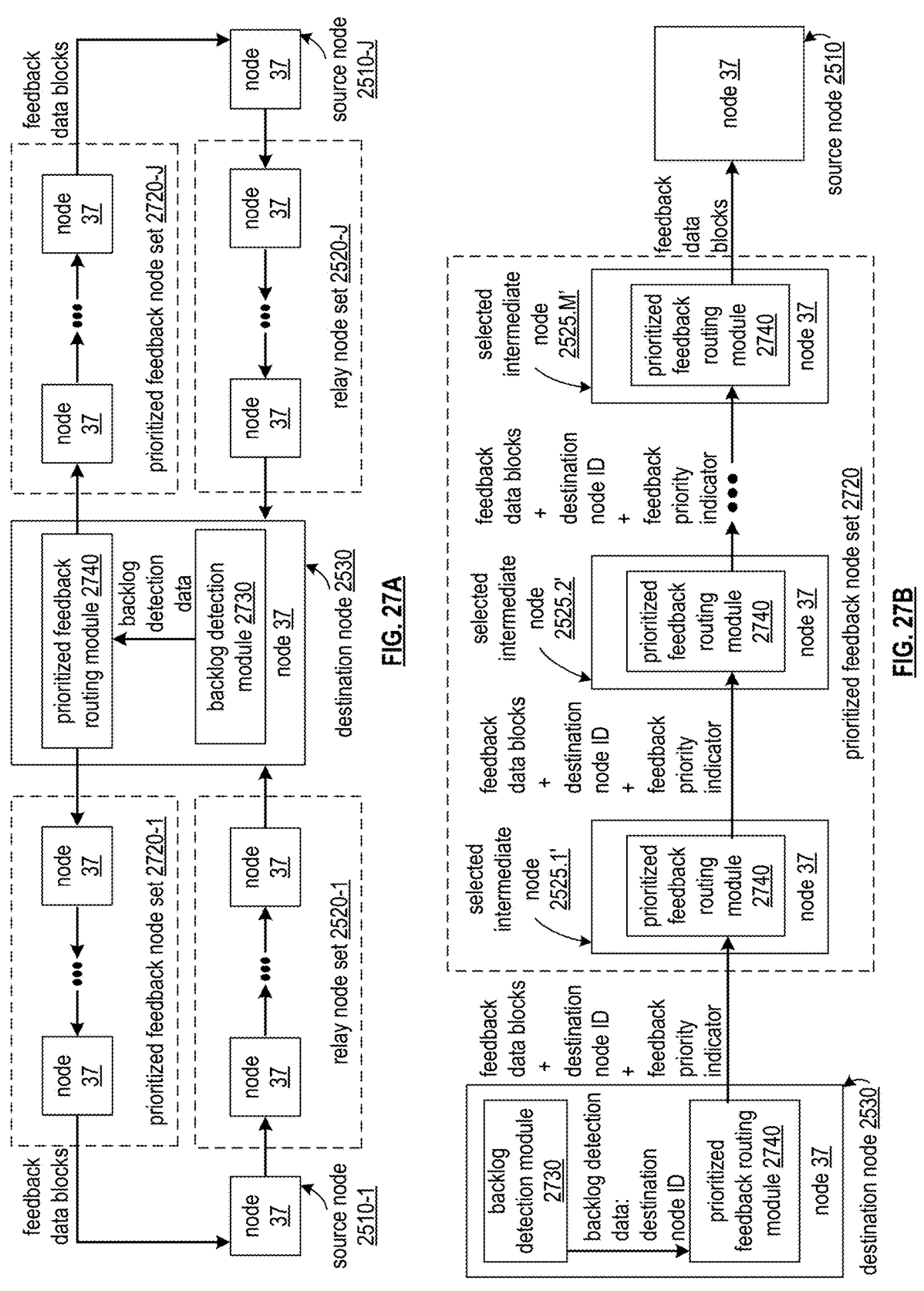
FIG. 27A is a schematic block diagrams of prioritized feedback node sets utilized to route feedback data blocks in accordance with various embodiments of the present invention.
FIG. 27B is a schematic block diagrams of nodes in prioritized feedback node set that each utilize a prioritized feedback routing module to route feedback data blocks in accordance with various embodiments of the present invention.
Figure 27C:
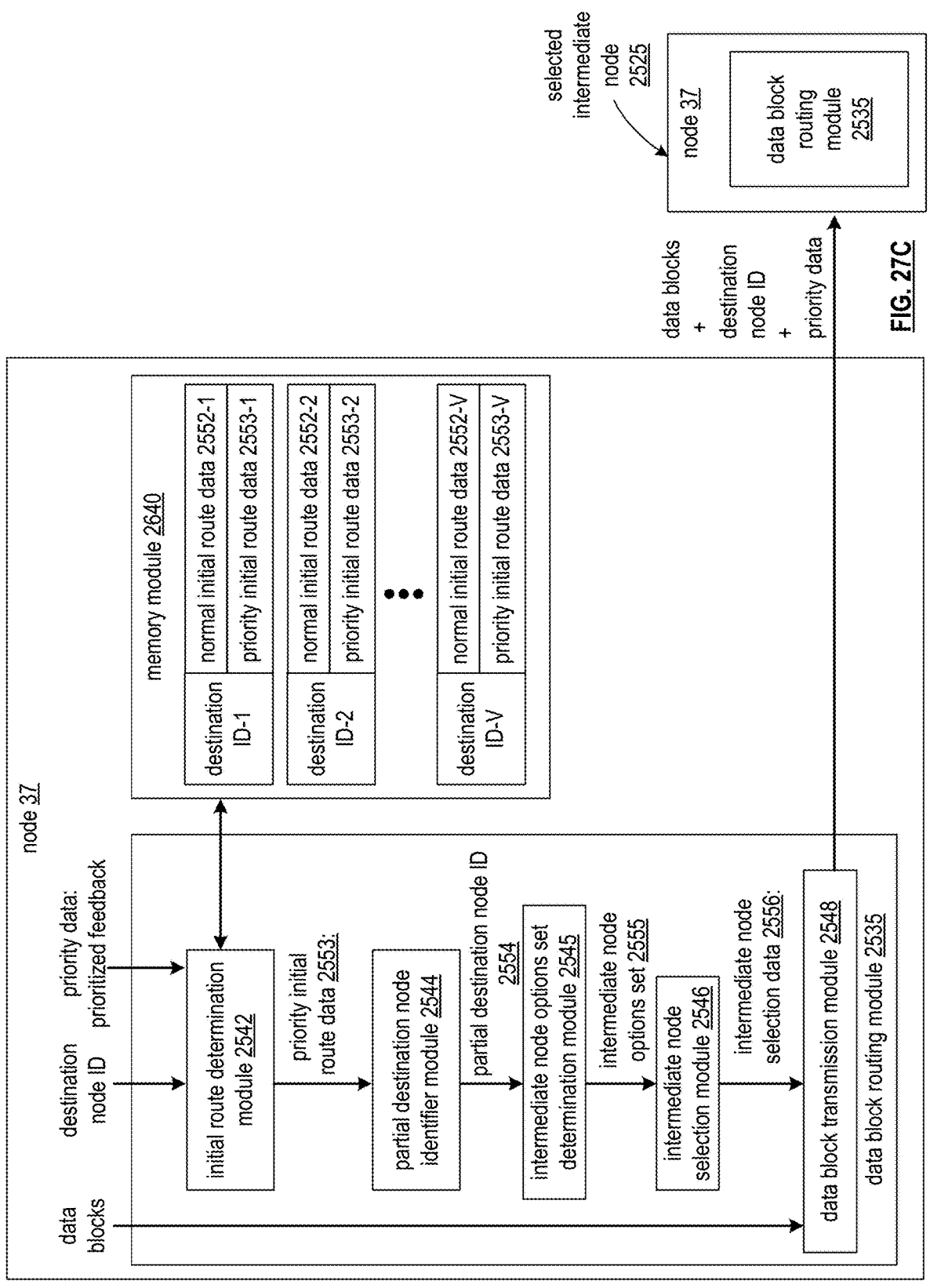
FIG. 27C is a schematic block diagram of a data block routing module operable to perform in accordance with a prioritize feedback routing mode in accordance with various embodiments of the present invention.

FIGS. 27A-27C illustrate embodiments of nodes of the database system that are operable to implement a prioritized feedback routing mechanism to prioritize the routing of feedback data blocks over the routing of other types of "normal" data blocks, such as the data blocks generated by the query processing module 2435 in accordance with query execution discussed previously. When a node, such as a particular node receiving data blocks as a relay node of a relay node set 2520 and/or a destination node 2530, has too much backpressure to continue receiving and processing data blocks effectively, they can generate feedback for transmission to the source nodes and/or relay nodes that sent these data blocks to instruct these nodes to stop and/or slow their transmission of data blocks, and/or to reroute their transmission via a different node. However, the latency involved in relaying this information can be timely, where the corresponding source nodes may continue to send suf-ficiently more data blocks before ever receiving this mes-sage. This feedback can therefore be prioritized for routing back to the source node via a prioritized feedback routing mechanism.

The prioritized feedback routing mechanism can include instructing selected intermediate nodes 2525 of the relay node set 2520, which may also be receiving normal data blocks from other nodes for routing, to prioritize these feedback data blocks over the normal data blocks to ensure they are more quickly routed to the source node. For example, each relay node may have a queue of data blocks to be routed to various nodes in turn-based fashion as they are received, where the feedback data blocks are automati-cally prioritized to be processed and sent before some or all other normal data blocks in the queue even if they were received after these other data blocks. The prioritized feed-back routing mechanism can alternatively or additionally include destination of some nodes 37 of the database system 10 for only routing such feedback communications to ensure that the channel is not congested with data blocks as well, also ensuring faster delivery of this information to the source nodes. In some cases, these feedback designated nodes also route other data blocks as relay nodes, but may be desig-nated to route fewer of such data blocks. In some cases, such a feedback routes between a pair of nodes utilized to route prioritized feedback data blocks may include a smaller number of nodes than the predefined number of nodes M that would be utilized to transmit normal data blocks to ensure the prioritized feedback data blocks are routed more quickly.

As illustrated in FIG. 27A, a destination node 2530, can receive a plurality of data blocks from a plurality of source nodes 2510-1-2510-J via a corresponding plurality of relay node sets 2520-1-2520-J. For example, these data blocks are routed via a relay node sets 2520 from a corresponding source node 2510 via the dynamic data block routing scheme discussed in conjunction with FIGS. 25A-25G. In some cases, this destination node 2530 is alternatively or additionally serving as a particular relay node included in some or all of the plurality of relay node sets 2520-2520-J. FIG. 27A can serve as an extension of the embodiment illustrated in FIG. 25A, illustrating how feedback data can be sent by the destination node 2530 of FIG. 25A back to one or more source nodes 2510 that send data blocks to the destination node via a corresponding relay node set 2520 as illustrated in FIG. 25A.

A backlog detection module 2730 can be implemented by the node to detect or otherwise determine whether backlog threshold condition has been meet, for example, based on a rate and/or amount of data blocks being received via each relay node set 2520-1-2520-J at a particular time meeting and/or otherwise comparing unfavorably to the backlog threshold condition and/or based on the node otherwise determining it is unable to effectively process data blocks at the given rate. In some cases, the backlog detection data detects that the performance of the node itself is degrading and/or failing, and that communication to the node should therefore be slowed and/or abandoned entirely due to this degradation in performance. The backlog detection data can indicate one or more particular source nodes 2510 that should slow and/or halt their sending of data blocks to the given nodes based on detecting only these particular nodes are sending too much data and/or sending their data blocks too quickly. The backlog detection data can indicate all source nodes 2510 and/or relay nodes need to slow and/or halt their sending of data blocks to the given node. In some cases, some or all nodes 37 of the database system implement the backlog detection module 2730 in this fashion based on data blocks they receive from other nodes.

A prioritized feedback routing module 2740 can be implemented by the destination node based on the backlog detection data, for example, to generate and/or transmit feedback data blocks to some or all source nodes and/or relay nodes as indicated in the backlog detection data that include instructions for execution these source nodes and/or relay nodes to stop and/or slow their rate of transmission to the given node as necessitated by and/or indicated in the backlog detection data. The prioritized feedback routing module 2740 can facilitate routing of these feedback data blocks back to the necessary nodes, such as all source nodes 2510-1-2510-J by selecting and/or facilitating use of a prioritized feedback communication mechanism. As illustrated in FIG. 27A, applying the prioritized feedback communication mechanism can include routing feedback data blocks to source nodes 2510-1-2510-J via prioritized feedback node sets 2720-1-2720-J. Each source node and/or relay node, upon receiving the feedback data blocks, can implement the instructions included in the feedback data blocks to stop and/or slow their rate of transmission to the given node accordingly.

The prioritized feedback routing module 2740 can be implemented by the data block routing module 2535 of the node, where the data block routing module 2535 operates in a prioritized feedback routing mode rather than a normal data block routing mode to route the data blocks via the prioritized feedback communication mechanism rather than the normal dynamic data block routing scheme discussed in conjunction with FIGS. 25A-25G. In such cases, the dynamic data block routing scheme can be applied to implement the prioritized feedback communication mechanism of the prioritized feedback module 2740, for example, as discussed in conjunction with FIGS. 27B-27C. In other cases, the prioritized feedback routing module 2740 is separate from the data block routing module 2535. In some cases, the prioritized feedback routing module 2740 does not implement the dynamic data block routing scheme discussed previously, for example, where each feedback node set 2720-1-2720-J is known to the node and/or is fixed to enable a predetermined, consistent path for routing of feedback data.

While the prioritized feedback node sets 2720-1-2720-J are illustrated to be distinct from the relay node sets 2520-1-2520-J, each prioritized feedback node set can include some or all nodes of one or more relay node sets 2520-1-2520-J. For example the nodes in the prioritized feedback node sets 2720-1-2720-J can transmit some normal data blocks by participating in one or more relay node sets 2520 in addition to sending the feedback data blocks via participation in a prioritized feedback node set 2720. In other cases, the prioritized feedback node sets 2720-1-2720-J are always distinct from the relay node sets 2520-1-2520-J, for example, where the nodes in the prioritized feedback node sets 2720-1-2720-J transmit only feedback data blocks at a particular time and/or all of the time.

FIG. 27B illustrates an embodiment of a prioritized feedback communication mechanism that applies some or all features of the dynamic data block routing scheme discussed previously to determine the final prioritized feedback node set 2720 as a plurality of selected intermediate nodes

2525.1'-2525.M'. FIG. 27B can serve as an extension of the embodiment illustrated in FIG. 25B, where the source node 2510 and destination node 2530 of FIG. 27B can be the same as the source node 2510 and destination node 2530 of FIG. 25B to illustrate how feedback data is routed from the destination node 2530 back to the source node 2510 of FIG. 25B. The prioritized feedback routing module 2740 of each node can be operable to select a selected intermediate node 2525 in a same or similar fashion as discussed in conjunction with FIGS. 25B and/or and 25C.

The destination node 2530 utilizes its prioritized feedback routing module 2740 to selects selected intermediate node 2525.1', and destination node 2530 and sends the feedback data blocks, the destination node ID that denotes source node 2510, and/or a feedback priority indicator to selected intermediate node 2525.1' accordingly. Based on receiving this information from destination node 2530, the selected intermediate node 2525.1' utilizes its own prioritized feedback routing module 2740 to select that the next node in the prioritized feedback node set 2720 be selected intermediate node 2525.2', and forwards some or all of this information to selected intermediate node 2525.2'. Each selected intermediate node can select the next selected intermediate node in the prioritized feedback node set 2720 accordingly until selected intermediate node 2525.M' is selected by selected intermediate node 2525.M-1', where selected intermediate node 2525.M' sends the feedback data blocks to the source node based on the source node being indicated by the destination node ID and based on selected intermediate node 2525.M' having a direct connection with source node 2510.

Some or all of the plurality of selected intermediate nodes 2525.1'-2525.M' of FIG. 27B can be the same or different from the plurality of selected intermediate nodes 2525.1-2525.M of FIG. 25B. The value of M in FIG. 27B can be strictly the same as, or may alternatively be different from, the value of M in FIG. 25B. For example, a same or different initial route of the same or different number M nodes from source node 2510 to destination node 2530 utilized by the data block routing module 2535 of FIG. 25A can be utilized by the prioritized feedback routing module 2740 of the destination node 2530.

FIG. 27C illustrates an embodiment of a data block routing module 2535 that is operable to be implemented as the prioritized feedback routing module 2740 of FIG. 27A and/or 27B, for example, in accordance with operating in one of a plurality of modes of the data block routing module 2535 that includes at least a normal data block routing mode and a prioritized feedback routing mode. For example, priority data can be extracted from or indicated by different types of data blocks, where normal data blocks discussed previously have a normal priority level and where feedback data blocks corresponding to prioritized feedback as illustrated in FIGS. 27A and/or 27B has a feedback priority level, where the feedback priority level is a higher priority level than the normal priority level or otherwise indicates that the corresponding feedback data blocks be processed and/or routed differently by the data block routing module 2535 than normal data blocks.

In the embodiment illustrated in FIG. 27C, the different processing of prioritized feedback in accordance with the data block routing module 2535 operating in accordance with the prioritized feedback routing mode includes applying a different initial route to prioritized feedback data block than the initial route applied to normal data blocks. For example, the memory module 2640 of FIG. 26A of some or all node 37 each store predetermined initial routes from the given node to each of a set of V destination nodes as discussed previously. However, each of the set of V destination nodes can have normal initial route data 2552 and priority initial route data 2553, where the priority initial route data 2553 contains the same or similar type of information as the initial route data 2552 discussed herein, but specifically is to be utilized only for prioritized feedback, where the priority initial route data 2553 indicates a different set of relay nodes from the priority initial route data 2553 to the same destination of the same number of M relay nodes or a different number of M relay nodes, for example, where the predetermined number of relay nodes 2565 for the priority initial route data 2553 is strictly less than the predetermined number of relay nodes 2565 for the normal initial route data 2552 of the same destination. In some cases, both the priority initial route data 2553 and the normal initial route data 2552 for some or all (source node, destination node) pairs is generated by the initial route generator module 2610 of FIG. 26A. In some cases, the priority initial route data 2553 and the normal initial route data 2552 are identical for some or all destination nodes 1-V, for example, where other adaptations of the data block routing module 2535 are instead utilized to prioritize the feedback data blocks over normal data blocks.

In such embodiments, in accordance with applying the prioritized feedback communication mechanism, the initial route determination module 2542 further utilizes priority data of incoming data blocks as input to determine whether the input data blocks are normal data blocks or correspond to prioritized feedback. In this example, the data blocks to be routed correspond to prioritized feedback based on the priority data, and therefore the priority initial route data 2553 to the destination node denoted by the destination identifier is selected by the initial route determination module 2542. In other cases, when the data blocks routed to a destination node are determined to correspond to normal data blocks, the normal initial route data 2552 to the to the destination node denoted by the destination identifier is instead selected by the initial route determination module 2542. In some cases, some or all destinations 1-V are designated for routing by the given node for prioritized feedback only, where some or all some or all destinations 1-V are therefore only have a priority initial route data 2553 from the node and not normal initial route data 2552 from the node.

Given the priority initial route data 2553, the partial destination node identifier module 2544 can operate in a same or similar fashion as discussed in conjunction with FIG. 25C to generate the partial destination node ID 25554, but based on the sequential ordering of initial relay nodes of the priority initial route data 2553 rather than that of the normal initial route data 2552 in response to the priority initial route data 2553 being selected by the initial route determination module 2542.

The intermediate node options set determination module 2545 can operate in a same or similar fashion as discussed in conjunction with FIG. 25C to generate the intermediate node options set 2555 based on the partial destination node ID 2554. Alternatively, in accordance with the prioritized feedback communication mechanism of some embodiments, the intermediate node options set 2555 determined for a partial destination node ID 2554 can be different if the corresponding partial destination node was determined from priority initial route data 2553 rather than normal initial route data 2552 and/or if the priority data otherwise indicates the data blocks are prioritized feedback. For example, a narrower set of intermediate node options is determined if the data blocks are prioritized feedback. As another example, predetermined intermediate node options set 2555 of a partial destination node of an initial route includes a first set of nodes when the data blocks are prioritized feedback and includes a second set of nodes when the data blocks are normal, where the first set of nodes and the second set of nodes have a non-null set difference and/or where the first set of nodes and the second set of nodes have a null intersection. This can be utilized to ensure nodes are selected differently for prioritized feedback, for example, to ensure these nodes won't be constrained by also being designated for sending of normal data blocks to ensure more efficient routing of the prioritized feedback.

The intermediate node selection module 2546 can operate in a same or similar fashion as discussed in conjunction with FIG. 25C to generate intermediate node selection data 2556 indicating the selected intermediate node 2525 based on the intermediate node options set 2555. Alternatively, in accordance with applying the prioritized feedback communication mechanism, the function or other means utilized to select the selected intermediate node 2525 from the intermediate node options set 2555 when the data blocks correspond to prioritized feedback can be different from the mechanism utilized to select the selected intermediate node 2525 from the intermediate node options set 2555 when the data blocks are normal data blocks. For example, the selection of the selected intermediate node can be based on stricter criteria to ensure the most favorably performing node is selected and/or the node with the least amount of recently transmitted data blocks by the node is selected to help ensure the selected node will more efficiently route the node, for example, than if a different node in the set was selected. The selected intermediate node can be based on looser criteria when the data blocks are normal data blocks, for example, where next node in a turn-based ordering is instead selected from the intermediate node options set 2555 when the data blocks are normal data blocks.

The data block transmission module 2548 can operate in a same or similar fashion as discussed in conjunction with FIG. 25C to forward the data blocks and destination node identifier to the selected intermediate node 2525 indicated in the intermediate node selection data 2556. In some cases, priority data indicating whether the data blocks are normal or prioritized feedback is also send by the data block transmission module 2548 based on being determined by the data block routing module 2535 and/or based on being received by the data block routing module 2535 in conjunction with the received data blocks. In some cases, the data blocks themselves and/or header data of the data blocks can indicate and/or include the priority data. In some cases, priority data is only sent in conjunction with prioritized feedback, where data blocks with no accompanying priority data are therefore determined to be normal by a data block routing module 2535 that receives data blocks.

FIG. 27D illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, some or all of the steps of FIG. 27D. The database system can utilize the prioritized feedback communication mechanism described in conjunction with FIGS. 27A-27C and/or can utilize prioritized feedback routing module 2740 of a plurality of nodes 37 to facilitate execution of some or all of the steps of FIG. 27D. In particular, a node 37 can utilize the prioritized feedback routing module 2740 to execute some or all of the steps of FIG. 27D, where multiple nodes 37 implement their own prioritized feedback routing modules 2740 to independently execute the steps of FIG. 27B, for example, where some or all nodes 37 of a query execution plan 2405 implement prioritized feedback routing module 2740 to facilitate transmission of feedback data during execution of a query. Some or all of the steps of FIG. 27B can optionally be performed by any other processing module of the database system 10. Some or all of the steps of FIG. 27B can be performed to implement some or all of the functionality of the prioritized feedback communication mechanism described in conjunction with FIGS. 27A-27C, some or all prioritized feedback routing modules 2740 of FIGS. 27A-27B, some or all backlog detection modules of FIGS. 27A-27B, some or all data block routing modules 2535 of FIGS. 25B-25F and/or FIG. 27C, and/or of one or more individual nodes 37 as described in conjunction with FIGS. 25A-25G and/or as described in conjunction with FIGS. 27A-27C. Some or all of the steps of FIG. 27D can be performed to implement some or all of the functionality regarding execution of a query via the plurality of nodes in the query execution plan 2405 as described in conjunction with FIGS. 24A-24E. Some or all steps of FIG. 27D can be performed by database system 10 in accordance with other embodiments of the database system and/or nodes 37 discussed herein.

Step 2782 includes receiving plurality of data blocks from a plurality of source nodes via plurality of relay nodes in accordance with execution of a query by a plurality of nodes of the database system, for example as discussed in conjunction with FIGS. 25A-25G and/or as discussed in conjunction with FIGS. 26A-26B, where the node is a destination node 2530 and/or a relay node of a relay node set 2520. Alternatively, each of the plurality of data blocks are received from a single source node. Step 2784 includes generating backlog detection data based on a current data input rate of the plurality of data blocks block comparing unfavorably to a backlog threshold condition. For example, the backlog threshold condition is based on a maximum threshold input rate of the plurality of data blocks, where the backlog detection data is generated based on the current data input rate exceeding or otherwise comparing unfavorably to the maximum threshold input rate. As another example, the backlog threshold condition is based on a maximum utilization level, where the backlog detection data is generated based on a current utilization level the exceeding or otherwise comparing unfavorably to the maximum utilization level, where the current utilization level is based on the input rate of the plurality of data blocks, is based on processing the received plurality of data blocks via a query processing module 2435 of the node, and/or is based on routing the plurality of data blocks via a data block routing module 2535 of the node. As another example, the backlog threshold condition is based on a maximum data queue size, where the backlog detection data is generated based on a current data queue size of a data queue of the node the exceeding or otherwise comparing unfavorably to the maximum data queue size, where the plurality of data blocks are added to the data queue of the node while they are pending processing by the node via the query processing module 2435 of the node and/or relaying by the node via the data block routing module 2535 of the node. As another example, the backlog threshold condition is based on a required performance level, where the backlog detection data is generated based on a current performance level comparing unfavorably to the required performance level, for example, where the current performance level is based on the input rate of the plurality of data blocks and/or is based on receiving the plurality of data blocks.

Step 2786 includes generating at least one feedback data block based on the backlog detection data to be sent to the plurality of source nodes. For example, the feedback data block can indicate an instruction to reduce and/or stop the routing of data blocks from some or all of the plurality of source nodes and/or some or all of the plurality of relay nodes. Step 2788 includes generating feedback relay node selection data selecting at least one of the plurality of nodes in the database system that is operable to facilitate routing of the least one feedback data block from the node to the plurality of source nodes via a prioritized feedback communication mechanism. For example, generating the feedback relay node selection data can include selecting one prioritized feedback communication mechanism from a set of different prioritized feedback communication mechanism options.

In some cases, generating the feedback relay node selection data includes identifying a set of designated feedback relay nodes and routing at least one feedback data block to some or all of the plurality of source nodes via at least the set of designated feedback relay nodes. In some cases, generating the feedback relay node selection data includes identifying at least one of a set of relay nodes to be utilized to send the at least one feedback data block to one of the plurality of source nodes for example, by utilizing the data block routing module 2535 in accordance with the dynamic data block routing scheme of FIGS. 25A-25G.

Step 2790 includes sending the at least one feedback data block to the at least one of the plurality of nodes selected in the feedback relay node selection data, wherein the at least one of the plurality of nodes facilitates routing of the least one feedback data block from the node to the plurality of source nodes via the prioritized feedback communication mechanism. For example, the node utilizes its data block routing module 2535 to select a selected intermediate node 2525 in intermediate node selection data 2556, for example, based on the prioritized feedback communication mechanism, to route the at least one feedback data block to a corresponding destination node and to send the least one feedback data block to the selected intermediate node 2525, where the corresponding destination node is one of the plurality of source nodes and/or one of the plurality of relay nodes. In some cases, the selected intermediate node 2525, upon receiving the data block, prioritizes this data block for routing to the corresponding destination node over other data blocks received for routing to the node or to one or more different nodes based on determining the least one feedback data block is designated as a prioritized feedback data block. For example, the selected intermediate node 2525 sends this at least one feedback data block to another selected intermediate node via data block routing module 2535, before sending any other data blocks that may have been received and/or pending before the at least one feedback data block was received, in accordance with facilitating routing the at least one feedback data block to the corresponding destination node.

The source nodes and/or relay nodes that receive the at least one feedback data block can reduce and/or stop the routing of data block to the node in response to receiving the at least one feedback data block. This can include the source nodes and/or relay nodes selecting different selected intermediate nodes instead of the node for subsequent transmissions of data by their respective data block routing modules 2535 based on receiving the at least one feedback data block.

This can include the source nodes and/or relay nodes directing data blocks to a different destination node instead of the node based on receiving the at least one feedback data block, where the different destination node can facilitate execution of the query by utilizing the data blocks instead of the node. This can include the source nodes and/or relay nodes caching newly generated data blocks to be sent to the node for a least a predefined period of time, where other data blocks are routed to other nodes by these source nodes and/or relay nodes in accordance with the query execution and/or other concurrent query executions during this predefined period of time, and/or where the newly generated data blocks are later sent to the node when the predefined period of time has elapsed.

Figure 28A:
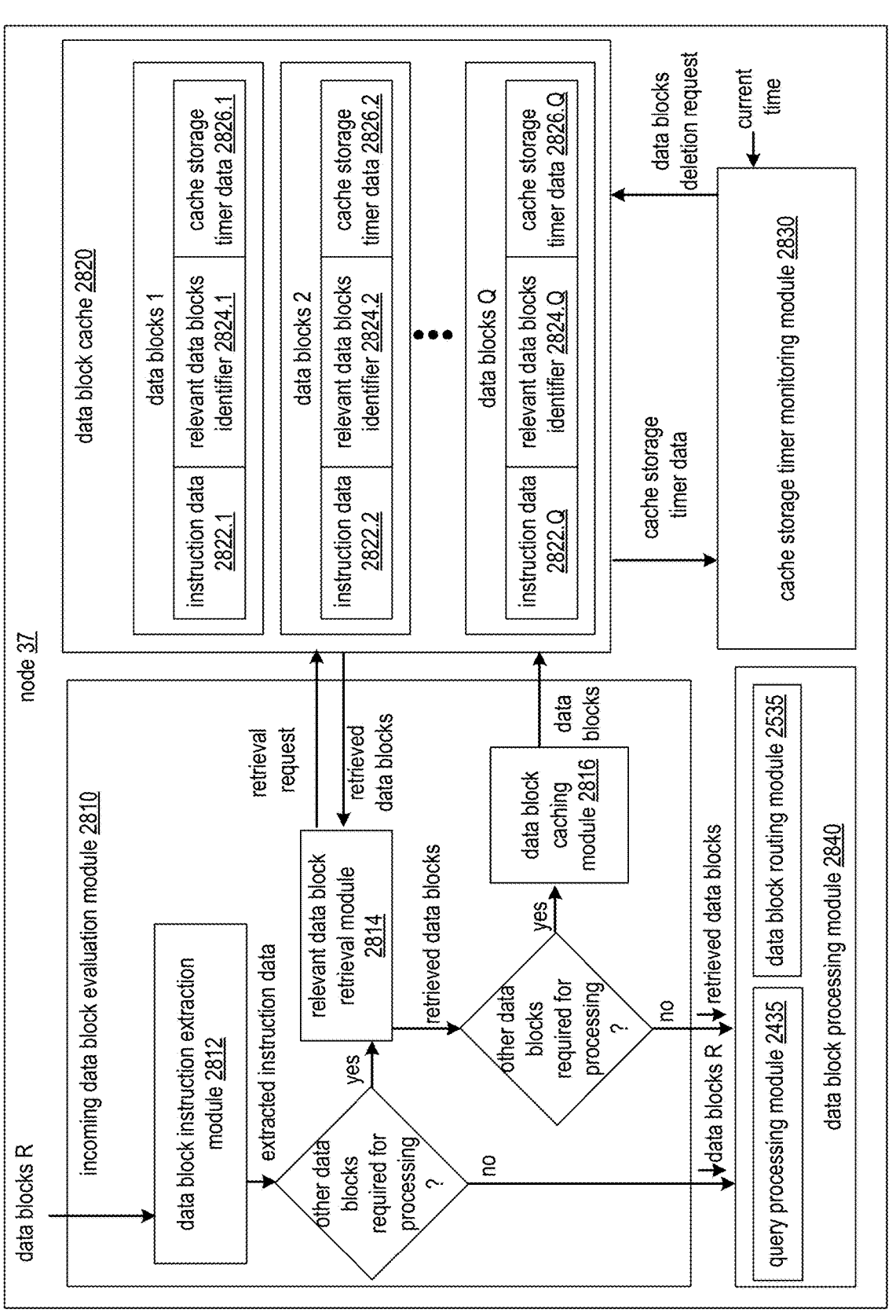
FIG. 28A is a schematic block diagram of a node that utilizes a data block cache in accordance with various embodiments of the present invention.

FIG. 28A illustrates an embodiment of a node 37 that implements an incoming data block evaluation module 2810, a data block cache 2820, a cache storage timer monitoring module 2830, and/or a data block processing module 2840. Some or all nodes of the database system 10 discussed herein, such as some or all nodes 37 of one or more query execution plans 2405 of FIG. 24A for queries executed by the database system 10 and/or some or all nodes 37 utilized to route data blocks as discussed in conjunction with FIGS. 25A-25G, can be implemented utilizing some or all features of node 37 as illustrated in FIG. 28A.

As a result of decentralizing query execution as much as possible, different nodes may begin execution of a query at different times, and may send their resultants to other nodes in the query execution plan accordingly. As various different data is routed through different channels to a node for different purposes, for example, as discussed in conjunction with the data block routing module 2535 of FIG. 25A, data may be received "out of order" from various sources. A node 37 may receive data blocks at a particular time, but may not be able to discern what they are for and/or how they are meant to be processed. For example, instructions indicating a query to be executed such as query operator execution flow 2433 and/or information regarding the node's participation in a query execution plan 2405 for the query are not yet received, but data blocks already processed by another node in query execution plan sends its blocks to this node. In this case, this node cannot yet process these data blocks due to not yet having received information regarding how these data blocks are meant to be processed. In particular, this node has no information regarding the query these data blocks are meant to be processed for, can cannot discern what these data blocks are intended for.

The node can handle such data blocks with "unknown purpose" by caching the data in a data block cache 2820 to "set them aside" until such a time that other relevant data blocks are received that indicate how these data blocks should be processed. For example the data block cache 2820 is implemented by memory module 2640 of the node and/or by other memory resources of the corresponding node. This data block cache can be considered an "unknown purpose data block cache" due to some or all of the corresponding data blocks being stored based on having an unknown purpose, where no instructions regarding how to process the corresponding data blocks have been indicated in the corresponding data blocks or in previously received data blocks. Alternatively, some data blocks stored in data block cache 2820 may have known purpose, such as instructions that are clear but are to be applied to other nodes that have not yet been received.

In some cases, these data block that cannot yet be processed due to all relevant data blocks not yet having been received are cached with a corresponding timer and/or predetermined storage timeframe. When the timer runs out and/or when the predetermined timeframes for storage of the data block has elapsed, this data can be revisited to determine whether corresponding instructions have been received to enable it to be processed. If the purpose of the data is still unknown when the timer has elapsed and/or all relevant data blocks required for processing of the data have still not yet been received, the data is discarded. In other cases, the data does not have a corresponding timer, and is only discarded when memory space of the data block cache 2820 becomes full or otherwise compares unfavorably to a memory capacity threshold. This caching of data blocks is beneficial as it improves query execution by enabling decentralized query execution, which can improve query execution efficiency due to the reduction of coordination required, while also ensuring that data blocks can still be processed appropriately despite being received out of order and/or despite periods of time in which the purpose of some data blocks is entirely unknown.

This discarding of data after a period of time has passed and/or memory has become full can ensure that data blocks are not saved indefinitely or for an unnecessarily long amount of time. For example, in cases of node failure and/or incredibly communication latency, a query's execution may not ever be completed, and/or the node may never receive the corresponding instructions. Discarding of data after a reasonable time has passed can improve node processing efficiency and/or storage efficiency.

In some cases, other events are detected and trigger re-checking of cached data. For example, if a control signal is received indicating an instruction for use of cached data, the cached data can be automatically checked to see if any of this data's purpose becomes known based on the control signal. For example, such control signals can be received in other data blocks that are relevant to the cached data's processing and/or that indicate how the data blocks are to be processed.

As illustrated in FIG. 28A, incoming data blocks received by a node 37 from one or more other nodes 37 can be processed by an incoming data block evaluation module 2810 implemented by the node. This can include data blocks received from child nodes in accordance with a query execution plan 2405, data blocks received from parent nodes to initialize the query execution plan and/or to communicate the corresponding roles, level assignment, and/or query operator execution flow; data blocks received in conjunction with a shuffle node set 2485, and/or other data blocks routed to the node, for example via one or more relay nodes of a relay node set 2520. The incoming data block evaluation module 2810 can be implemented by utilizing processing and/or memory resources of the node 37. In this case, data blocks R can correspond to one data block or a set of related data blocks received from a same node, received within a substantially small time frame, and/or received at substantially the same time.

A data block instruction extraction module 2812 can be utilized to determine instructions included in the one or more data blocks R regarding how the data blocks R are to be processed. For example, this can include query execution instructions to initialize the corresponding query execution plan. This can include instructions regarding execution of the query in accordance with a corresponding query execution plan that should have been previously initialized. This can include routing instructions such as a destination node identifier to route the data blocks to a different node for processing. In some cases, the data blocks R have no corresponding instructions and/or do not have all required instructions, where some or all instructions regarding execution of the data blocks R are instead included in other data blocks that were previously received and/or that have not yet been received.

The incoming data block processing module can determine whether any other data blocks, which may have been previously received but not processed and/or that may not have been received yet, are required for processing of the data blocks R, based on the corresponding extracted instructions. For example, this can include evaluating whether the instructions can currently be executed without additional data blocks, evaluating whether the instructions can currently be executed based on applying previously received data blocks, and/or determining whether there is missing information that render execution of the data blocks impossible at this time. In some cases, data block R can be processed, but its extracted instructions indicate instructions relevant to other data blocks and thus data block R is determined to have other related data blocks.

If other data blocks are not determined to be required for processing of data blocks R, data blocks R can be processed via a data block processing module 2840. In particular, based on the extracted instruction data, data blocks R are processed by the query processing module 2435 as discussed previously and/or are processed by the data block routing module 2535 as discussed previously, for example, in accordance with the extracted instruction data.

If other data blocks are determined to be required for processing of data blocks R, a relevant data block retrieval module 2814 can access the data block cache 2820 of the node to determine if any missing data blocks and/or missing instructions required to execute the data block are stored in the data block cache 2820 based on being included in other corresponding data blocks. For example, these relevant data blocks may have been previously stored in data block cache 2820 based on not being able to be processed by the node prior to receiving data blocks R. As a particular example, some or all of the data blocks 1-Q can include instruction data 2822 that indicates how data blocks R is to be processed, where data blocks R itself did not have any relevant instructions extracted indicating how data blocks R is to be processed by the node 37. As another example, the instructions extracted from data blocks R indicate how one or more of the data blocks 1-Q are to be processed by the node 37, where the instruction data 2822 for these one or more of the data blocks 1-Q is null and/or does not indicate all necessary instructions regarding how the data blocks 1-Q themselves are to be processed by the node 37.

The relevant data block retrieval module 2814 can send a retrieval request for particular stored data blocks and/or search criteria for data blocks that may be relevant. This search criteria and/or the request can be based on the extracted instructions of the data blocks R, can be based on identifying information for the data blocks R such as header information and/or a source node identifier of a source node that generated the data blocks R; and/or can be based on other information regarding data blocks R. In some cases, every data block in data block cache 2820 is accessed and/or checked to determine whether it is applicable to data blocks R in response to determining data blocks R requires other data blocks to be processed itself and/or includes instructions relating to the processing of other data blocks. The relevant data block retrieval module 2814 can receive and/or extract relevant information from any retrieved data blocks from the data block cache 2820.

The incoming data block evaluation module 2810 can determine whether the retrieved data blocks by the relevant data block retrieval module 2814, if any, are sufficient for processing the data blocks R. If the retrieved data blocks render data blocks R as being able to be processed, data blocks R and the retrieved data blocks are sent to the data block processing module 2840, for example, for processing via the query processing module 2435 and/or the data block routing module 2535. For example, the data block processing module 2840 processes data block R based on instruction data 2822 extracted from one or more retrieved data blocks. As another example, the data block processing module 2840 processes the one or more retrieved data blocks based on instruction data extracted from data block R. The one or more retrieved data blocks, upon being processed successfully and/or based on being sent to the data block processing module 2840, can be removed from the data block cache 2820, for example, based on no longer pending processing and/or based on its instructions being applied to all relevant incoming data blocks.

In some cases, none of the required other data blocks are retrieved from the data block cache 2820 based on not yet having been retrieved and/or based on having been deleted due to their cache storage timer elapsing. In some cases, some data blocks are retrieved, but not all necessary data blocks were retrieved, and thus additional information is still required to process data blocks R. In either case, the data blocks R are determined to not be able to be processed at the current time, and can be cached in the data block cache 2820 by data block caching module 2816. Caching the data block can include storing the data blocks R as they stand and/or can include extracting the instruction data 2822 and/or extracting relevant data blocks identifier information 2824 to enable the data blocks R to be easily searched for its relevance to other incoming data blocks.

The data blocks R can be stored with and/or can be stored in conjunction with cache storage timer data 2826 that indicates a maximum time period in which data blocks R are to be stored, even if these data blocks R are never able to be processed based on the relevant data blocks required for the processing of data blocks R not being received within the time period. This time period can be determined based on a time period start time, which can be determined based on when the data blocks R are received and/or based on a timestamp included in data blocks R, for example, corresponding to when data blocks R were generated by a different source node. A same maximum amount of time or different maximum amount of time from a can be applied to the time period start time of all data blocks and/or can be different for different types of data blocks, for example, where data blocks with a higher perceived importance are assigned longer maximum amount of time to give their necessary data blocks more time to be received. A storage expiration time can be indicated by the cache storage timer data 2826, for example, based on the start time and the maximum amount of time, to indicate the point in time when the data blocks should be deleted.

A cache storage timer monitoring module 2830 can facilitate deletion of expired data blocks in the data block cache 2820 over time based determining that the cache storage timer data 2826 indicates that the data blocks are to be removed. This can be based on comparing a current time to the storage expiration time and/or based on otherwise determining that the cache storage timer data indicates elapsing of the corresponding data block in data block cache 2820. This can be based on comparing a start time of the data blocks and the current time to a predetermined maximum amount of storage time to determine whether the storage of the data blocks exceeds the predetermined maximum amount of storage time. The cache storage timer monitoring module 2830 can access and/or otherwise monitor the cache storage timer data continuously and/or in predetermined time intervals. The cache storage timer monitoring module 2830 can send data block deletion requests for data blocks determined to have expired in storage based on their corresponding cache storage timer data 2826. In particular, the expired data blocks are deleted from the data block cache 2820 without being processed by the data block processing module 2840.

In some cases, a transmission and/or error notification is routed to one or more other nodes 37, such as a source node 2510 of these data blocks, and/or is routed to a client device associated with an end user, The transmission and/or error notification can indicate that the deleted data blocks were never processed; can indicate a node from whom the corresponding data blocks were expected to be received to indicate this node and/or one or more relay nodes may have failed and/or may be performing at a degraded performance level; can indicate a network connection failure due to not receiving the required data blocks; can indicate that a corresponding query is not guaranteed to be correct and/or must be re-executed via the same or different query execution plan due to these data blocks never having been processed; and/or can otherwise indicate the data blocks were not processed and were instead deleted.

In some cases, prior to deleting particular expired data blocks identified by the cache storage timer monitoring module 2830, these expired data blocks are evaluated again, for example, by the incoming data block evaluation module 2810, to conclude whether or not the necessary other data blocks were received since the data block was stored in cache. If the data block can be processed based on the relevant data block retrieval module retrieving the necessary data blocks and/or determining the necessary data blocks have been received, for example, as pending data blocks not yet processed by the incoming data block evaluation module 2810, these data blocks are processed in conjunction with the other necessary data blocks by the data block processing module 2840 accordingly as described previously. If the other necessary data blocks are determined to have never been received by the node 37, these expired data blocks are deleted from data block cache 2820 and are not processed by the data block processing module 2840.

FIG. 28B illustrates a method for execution by at least one processing module of a database system 10. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, some or all of the steps of FIG. 28B. The database system can utilize the incoming data block evaluation module 2810 of FIG. 28A; the data block cache 2820 of FIG. 28A; the cache storage timer monitoring module 2830 of FIG. 28A, and/or the data block processing module 2840 of FIG. 28A of a single node 37 and/or of each of a plurality of nodes 37 to facilitate execution of some or all of the steps of FIG. 28B. In particular, a node 37 can utilize the incoming data block evaluation module 2810 of FIG. 28A; the data block cache 2820 of FIG. 28A; the cache storage timer monitoring module 2830 of FIG. 28A, and/or the data block processing module 2840 of FIG. 28A to execute some or all of the steps of FIG. 28B, where multiple nodes 37 implement their own incoming data block evaluation module 2810 of FIG. 28A; the data block cache 2820 of FIG. 28A; the cache storage timer monitoring module 2830 of FIG. 28A, and/or the data block processing module 2840 to independently execute the steps of FIG. 28B. Some or all of the steps of FIG. 28B can optionally be performed by any other processing module of the database system 10. Some or all of the steps of FIG. 28B can be performed to implement some or all of the functionality of the node 37 illustrated in FIG. 28A, and/or any other embodiments of node 37 discussed herein. Some or all of the steps of FIG. 28B can be performed to implement some or all of the functionality regarding execution of a query via the plurality of nodes in the query execution plan 2405 as described in conjunction with FIGS. 24A-24E. Some or all steps of FIG. 28B can be performed by database system 10 in accordance with other embodiments of the database system 10 and/or nodes 37 discussed herein.

Step 2882 includes receiving a first data block from a second node of a plurality of nodes of the database system in accordance with execution of a first query by the plurality of nodes. Step 2884 includes determining data block processing instruction data for the first data block is not indicated in a first set of previously received data blocks. Step 2886 includes adding the first data block to an unknown purpose data block cache at a first time.

Step 2888 includes receiving, at a second time that is prior to elapsing of a storage time window for storage of the first data block by the unknown purpose data block cache, at least one second data block that indicates data block processing instruction data for the first data block. For example, the at least one second data block is generated by and/or received from the same second node and/or from a different data block from the second node. Step 2890 includes accessing the first data block in the unknown purpose data block cache and processing the first data block in accordance with execution of the first query by applying the data block processing instruction data for the first data block based on receiving the at least one second data block that indicates the data block processing instruction data for the first data block prior to elapsing of the storage time window.

Step 2892 includes receiving a third data block from a third node of the plurality of nodes of the database system in accordance with execution of a second query by the plurality of nodes. Step 2894 includes determining data block processing instruction data for the third data block is not indicated in a second set of previously received data blocks. Step 2896 includes adding the third data block to an unknown purpose data block cache at a third time.

Step 2898 includes removing the third data block from the unknown purpose data block cache at a fourth time based on elapsing of a storage time window for storage of the third data block by the unknown purpose data block cache at the fourth time and based on not receiving any data blocks indicating data block processing instruction data for the third data block prior to the fourth time, wherein the third data block is not processed by the node in accordance with execution of the second query based on removing the third data block from the unknown purpose data block cache. For example, the method can further include receiving, at a fifth time that is after elapsing of the storage time window for storage of the third data block by the unknown purpose data block cache, at least one fourth data block that indicates data block processing instruction data for the third data block. However, as the third data block has already been removed from storage by the node in its unknown purpose data block cache, the third data block is still not processed by the node despite the corresponding data block processing instruction data for the third data block. In some cases, a notification is generated for routing to the node that sent the corresponding data block processing instruction data in the at least one fourth data block, and/or for routing to the third node from by which the third data block was generated and/or received from. The notification can indicate that the data block processing instruction data was received too late and/or that the corresponding third data block was not processed.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A store and compute sub-system of a database system, wherein the store and compute sub-system comprises:
pluralities of computing nodes, wherein computing nodes of a first plurality of computing nodes of the pluralities of computing nodes are locally networked together and wherein the pluralities of computing nodes are system-wide networked together;
a first computing node of the pluralities of computing nodes is operable to:

receive, from neighboring computing nodes of the pluralities of computing nodes, inbound data blocks regarding a plurality of queries originated by one or more first source computing nodes of the pluralities of computing nodes;
send, via the neighboring computing nodes, outbound data blocks regarding the plurality of queries targeting one or more second source computing nodes of the pluralities of computing nodes;
send forwarding data blocks between the neighboring computing nodes, whether the first computing node is not a source or destination of the forwarding data blocks;
determine whether an input rate of data block traffic compares unfavorably to a backpressure threshold;
when the input rate of the data block traffic compares unfavorably to the backpressure threshold:
send, as a priority over the data block traffic, a feedback data block to one or more neighboring computing nodes to slow down the input rate of the data block traffic;
a first neighboring computing node of the neighboring computing nodes is operable to:
receive, from the first computing node, the feedback data block;
process the feedback data block to determine a feedback response, wherein processing the feedback data block is prioritized over processing data block traffic of the first neighboring computing node;
when the feedback response is to request a slow down of data from a particular source computing node of the one or more first source computing nodes,
determine whether the first neighboring computing node is the particular source computing node; and
when the first neighboring computing node is not the particular source computing node, forward the feedback data block towards the particular source computing node.

2. The store and compute sub-system of claim 1, wherein the first computing node is further operable to:
determine to stop transmission of data blocks from the one or more first source computing nodes based on the input rate of the data block traffic comparing unfavorably to the backpressure threshold; and
generate the feedback data block to include an instruction to stop transmission of data blocks associated with the plurality of queries from the one or more first source computing nodes.

3. The store and compute sub-system of claim 1, wherein the first computing node is further operable to:
determine to slow down transmission of data blocks from a specific first source computing node of the one or more first source computing nodes based on the input rate of the data block traffic comparing unfavorably to the backpressure threshold; and
generate the feedback data block to include an instruction to slow down the transmission of the data blocks from the specific first source computing node to a rate determined based on a backpressure threshold or backlog condition.

4. The store and compute sub-system of claim 1, wherein the first computing node is further operable to:
determine to slow down transmission of data blocks from a specific neighboring computing node of the neighboring computing nodes based on the input rate of the data block traffic comparing unfavorably to the backpressure threshold; and generate the feedback data block to include an instruction to slow down the transmission of the data blocks from the specific neighboring computing node that are associated with the plurality of queries.

5. The store and compute sub-system of claim 1, wherein the first computing node is further operable to:
determine to slow down transmission of data blocks from the neighboring computing nodes based on the input rate of the data block traffic comparing unfavorably to the backpressure threshold; and
generate the feedback data block to include an instruction to slow down the transmission of the data blocks from the neighboring computing nodes until the input rate of the data block traffic compares favorably to the backpressure threshold.

6. The store and compute sub-system of claim 1, wherein the first neighboring computing node is further operable to:
when the first neighboring computing node is the particular source computing node, suspend sending data blocks associated with the plurality of queries to the first computing node.

7. The store and compute sub-system of claim 1 further comprises:
a feedback computing node of the pluralities of computing nodes, wherein the feedback computing node is operable to:
forward the feedback data block to other computing nodes of the pluralities of computing nodes; and
wherein the feedback computing node is inoperable to send or receive the forwarding data blocks associated with query execution.

8. The store and compute sub-system of claim 1 further comprises:
an inbound data block comprises a plurality of labeled rows associated with a query, the plurality of labeled rows having a size in a range of 1 Byte to 1 Giga-Byte;
an outbound data block comprises a plurality of labeled rows associated with a query, the plurality of labeled rows having a size in the range of 1 Byte to 1 Giga-Byte; and
a forwarding data block comprises a plurality of labeled rows associated with a query, the plurality of labeled rows having a size in the range of 1 Byte to 1 Giga-Byte.

9. A computer readable memory device that comprises:
a first memory that stores operational instructions that, when executed by a first computing node of a first plurality of computing nodes of a store and compute sub-system of a database, wherein the pluralities of computing nodes are system-wide networked together causes the first computing node to:
receive, from neighboring computing nodes of the pluralities of computing nodes, inbound data blocks regarding a plurality of queries originated by one or more first source computing nodes of the pluralities of computing nodes;
send, via the neighboring computing nodes, outbound data blocks regarding the plurality of queries targeting one or more second source computing nodes of the pluralities of computing nodes;
send forwarding data blocks between the neighboring computing nodes, whether the first computing node is not a source or destination of the forwarding data blocks;
determine whether an input rate of data block traffic compares unfavorably to a backpressure threshold; and when the input rate of the data block traffic compares unfavorably to the backpressure threshold, send, as a priority over the data block traffic, a feedback data block to one or more neighboring computing nodes to slow down the input rate of the data block traffic;
a second memory storing operational instructions that, when executed by a first neighboring computing node of the neighboring computing nodes, causes the first neighboring computing node to:
receive, from the first computing node, the feedback data block;
process the feedback data block to determine a feedback response, wherein processing the feedback data block is prioritized over processing data block traffic;
when the feedback response is to request a slow down of data from a particular source computing node of the one or more first source computing nodes, determine whether the first neighboring computing node is the particular source computing node; and
when the first neighboring computing node is not the particular source computing node, forward the feedback data block towards the particular source computing node.

10. The computer readable memory device of claim 9, wherein the first memory further stores operational instructions that, when executed by the first computing node, causes the first computing node to:
determine to stop transmission of data blocks from the one or more first source computing nodes; and
generate the feedback data block to include an instruction to stop transmission of data blocks associated with the plurality of queries from the one or more first source computing nodes.

11. The computer readable memory device of claim 9, wherein the first memory further stores operational instructions that, when executed by the first computing node, causes the first computing node to:
determine to slow down transmission of data blocks from a specific first source computing node of the one or more first source computing nodes based on the input rate of the data block traffic comparing unfavorably to the backpressure threshold; and
generate the feedback data block to include an instruction to slow down the transmission of the data blocks from the specific first source computing node to a rate determined based on a backpressure threshold or backlog condition.

12. The computer readable memory device of claim 9, wherein the first memory further stores operational instructions that, when executed by the first computing node, causes the first computing node to:
determine to slow down transmission of data blocks from a specific neighboring computing node of the neighboring computing nodes based on the input rate of the data block traffic comparing unfavorably to the backpressure threshold; and
generate the feedback data block to include an instruction to slow down the transmission of the data blocks from the specific neighboring computing node that are associated with the plurality of queries.

13. The computer readable memory device of claim 9, wherein the first memory further stores operational instructions that, when executed by the first computing node, causes the first computing node to:
determine to slow down transmission of data blocks from the neighboring computing nodes based on the input rate of the data block traffic comparing unfavorably to the backpressure threshold; and generate the feedback data block to include an instruction to slow down the transmission of the data blocks from the neighboring computing nodes until the input rate of the data block traffic compares favorably to the backpressure threshold.

14. The computer readable memory device of claim 9, wherein the second memory further stores operational instructions that, when executed by the first neighboring computing node, causes the first neighboring computing node to:

when the first neighboring computing node is the particular source computing node, suspend sending data blocks associated with the plurality of queries to the first computing node.

15. The computer readable memory device of claim 9, wherein a third memory stores operational instructions that, when executed by a feedback computing node of the pluralities of computing nodes, causes the feedback node to:

forward the feedback data block to other computing nodes of the pluralities of computing nodes; and wherein the feedback computing node is inoperable to send or receive the forwarding data blocks associated with query execution.

16. The computer readable memory device of claim 9, wherein the first memory further stores operational instructions to:

characterize an inbound data block as comprising a plurality of labeled rows associated with a query;

characterize an outbound data block as comprising a plurality of labeled rows associated with a query; and characterize a forwarding data block as comprising a plurality of labeled rows associated with a query;

wherein the plurality of labeled rows has a size in a range of 1 Byte to 1 Giga-Byte.

\* \* \* \* \*